United States Patent [19]

Katagiri et al.

[11] Patent Number: 5,815,089
[45] Date of Patent: *Sep. 29, 1998

[54] DEVICE FOR TRANSMITTING SIGNALS FROM POSITION DETECTOR AND METHOD OF SUCH SIGNAL TRANSMISSION

[75] Inventors: Takashi Katagiri; Tetsuo Momose, both of Nagano, Japan

[73] Assignee: Kabushiki Kaisha Sankyo Seiki Seisakusho, Nagano, Japan

[ * ] Notice: The term of this patent shall not extend beyond the expiration date of Pat. No. 5,625,353.

[21] Appl. No.: 782,097

[22] Filed: Jan. 13, 1997

Related U.S. Application Data

[62] Division of Ser. No. 174,044, Dec. 28, 1993, Pat. No. 5,625,353.

[30] Foreign Application Priority Data

| Dec. 29, 1992 | [JP] | Japan | P.HEI.4-361076 |
| Jan. 11, 1993 | [JP] | Japan | P.HEI.5-19356 |
| Jan. 21, 1993 | [JP] | Japan | U.M.HEI.5-4643 |
| Jan. 21, 1993 | [JP] | Japan | P.HEI.5-26172 |
| Mar. 25, 1993 | [JP] | Japan | P.HEI.5-90878 |
| Mar. 31, 1993 | [JP] | Japan | P.HEI.5-96629 |

[51] Int. Cl.$^6$ .............................................. G08C 15/06
[52] U.S. Cl. .............................. 340/870.03; 340/870.02; 340/870.31; 340/870.35; 340/870.43; 324/207.2; 324/207.11; 324/207.22; 324/207.23
[58] Field of Search .................... 340/870.01, 870.02, 340/870.31, 870.35, 870.43; 324/163, 167, 207.2, 207.22, 207.23, 207.11; 345/18; 455/260

[56] References Cited

U.S. PATENT DOCUMENTS 3,930,201 12/1975 Ackermann et al. ............... 324/173
4,028,686 6/1977 Wilson et al. .................... 324/173
4,296,412 10/1981 Mastner ......................... 340/870.43
4,305,072 12/1981 Makita .......................... 340/870.31
4,490,674 12/1984 Ito .............................. 324/207.21
4,647,853 3/1987 Cobern ........................... 324/173
4,707,695 11/1987 Takahashi et al. ............... 340/870.31
4,874,053 10/1989 Kimura et al. ................... 324/207.21
4,928,089 5/1990 Gasiunas et al. ................. 340/870.31
4,951,300 8/1990 Koike ........................... 340/870.31
5,150,363 9/1992 Mitchell ........................ 370/112
5,280,238 1/1994 Tsuchiya et al. ................. 340/870.35
5,382,899 1/1995 Funatsu et al. .................. 340/870.35

*Primary Examiner*—Jeffery A. Hofsass
*Assistant Examiner*—Ashok Mannava
*Attorney, Agent, or Firm*—Sughrue, Mion, Zinn, Macpeak & Seas, PLLC

[57] ABSTRACT

A transmitting device, for transmitting position detector signals, comprises a controller for processing signals on various kinds of data from an object of interest; a position detector that has a magnetic pole detecting portion and which detects position data on the object of interest; an up-down counter that counts in an ascending or descending order on the basis of two-phase output signals that are produced from the position detector in accordance with the change in the position of the object of interest; a converting circuit portion in which both the counter value as produced from the up-down counter or the change in the counter value per unit time and a magnetic pole position detection signal as produced from the magnetic pole detecting portion are converted to a serial signal; and a transmission path for transmitting the serial signal to the controller. Furthermore, a method of transmitting position detector signals with the above-mentioned transmitting device, which comprises: converting position data on an object of interest to a serial signal within a given time; superposing the output of an absolute counter on the serial signal after the output has been converted to a serial signal, the output representing the absolute position of the object of interest; and transmitting the signals in superposition to the control unit along a single channel of transmission path.

10 Claims, 36 Drawing Sheets

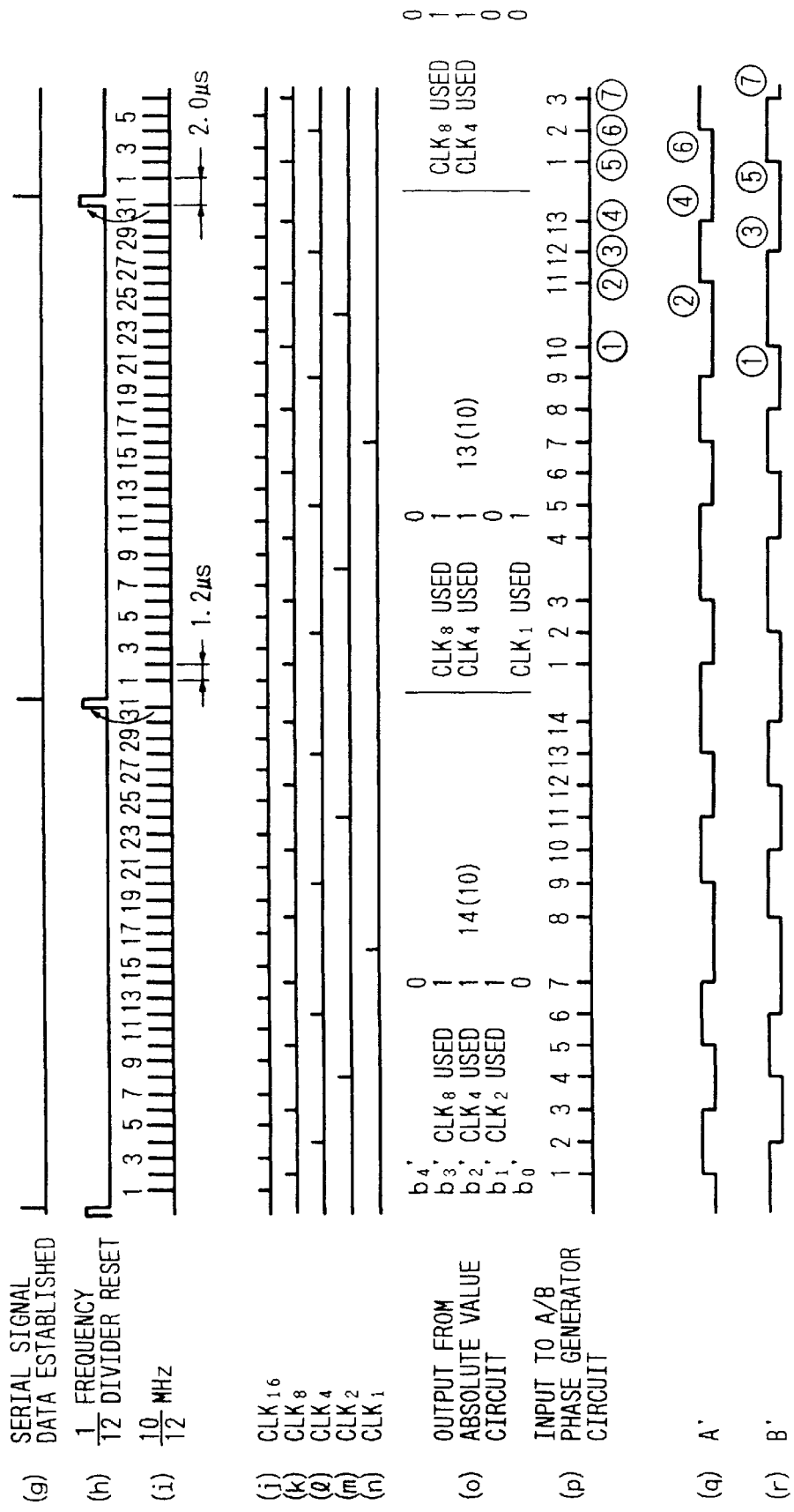

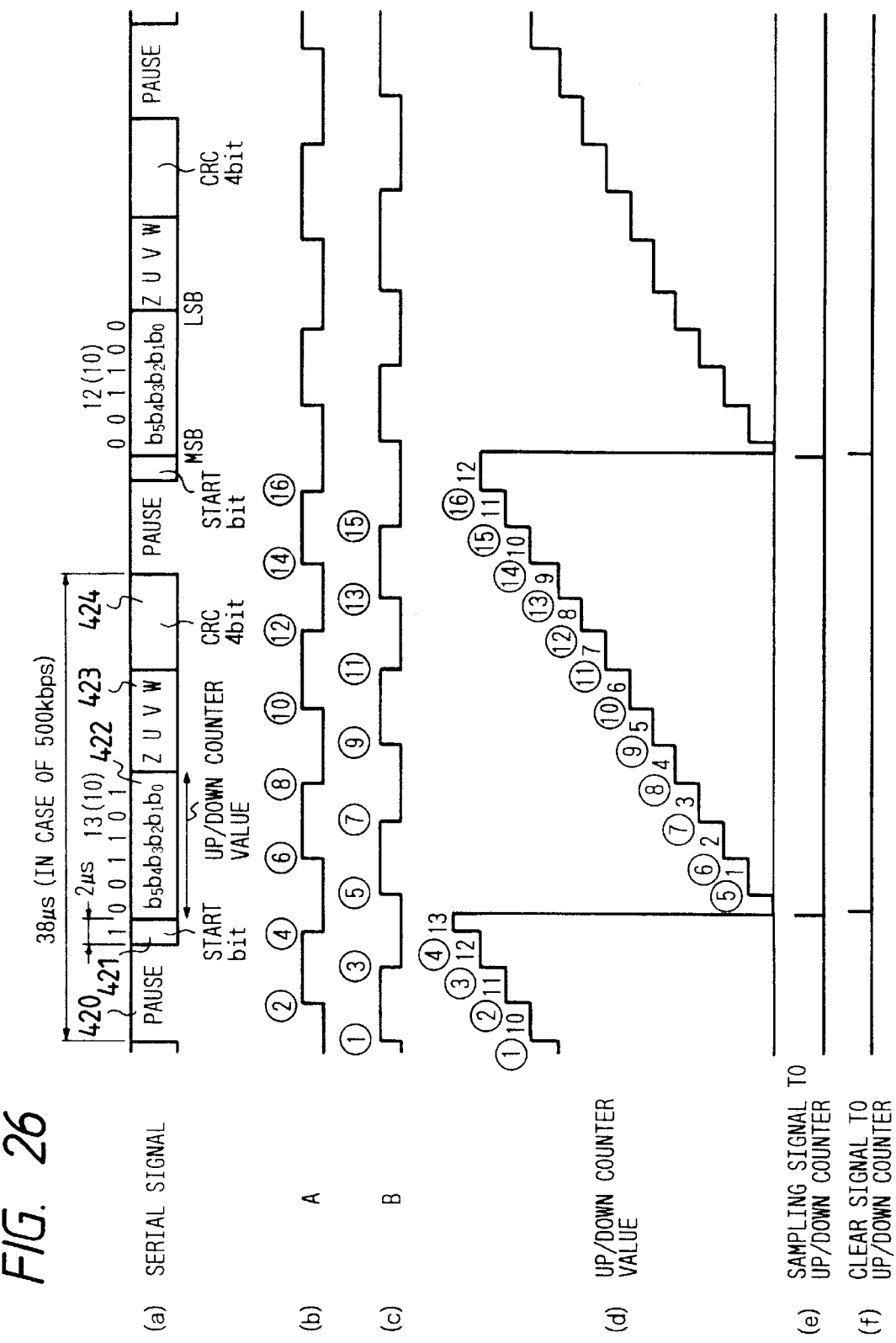

DEVICE FOR TRANSMITTING SIGNALS FROM POSITION DETECTOR AND METHOD OF SUCH SIGNAL TRANSMISSION

This is a divisional of application Ser. No. 08/174,044, filed Dec. 28, 1993 now U.S. Pat. No. 5,625,353.

DETAILED DESCRIPTION OF THE INVENTION

This invention relates to a device for transmitting signals from a position detector and a method of such signal transmission.

The operation of motors such as brushless motors conventionally involves the detection of data on the position of the motor's main shaft. To detect such position data, a magnetic recording medium for detecting A, B and Z phases and a pole detecting magnet for detecting U, V and W phases are provided in an end portion of the motor's main shaft and signals for position data are supplied from the magnetic recording medium and signals for driving position data are supplied from the pole detecting magnet. These data are transmitted to a control unit through a cable in which the respective transmission paths are bundled together and the control unit executes feedback control and various other kinds of processing on the basis of those data.

Conventional apparatus for detecting, transmitting and processing such data signals have had the following problems. First, transmitting signals in three channels not only for phases A and B but also for serial phases (Z, U, V and W phases) requires a large number of transmission lines and, accordingly, the thickness of the cable in which they are bundled together, must be increased, which results in a higher cable cost. If the control unit is located at a comparatively far distance, the problem becomes worse since the length of the transmission paths has to be increased.

The thick cable causes other problems. If it is installed not only exterior to the system but also within it, it will occupy an undesirably large space. Even in the case where the cable is installed only outside the system, the efficiency of reeling and other cable handling operations is limited. Further, irrespective of whether the cable is installed within or outside the system, members for supporting the cable must have a fairly rigid structure and this is a limiting factor on the latitude in design.

SUMMARY OF THE INVENTION

The present invention has been accomplished under these circumstances and has as an object providing a device for transmitting signals from a position detector and a method of such signal transmission, with which the number of transmission paths is reduced to one channel while, at the same time, the thickness of the cable to be used is sufficiently reduced to lower the cost but increase the latitude in cable design.

Another object of the present invention is to provide a method of transmitting incremental signals by which the amount of signals to be transmitted and, hence, the necessary storage capacity can be reduced while, at the same time, the transmission time is sufficiently shortened to achieve improved controllability.

A further object of the present invention is to provide a method of transmitting incremental signals by which the duty of output for phases A and B can be sufficiently improved to achieve better signal quality even if the output of an analog sensor for phases A and B does not have high precision.

A still further object of the present invention is to provide a method of transmitting incremental signals by which errors in signal transmission can be detected to assure improved system reliability.

Yet another object of the present invention is to provide a method of transmitting incremental signals such that, when the method is used on transmission paths of low enough quality to cause frequent transmission errors, the data reliability permits errors of the prior art level so that the occurrence of a single error due to noise will not cause an alarm but that the last received data are used as such to avoid an erroneous operation whereas a succession of true errors will cause an alarm, thereby insuring improved anti-noise characteristics.

Still another object of the present invention is to provide a device for transmitting signals from a position detector with which any offset in A, B and Z phases that would otherwise occur at the reception end is eliminated to achieve improvement in the precision of positioning job.

According to the invention, it is provided a transmitting device, for transmitting position detector signals, comprises a controller for processing signals on various kinds of data from an object of interest; a position detector that has a magnetic pole detecting portion and which detects position data on the object of interest; an up-down counter that counts in an ascending or descending order on the basis of two-phase output signals that are produced from the position detector in accordance with the change in the position of the object of interest; a converting circuit portion in which both the counter value as produced from the up-down counter or the change in the counter value per unit time and a magnetic pole position detection signal as produced from the magnetic pole detecting portion are converted to a serial signal; and a transmission path for transmitting the serial signal to the controller.

Furthermore, according to the invention, it is provided a method of transmitting position detector signals which is applicable with the above-mentioned transmitting device, the method comprises: converting position data on an object of interest to a serial signal within a given time; superposing the output of an absolute counter on the serial signal after the output has been converted to a serial signal, the output representing the absolute position of the object of interest; and transmitting the signals in superposition to the control unit along a single channel of transmission path.

BRIEF DESCRIPTION OF THE DRAWINGS

FIG. 17 is a timing chart for illustrating the operation of the circuitry shown in FIG. 14;

FIG. 26 is a timing chart for illustrating the operation of the circuitry shown in FIG. 23;

DESCRIPTION OF THE PREFERRED EMBODIMENTS

First Embodiment

Figure 1:
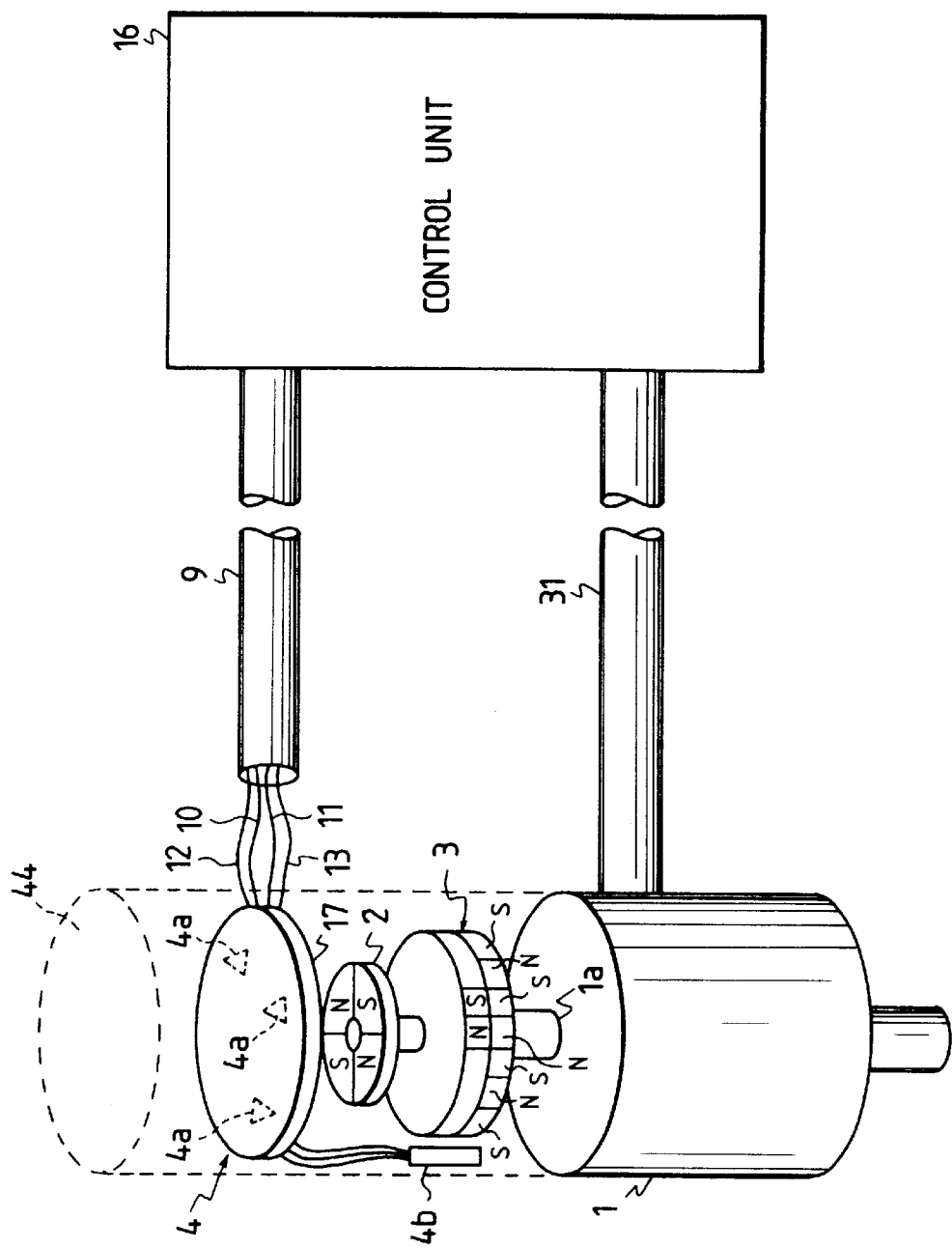
FIG. 1 is a simplified side view of a device for transmitting signals from a position detector according to the first embodiment of the present invention.
Figure 2:
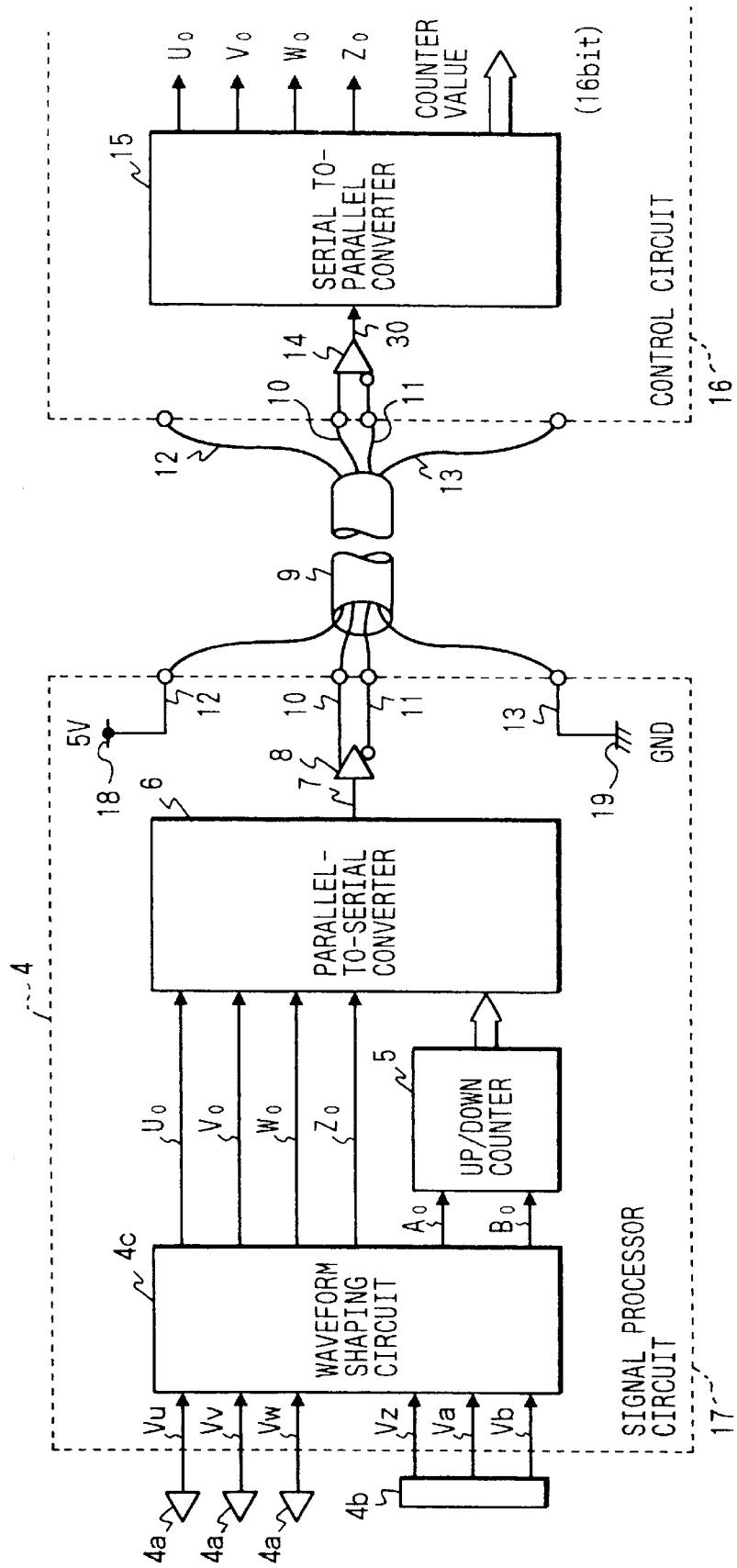
FIG. 2 is a schematic presentation of FIG. 1.

FIG. 1 is a simplified side view of a device for transmitting signals from a position detector according to the first embodiment of the present invention, and FIG. 2 is a schematic presentation of FIG. 1. The device for transmitting signals from a position detector according to the first embodiment of the present invention may typically be installed in the arm portion of a robot.

In FIG. 1, numeral 1 refers to a motor such as a brushless motor. The motor 1 has a main shaft 1a and a disk of pole detecting magnet 2 is provided above an end face of the main shaft 1a. The magnet 2 is magnetized in such a way that N and S poles alternate around the circumference and it will send out driving position data in association with phases U, V and W. A disk of magnetic recording medium 3 is also provided above an end face of the main shaft 1a but in a position closer to the main shaft than the pole detecting magnet 2 is. The medium 3 consists of an upper portion and a lower portion; the upper portion is magnetized in such a way that two poles, one being N and the other S, are juxtaposed on the circumference whereas the lower portion is magnetized in such a way that N and S poles alternate around the circumference in phase with the N and S poles on the circumference of the upper portion. Having this construction, the magnetic recording medium 3 will send out position data in association with phases Z, A and B.

The motor 1 is furnished with a position detector 4 such as an encoder for detecting position data in respective association with phases A, B, Z, U, V and W. The encoder 4 is enclosed in a case 44 (which is delineated with a dashed line for the sake of clarity of the drawing), and Hall devices 4a and an MR sensor 4b each serving as a pole detector are encased in positions that face the magnetized areas of the pole detecting magnet 2 and the magnetic recording medium 3, respectively. The Hall devices 4a are mounted on the reverse face of the base of a signal processor circuit 17 to be described below which is composed of a waveform shaping circuit 4c, an up-down counter 5, a parallel-to-serial converter 6, a line driver 8, a 5 V power supply 18 and a grounded power supply 19. As shown in FIG. 2, the output lines of the Hall devices 4a and the MR sensor 4b are connected to the waveform shaping circuit 4c for shaping to a rectangular wave. The output lines for phases A and B form the shaping circuit 4c are connected to the parallel-to-serial converter 6 (converter circuit portion) via the up-down counter 5 for counting in an ascending or descending order, and the output lines for the other phases (Z, U, V and W) are directly connected to the parallel-to-serial converter 6. A serial signal line 7 from the parallel-to-serial converter 6 is connected to the line driver 8. A BUS line 10 and a reverse BUS line 11 from the line driver 8 are bundled within an encoder cable 9 in the middle of their way to connection to a line receiver 14 in a control unit 16. The signal processor circuit 17 is furnished with the 5 V power supply 18 and the grounded power supply 19 which are connected to the control unit 16 via a 5 V power line 12 and a grounded power line 13, respectively. The 5 V power line 12 and the grounded power line 13 are bundled within the encoder cable 9 together with the BUS line 10 and the reverse BUS line 11. The output line from the line receiver 14 in the control unit 16 is connected to a serial-to-parallel converter 15 via a serial signal line 30 so that position data for phases Z, U, V and W and the counter value will be delivered in a parallel manner from the converter 15. As shown in FIG. 1, the control unit 16 is connected to the motor 1 via a motor cable 31 so that the motor 1 can be driven with the control unit 16.

The operation of the device for transmitting signals from the position detector having this construction is briefly described below.

If a drive signal is transmitted to the motor 1 from the control unit 16 via the motor cable 31 in order to run the motor, its main shaft 1a starts to rotate and the pole detecting magnet 2 and the magnetic recording medium 3 will cause the magnetic field to change. The resulting changes in the magnetic field are detected with the Hall device 4a as driving position data for the phases U, V and W. The MR sensor 4b will detect the changes as position data for the phases Z, A and B, the last two phases being detected as sine waves. These data signals Vu, Vv, Vw, Vz, Va and Vb (see FIG. 2) are fed into the shaping circuit 4c, where they are shaped to rectangular waves. Signals Ao and Bo of rectangular waveform are fed into the up-down counter 5, where they are counted in an ascending or descending order. The resulting counter value is fed as a 16-bit signal into the parallel-to-serial converter 6. The position data signals Uo, Vo, Wo and Zo of rectangular waveform are fed directly into the parallel-to-serial converter 6.

Figure 3:
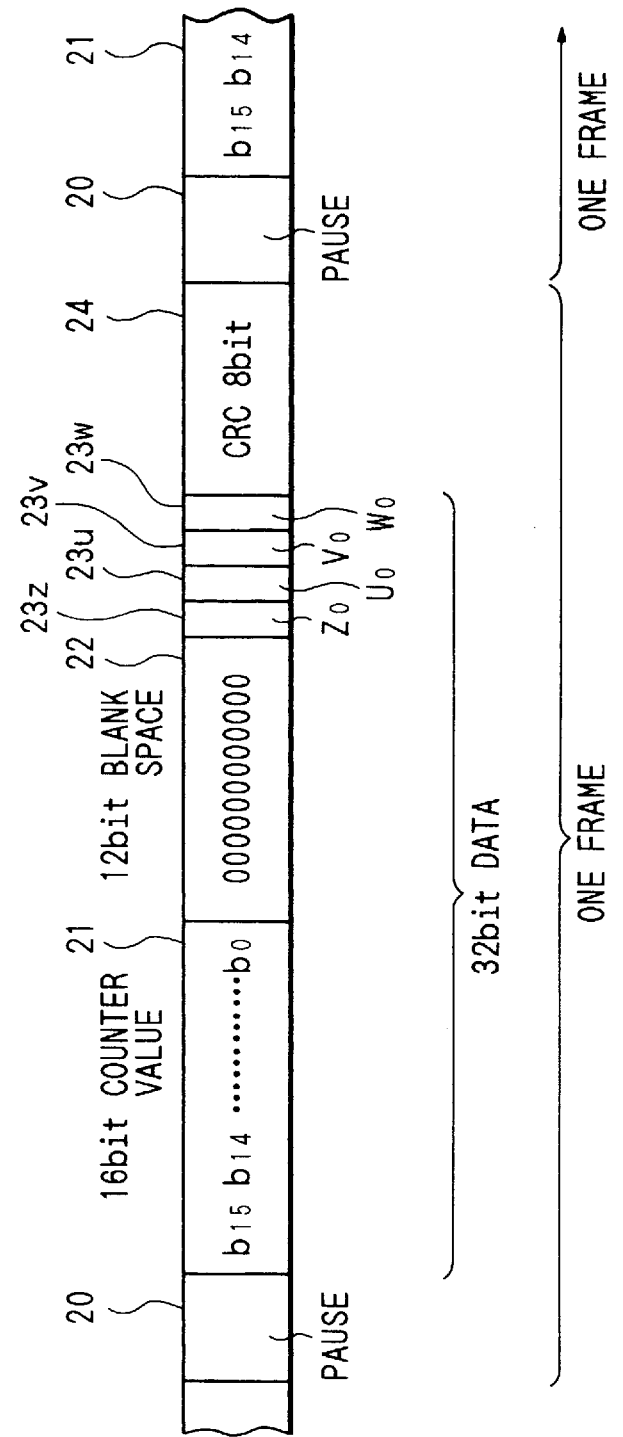
FIG. 3 shows a format of a serial signal to be transmitted from the converter circuit portion of FIG. 2.

A format of the serial signal to be transmitted from the converter 6 to the control unit 16 is shown in FIG. 3.

The format shown in FIG. 3 may typically use a Manchester code of 1 Mbps. Numeral 20 refers to a pause space that precedes the transmission of various kinds of data; 21 is a 16-bit counter value that follows the space 20 and which is transmitted from the up-down counter 5; 22 is a 12-bit blank space that follows the counter value 21; 23z, 23u, 23v and 23w are 1-bit position data signals Uo, Vo, Wo and Zo, respectively, that follow the blank space 22 and which are transmitted from the waveform shaping circuit 4c; and 24 refers to 8 CRC bits that follow the position data signals Uo, Vo, Wo and Zo and which serve to check a sequence of data. The counter value 21, blank space 22 and position data signals 23z, 23u, 23v and 23w compose a 32-bit data, whereas the pause space 20, counter value 21, blank space 22, position data signals 23z, 23u, 23v, 23w, and CRC 24 compose one frame. One frame of serial signals are transmitted repetitively to the control unit 16 via the encoder cable 9 in accordance with the detection signals as supplied from the Hall devices 4a and MR sensor 4b. These serial signals are converted to parallel signals in the serial-to-parallel converter 15 in the control unit 16 and subsequent processing is done on the basis of the resulting parallel signals (position data signals Uo, Vo, Wo and Zo, and the 16-bit counter value).

Thus, in the first embodiment, the sine waves for the two phases A and B which are delivered from the MR sensor 4b are fed into the up-down counter 5; the resulting counter value and the position data signals for the other phases (U, V, W and Z) are converted to serial signals in the parallel-to-serial converter 6 and thence transmitted to the control unit 16. As a result, the number of transmission paths that are required can be reduced to one channel and, at the same time, the thickness of the cable to be used can be reduced, thereby leading to a lower cable cost.

The foregoing description of the first embodiment assumes the case where part of the encoder cable 9 is laid within the robot's arm. Since the thickness of the encoder cable 9 is reduced, the space in the robot's arm that is conventionally occupied by the cable 9 can effectively be used for other purposes and, in addition, the arm itself can be made thinner. In the case where the cable 9 is installed outside the robot, it is less subject to constraints during reeling and other cable handling operations. Furthermore, irrespective of whether the cable 9 is within or outside the robot, the members for supporting it can be made of a comparatively simple construction and this permits greater latitude in cable design.

The first embodiment also uses the up-down counter 5 and the parallel-to-serial converter 6 is supplied with the counter value from this up-down counter 5. Hence, the transmission speed need not be raised so much as to limit the rotational speed of the motor 1.

While the first embodiment of the present invention has been described above in a specific manner, it should of course be understood that this is not the sole case of the invention and that various modifications can be made without departing from the scope and spirit of the invention. To take just one example, the up-down counter 5, parallel-to-serial converter 6, etc. may be provided outside, rather than within, the case 44 of the encoder 4. In this alternative case, the single transmission line may be extended by a distance of about 30 cm and an encoder signal processing box may be provided at the remote end of this transmission line, with the up-down counter 5, parallel-to-serial converter 6, etc. being provided within the box.

If desired, the blank space 22 in the format of the serial signals described above may be filled with an alarm signal for increased temperature within the case 44 of the encoder 4, an alarm signal for the motor 1 and the encoder 4, as well as other signals. It is also possible for the blank space 22 to be filled with information about the wattage of the output of the motor that is connected to the encoder 4 or about how many pulses of signals for phases A and B are to be generated each time the main shaft 1a rotates fully once.

The foregoing description of the first embodiment concerns the case where the position detector is applied to the arm portion of a robot. However, this is not the sole case of the present invention and the position detector is also applicable to other sites of the robot. Needless to say, the position detector of the present invention may be applicable to non-robot devices. It should also be noted that the present invention will in no way exclude the use of an optical encoder that uses a coded disk as well as a light-receiving and a light-emitting device.

The foregoing description is also directed to the case where a 16-bit up-down counter value and outputs for Z, U, V and W phases are transmitted as serial signals. It should, however, be understood that similar effects can be achieved even if the amount of change in the 16-bit the up-down counter value per unit time and outputs for Z, U, V and W phases are transmitted as serial signals. This is because summing up the amounts of change that are received by the control unit 16 will enable the up-down counter value to be regenerated within the control unit. Another advantage that can be anticipated with this alternative case is a reduction in the number of bits to be transmitted.

As described on the foregoing pages, the device for transmitting signals from the position detector according to the first embodiment of the present invention is such that sine waves for the two phases, A and B, as produced from the position detector are fed into the up-down counter and the resulting counter value or the amount of its change per unit time and the pole position detecting signals for the other phases are converted to serial signals in the converter circuit portion and thence transmitted to the control unit. As a result, the number of transmission paths that are required can be reduced to one channel and, at the same time, the thickness of the cable to be used can be reduced, thereby leading to a lower cable cost and a greater latitude in cable design.

Second and Third Embodiments

The second embodiment of the present invention is described below with reference to accompanying drawings.

The second embodiment is the same as the first embodiment except that the device for transmitting signals from a position detector transmits not only the position data but also other data to be processed. Consider, for example, a machine tool or a robot that are provided not only with a position detector for detecting the position data on the main shaft of a motor but also with various sensors for detecting other data. In the case of a forcing apparatus, the "other data" means data from a penetration sensor and in the case of apparatus that are equipped with a temperature sensor, a concentration sensor or the like, the "other data" means data from those sensors. Depending on the applicable apparatus, the "other data" are in no way limited to a single kind of data.

The data from the position detector and from various sensors are transmitted to a fairly distant control unit via a cable in which the associated transmission paths are bundled together and various processing operations are executed on the basis of those data.

Figure 4:
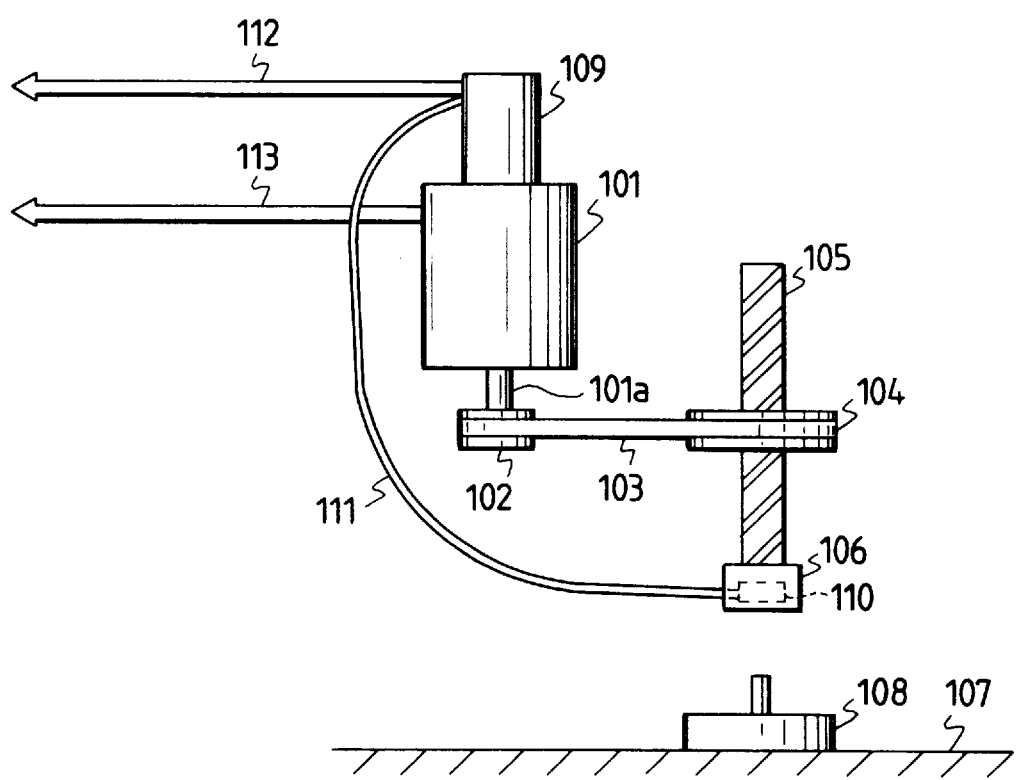
FIG. 4 is a simplified side view of a forcing apparatus that adopts a device for transmitting signals from a position detector according to the second embodiment of the present invention.

FIG. 4 is a simplified side view of a forcing apparatus that adopts a device for transmitting signals from a position detector according to the second embodiment of the present invention.

In FIG. 4, numeral 101 refers to a motor such as a brushless motor. The motor 101 has a main shaft 101a, the rotation of which is transmitted to a feed screw 105 via a motor pulley 102, a belt 103 and a load cell pulley 104, whereby a load cell 106 at the distal end of the feed screw 105 is moved up and down to exert a predetermined pressure on a work 108 placed on a working table 107.

Figure 5:
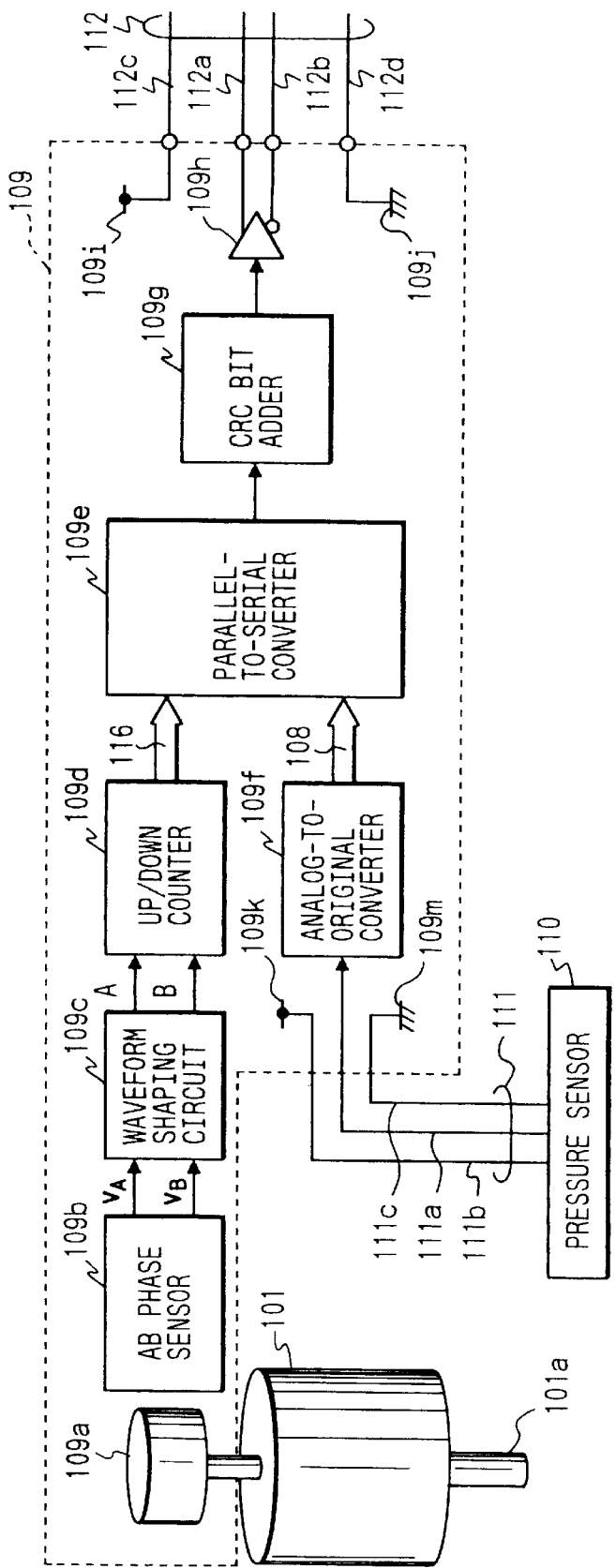
FIG. 5 shows schematically the essential part of FIG. 4.

The motor 101 is furnished with a position detector 109 such as an encoder for detecting the rotational position of the main shaft 101a, and the load cell 106 has a built-in pressure sensor 110 for measuring the pressure as it is applied to the work 108. The encoder 109 has various components as shown in FIG. 5: an A/B phase sensor 109b, for detecting the change in the magnetic field of a magnetic recording medium 109a which is provided in an end portion of the main shaft 101a; a waveform shaping circuit 109c with which the sine waves for the two phases as detected by the A/B sensor 109b are shaped to rectangular waves; a 16-bit up-down counter 109d which counts the output from the shaping circuit 109c in an ascending or descending order; an analog-to-digital converter 109f for performing analog-to-digital conversion on pressure data signals which are transmitted from the pressure sensor 110 via a transmission path 111; a parallel-to-serial converter 109e for performing parallel-to-serial conversion on the resulting digital data and the counter value; a CRC bit adder 109g for adding data checking 8 CRC bits to the resulting serial signal; and a line driver 109h for transmitting the serial signal as it carries the added CRC bits. The encoder 109 is connected to a transmission path 112 in which the serial signal is transmitted to the control unit (not shown), and the motor 101 is connected to a transmission path 113 in which the control unit transmits power for rotationally driving the main shaft 101a.

The transmission path 111 is composed of a 5 V power line 11b connected to a 5 V power supply 109k, a grounded power line 111c connected to a grounded power supply 109m, and a signal line 111a connected to the analog-to-digital converter 109f. The transmission path 112 is composed of a 5 V power line 112c connected to a 5 V power supply 109i, a grounded power line 112d connected to a grounded power supply 109j, as well as a BUS line 112a and a reverse BUS line 112b which are both connected to the line driver 109h.

The operation of the forcing apparatus that is equipped with the device for transmitting signals from the position detector having this construction is briefly described below.

If a drive signal is transmitted to the motor 101 from the control unit via the transmission path 113 in order to operate the forcing apparatus, the main shaft 101a of the motor starts to rotate and the load cell 106 descends to exert pressure on the work 108. The pressure being exerted on the load cell 106 is detected with the pressure sensor 110 and the resulting pressure data signals are transmitted to the encoder 109 via the transmission path 111 for analog-to-digital conversion. The position data for the main shaft 101a are also detected by the encoder 109, which transmits a signal that has the pressure data signal (in digital value) superposed on the resulting position data signal (the counter value).

Figure 6:
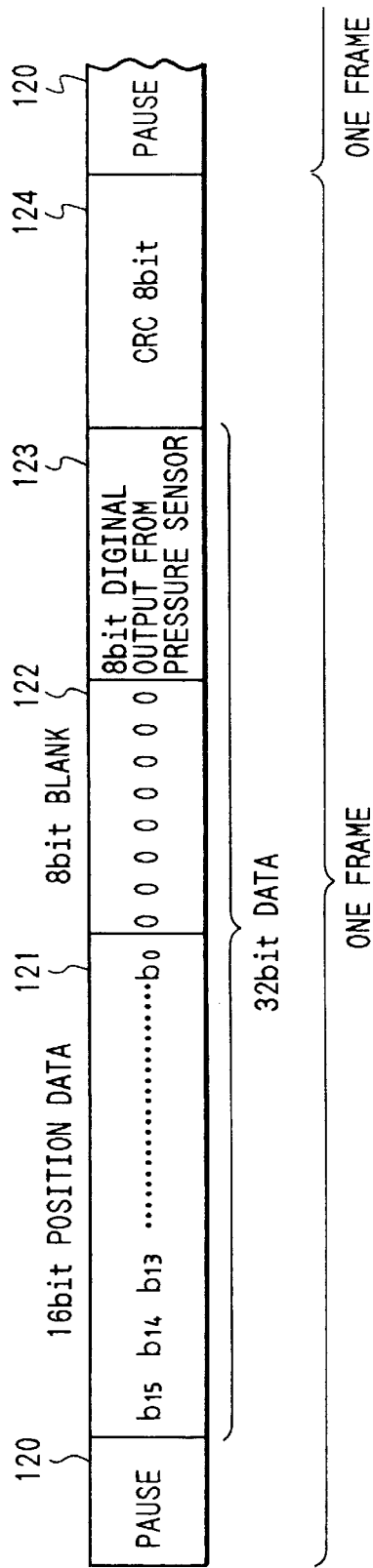
FIG. 6 shows a format of serial signals to be transmitted from the position detector in FIGS. 4 and 5.

FIG. 6 shows a format of the serial signal that has the pressure data signal and CRC bits superposed on the position data signal.

The format shown in FIG. 6 may typically use a Manchester code of 500 kbps. Numeral 120 refers to a pause space that precedes the transmission of various kinds of data; 121 is the 16-bit position data (the up-down counter value) that follows the space 120 and which has been detected with the encoder 109; 122 is an 8-bit blank space that follows the position data 121; 123 is an 8-bit pressure data that follows the blank space 122 and which is produced by digital conversion after detection with the pressure sensor 110; and 124 refers to 8 CRC bits that follow the pressure data 123 and which check the contents of data string. The position data 121, blank space 122 and pressure data 123 compose a 32-bit data, whereas the pause space 120, position data 121, blank space 122, pressure data 123 and CRC bits 124 compose one frame. One frame of serial signals are transmitted repetitively to the control unit via the transmission path 112 in accordance with the result of detection of position and pressure data. The control unit performs various processing operations on the basis of the transmitted position and pressure data.

Thus, in the second embodiment, the transmission path 111 from the pressure sensor 110 is not directly connected to the fairly remotely located control unit as in the prior art but it is connected to the encoder 109 which is located at a fairly near distance. In addition, the pressure data signal is transmitted to the control unit via the transmission path 112 from the encoder 109; hence, the number of transmission paths that are required can be reduced to one channel and, at the same time, the thickness of the cable to be used can be reduced.

Figure 7:
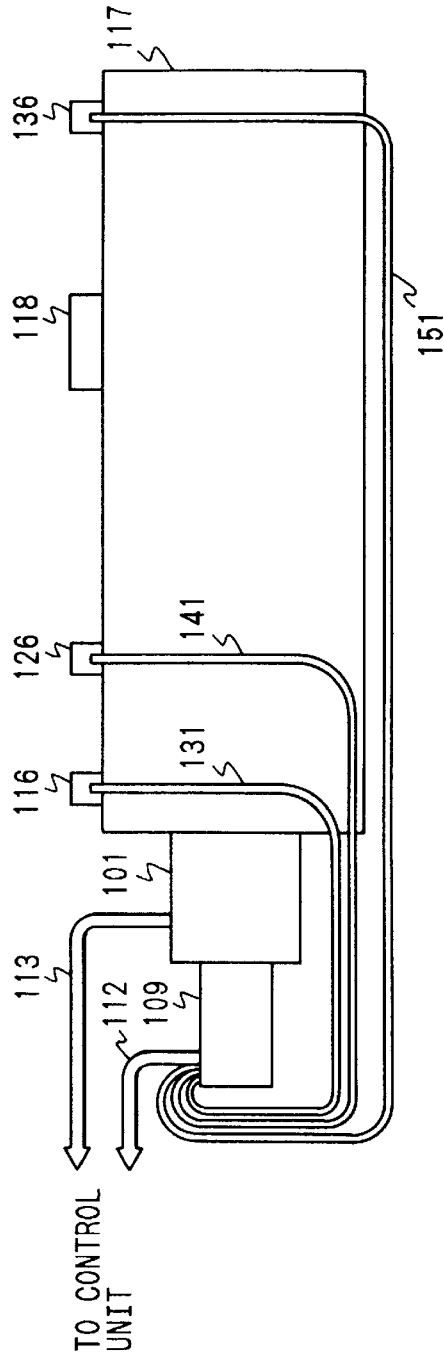
FIG. 7 is a simplified side view of a positioning apparatus that adopts a device for transmitting signals from a position detector according to the third embodiment of the present invention.
Figure 8:
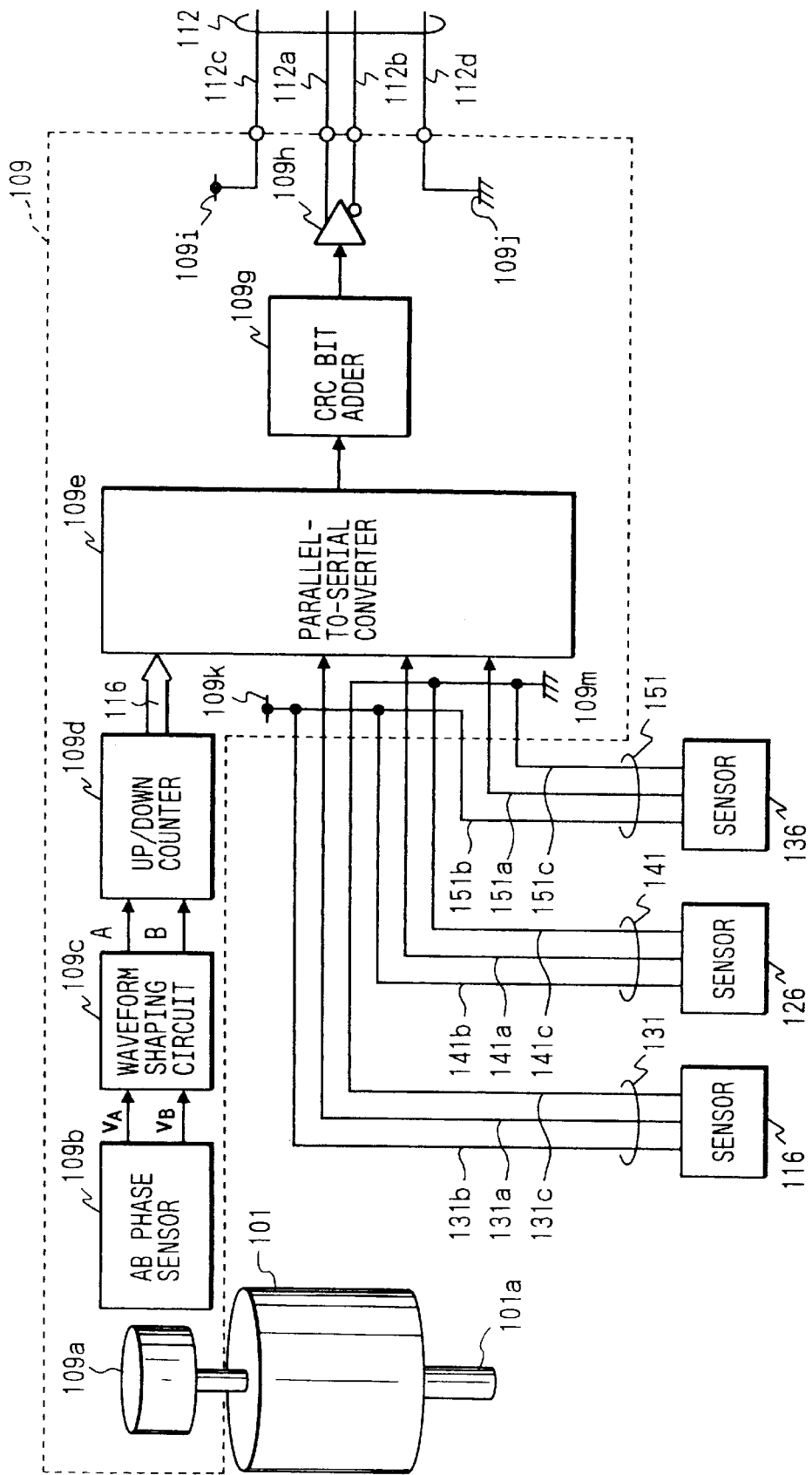
FIG. 8 shows schematically the essential part of FIG. 7.

FIG. 7 is a simplified side view of a monoaxial positioning apparatus that uses a device for transmitting signals from a position detector according to the third embodiment of the present invention. FIG. 8 shows schematically the essential part of FIG. 7 and the components that perform the same functions as those described in connection with the second embodiment are identified by like numerals and will not be described in detail.

In FIG. 7, numeral 117 refers to the main body of the machine (positioning apparatus) and it carries the following components on the top: a table 118 that can be moved on the main body 117 in either the right or left direction as seen in FIG. 7, and proximity sensors 116, 126 and 136 for detecting the state of movement of the table 118. The proximity sensors 116, 126 and 136 are connected to an encoder 109 via respective transmission paths 131, 141 and 151, so that proximity data signals as detected by the sensors 116, 126 and 136 can be transmitted to the encoder 109. The proximity data signals are digital signals and, as in the case of the second embodiment, they can be superposed on the position data signal which is detected in the encoder 109.

The transmission path 131 (or 141 or 151) is composed of a 5 V power line 131b (or 141b or 151b) connected to a 5 V power supply 109k, a grounded power line 131c (or 141c or 151c) connected to a grounded power supply 109m, and a signal line 131a (or 141a or 151a) connected to a parallel-to-serial converter 109e.

If the table 118 moving on the machine's main body 117 approaches either one of the proximity sensors 116, 126 and 136, the sensor that is approached by the table will issue an ON signal whereas the other sensors will issue an OFF signal, and these signals are transmitted to the encoder 109, which superposes these proximity data signals (logic levels) on the position data signal and transmits the resulting signal to the control unit.

Figure 9:
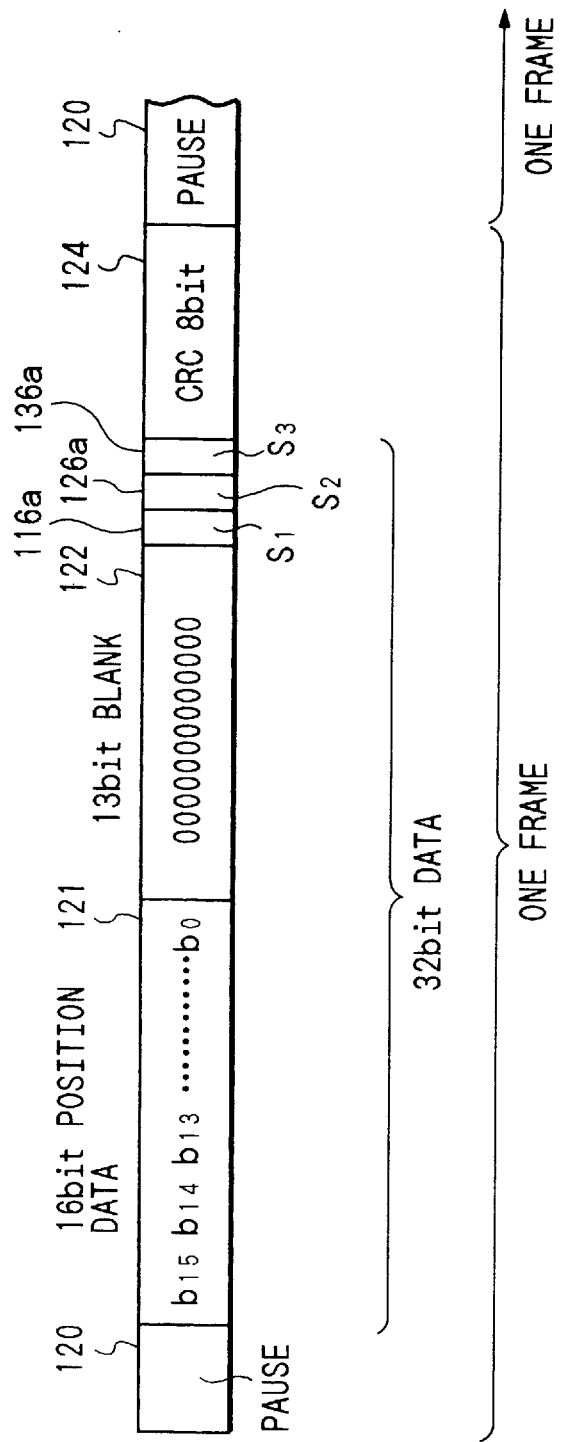
FIG. 9 shows a format of serial signals to be transmitted from the position detector in FIGS. 7 and 8.

FIG. 9 shows a format of the serial signal that has the proximity data signals and CRC bits superposed on the position data signal.

The format shown in FIG. 9 differs from what is shown in connection with the second embodiment in that the 8-bit pressure data 123 in digital form is replaced by logic levels 116a, 126a and 136a from the proximity sensors 116, 126 and 136, respectively. Each of these logic levels comprises one bit and, hence, they comprise a total of 3 bits. Therefore, to compose a 32-bit data, the number of bits in the blank space 122 of the format shown in FIG. 9 is increased from 8 to 13.

The third embodiment having the construction described above offers the same advantage as in the second embodiment; stated more specifically, the transmission paths 131, 141 and 151 from the proximity sensors 116, 126 and 136, respectively, are not directly connected to the fairly remotely located control unit as in the prior art but they are connected to the encoder 109 which is located at a fairly near distance. In addition, the proximity data signals are transmitted to the control unit via the transmission path 112 from the encoder 109; hence, the number of transmission paths that are required can be reduced to one channel and, at the same time, the thickness of the cable to be used can be reduced.

While the second and third embodiments of the present invention have been described above in a specific manner, it should of course be understood that they are not the sole cases of the invention and that various modifications can be made without departing from the scope and spirit of the invention. To take just one example, the encoder which is used as a position detector may be replaced by a resolver.

In the second embodiment, the pressure data from the pressure sensor that is located exterior to the position detector is used as different data from the position data, whereas in the third embodiment, the proximity data from the proximity sensors are used as different data from the position data. However, these are not the sole cases of the data as different from the position data and, if desired, one may use a plurality of data from other sensors that are located within or outside the position detector, such as temperature data from a temperature sensor, concentration data from a concentration sensor and gas or liquid flow-data from a flow sensor, and these data may be subjected to analog-to-digital conversion so that they can be superposed on the position data. These non-position data may or may not be physically related to the operation of the motor 101 and the only requirement that need be satisfied to insure the advantages of the present invention is that sensors for detecting date other than the position data be located within the position detector or exterior to it at a fairly near distance.

Another possibility of the data to be superposed on the position data is a classification code that tells whether the position detector in operation is a resolver or an incremental encoder or an absolute encoder, or a classification code that checks the wattage of the output of the motor on which the position detector is mounted.

The foregoing description of the second and third embodiments concerns the case where the serial signal of the 16-bit counter value is transmitted in a single channel as sensor signals are superposed on it. If necessary, the incremental signals for the two phases A and B may be directly delivered from two output channels without being fed into the counter, with the third channel outputting the serial signal composed of the origin signal (Z phase) and the pole detection signals for three phases (U, V and W). Even in this case, the intended advantages of the present invention can be assured by superposing the data from other sensors on the data in the third channel.

Alternatively, the amount of change in the 16-bit counter value per unit time may be sent as a serial signal, with the data from other sensors being superposed on that serial signal and this is also effective in achieving the advantages of the present invention.

The foregoing description of the second and third embodiments also concerns the case where the position detector is applied to a forcing apparatus and a positioning apparatus, respectively. However, the applicability of the concept of the present invention is in no way limited to those apparatus and it can, of course, be applied to various other apparatus including machine tools and robots.

As described on the foregoing pages, the device for transmitting signals from the position detector according to the second and third embodiments of the present invention is such that position data are transmitted as a serial signal to the control unit via the associated transmission path and, at the same time, data other than the position data are transmitted in superposition on this serial signal. As a result, the number of transmission paths that are required can be reduced to one channel and, at the same time, the thickness of the cable to be used can be reduced, thereby leading to a lower cable cost and a greater-latitude in cable design.

Fourth and Fifth Embodiments

The fourth and fifth embodiments of the present invention are described below with reference to accompanying drawings.

The fourth embodiment is the same as the first embodiment except that signals from a plurality of position detectors are transmitted by the signal transmitting device and subsequently processed. In a case like a robot, there often occurs the need to control more than one motor with a single control unit, as is generally depicted in FIG. 11.

Figure 11:
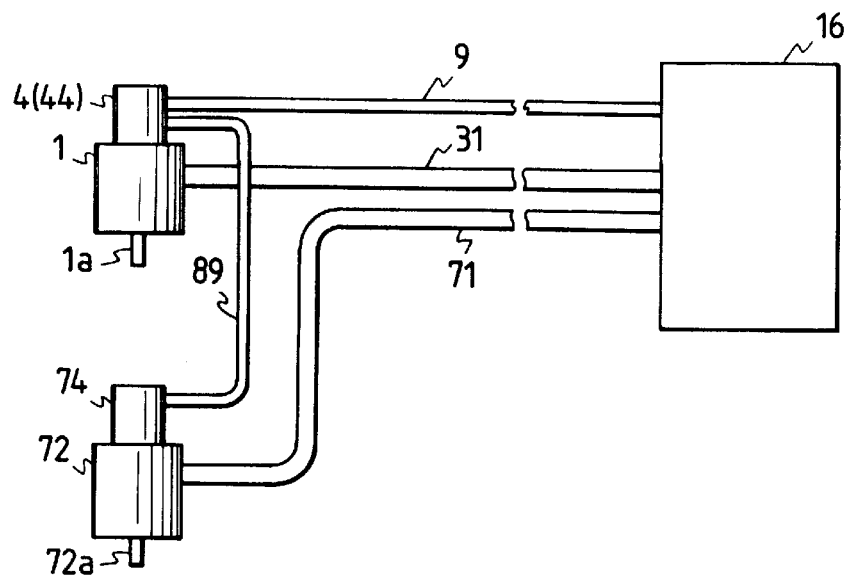
FIG. 11 shows the general layout of the signal transmitting device shown in FIG. 10.

The apparatus shown in FIG. 11 is of such a type that two motors are to be controlled with a single control unit. Numeral 1 refers to #1 motor (the suffix # designates a classification number) and 72 is #2 motor. The #1 motor 1 (or #2 motor 72) is fitted with a position detector which is typically an encoder (#1 encoder 4 for #1 motor, and #2 encoder 74 for #2 motor) for detecting the position data on the main shaft 1a (or main shaft 72a of the #2 motor 72). In response to the detected position data signals, motor drive power is supplied from a biaxial control unit 16 to the #1 motor 1 and #2 motor 72 via #1 motor cable 31 and #2 motor cable 71, respectively.

Figure 10:
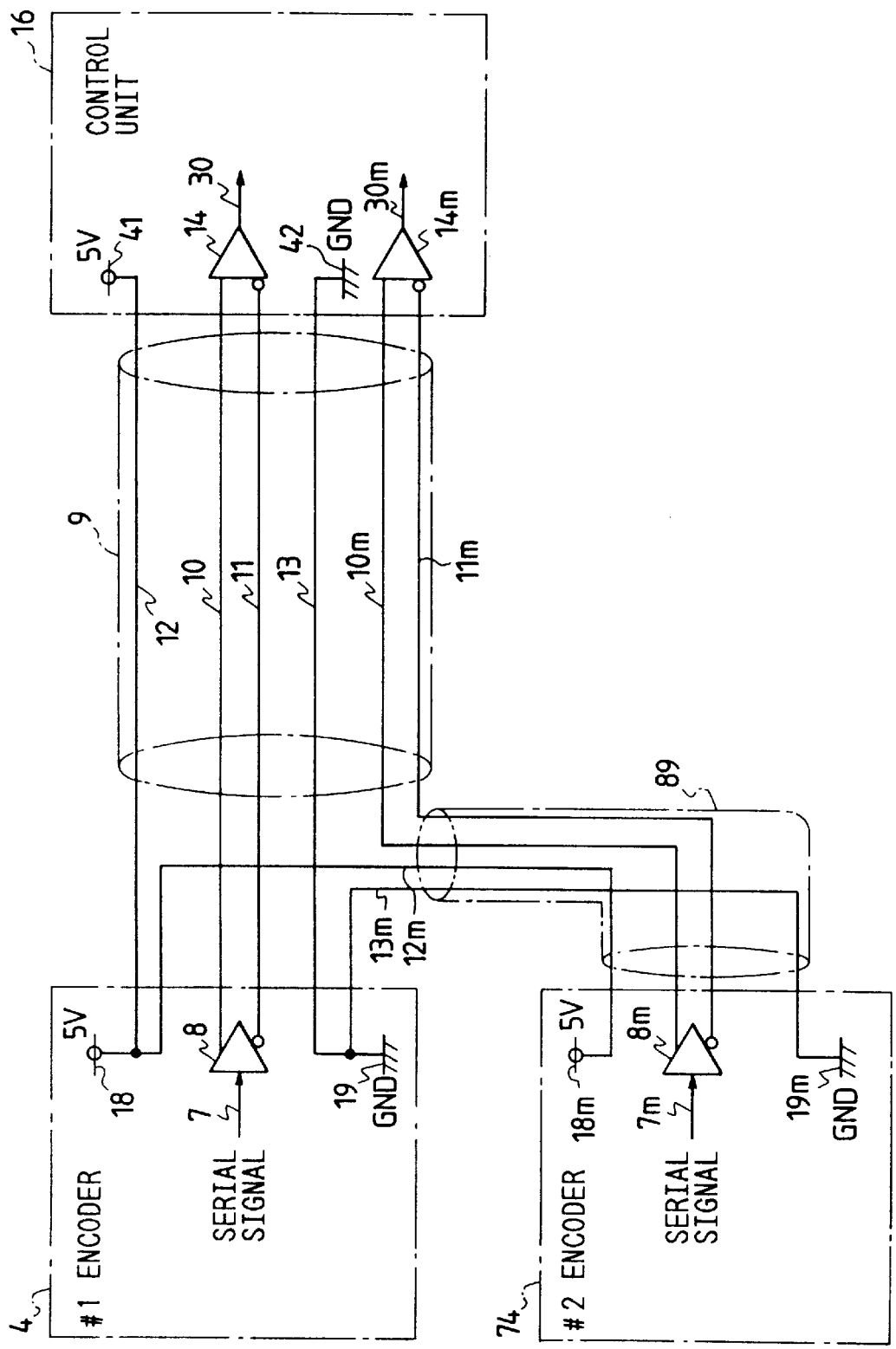
FIG. 10 shows schematically the transmission portion of a device for transmitting signals from a plurality position detectors according to the fourth embodiment of the present invention.

FIG. 10 shows schematically the transmission portion of the device for transmitting signals from the position detector in accordance with the fourth embodiment of the present invention.

In FIG. 10, numeral 8 (or 8m) refers to a line driver in the #1 encoder 4 (or #2 encoder 74) which is connected to a #1 serial signal line 7 (or 7m). The line driver 8 (or 8m) has a BUS line 14 (or 14m) and a reverse BUS line 11 (or 11m) which are connected to a line receiver 14 (or 14m) in a control unit 16. The #1 encoder 4 has a 5 V power supply 18 and a grounded power supply 19; the #2 encoder 74 has a 5 V power supply 18m and a grounded power supply 19m; and the control unit 16 has a 5 V power supply 41 and a grounded power supply 42. The 5 V power supplies 18 and 41 are connected by a 5 V power line 12; the grounded power supplies 19 and 42 are connected by a grounded power line 13; the 5 V power supplies 18 and 18m are connected by a 5 V power line 12m; and the grounded power supplies 19 and 19m are connected by a grounded power line 13m. The 5 V power line 12 and the grounded power line 13 are bundled together with the BUS lines 10 and 10m as well as with the reverse BUS lines 11 and 11m in a common transmission cable 9. The 5 V power line 12m and the ground power line 13m which are branches from the 5 V power line 12 and the grounded power line 13, respectively, in the #1 encoder 4 are bundled within a transmission communication cable 89 together with BUS line 10m and reverse BUS line 11m.

Thus, in the fourth embodiment, the single common transmission cable 9 contains not only the BUS line 10 and reverse BUS line 11 for the #1 encoder 4 but also the BUS line 10m and reverse BUS line 11m or the #2 encoder 74. In addition, the cable 9 contains the power lines (i.e., the 5 V power line 12 and the grounded power line 13) passing in common for the two encoders 4 and 74. The #1 encoder 4 is connected to the #2 encoder 74 by the 5 V power line 12m and the grounded power line 13m which are branches from the 5 V power line 12 and the grounded power line 13, respectively, in the #1 encoder 4. Hence, the 5 V and grounded power lines that have heretofore been necessary to connect the #2 encoder 74 with the control unit 16 can be omitted and, accordingly, the cable jacket for the omitted power lines becomes unnecessary, thereby leading to a lower cable cost.

Furthermore, the omission of those power lines renders the cable thinner by a corresponding amount and, accordingly, the space occupied by the cable becomes smaller. In addition, the members for supporting the bundle of signal and power lines in the cable can be made with a fairly simple construction and this contributes to a greater latitude in cable design.

The construction of other portions than the transmission portion of the apparatus under discussion, as well as its operation are described below.

Figure 12:
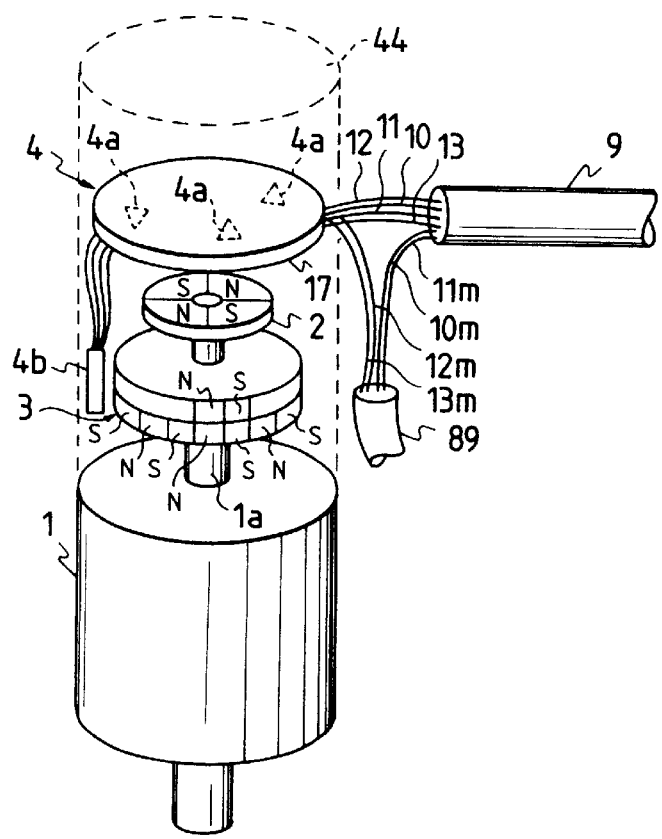
FIG. 12 is a simplified perspective view of the #1 encoder as the first position detector.
Figure 13:
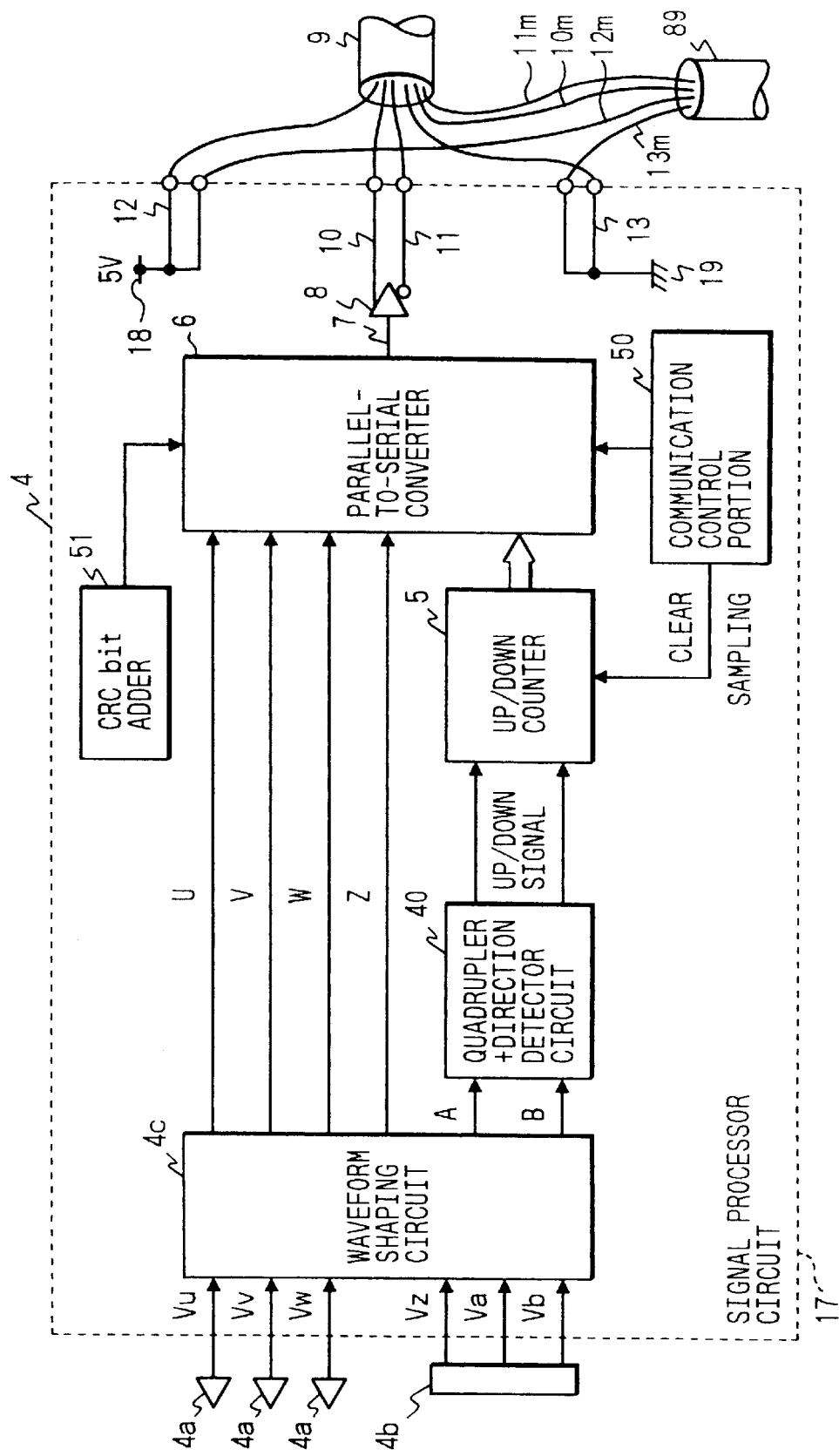
FIG. 13 shows schematically the internal construction of the #1 encoder.
Figure 14:
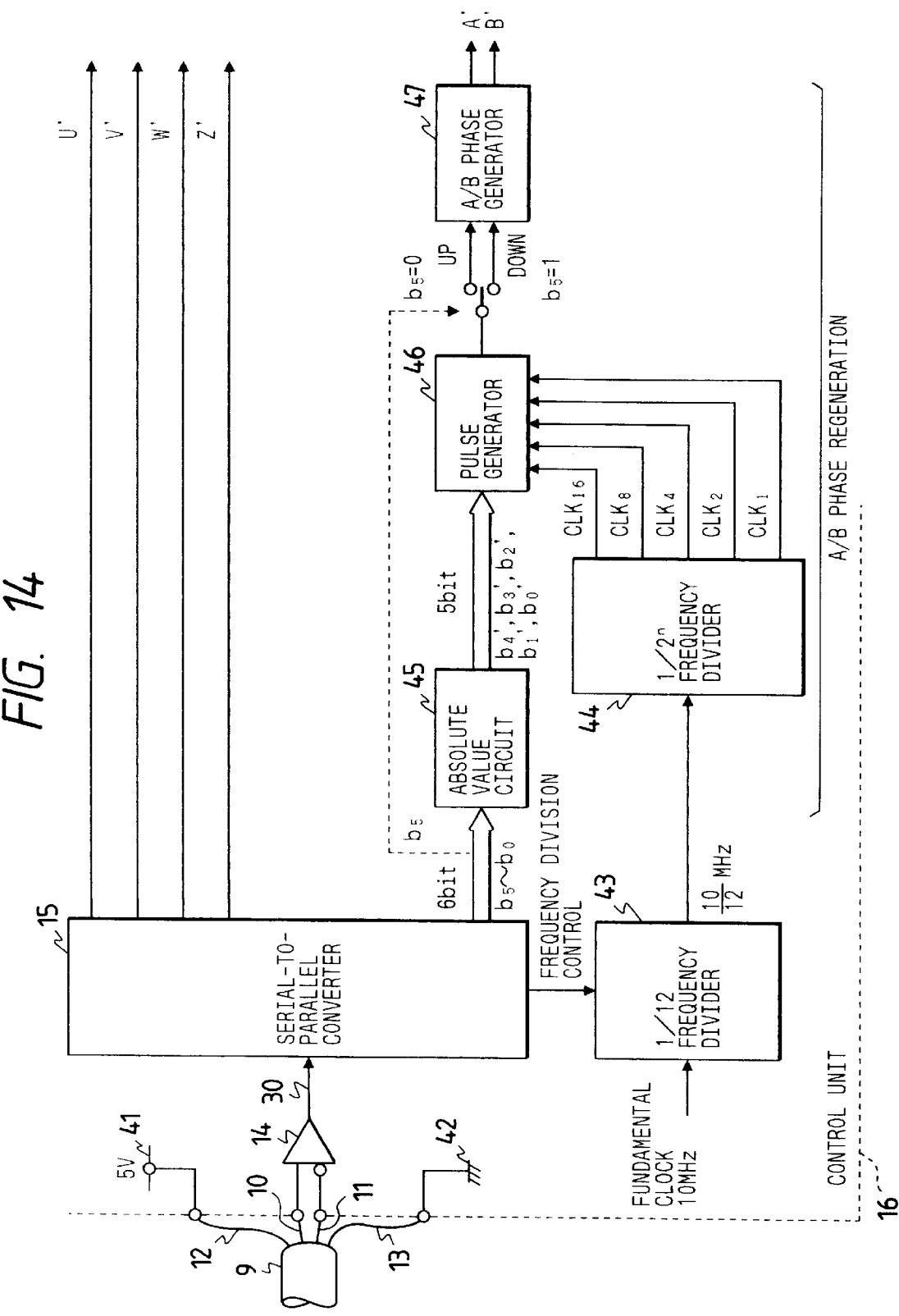
FIG. 14 shows schematically the part of the control unit which is connected to the #1 encoder.

FIG. 12 is a simplified perspective view of the #1 encoder 4 as the first position detector; FIG. 13 shows schematically the internal construction of the #1 encoder 4; and FIG. 14 shows schematically the part of the control unit 16 which is connected to the #1 encoder 4. FIGS. 12 to 14 will come out in a completely identical fashion whether they show the #1 encoder 4 or #2 encoder 74. Therefore, to avoid redundancy, those figures and the associated explanation will not be directed to the #2 encoder 74 but they concern only the #1 encoder 4. In the following description, the components that are identical to those which are described in connection with the first embodiment by reference to FIG. 1 are identified by like numerals and will not be discussed in detail.

Figure 16:
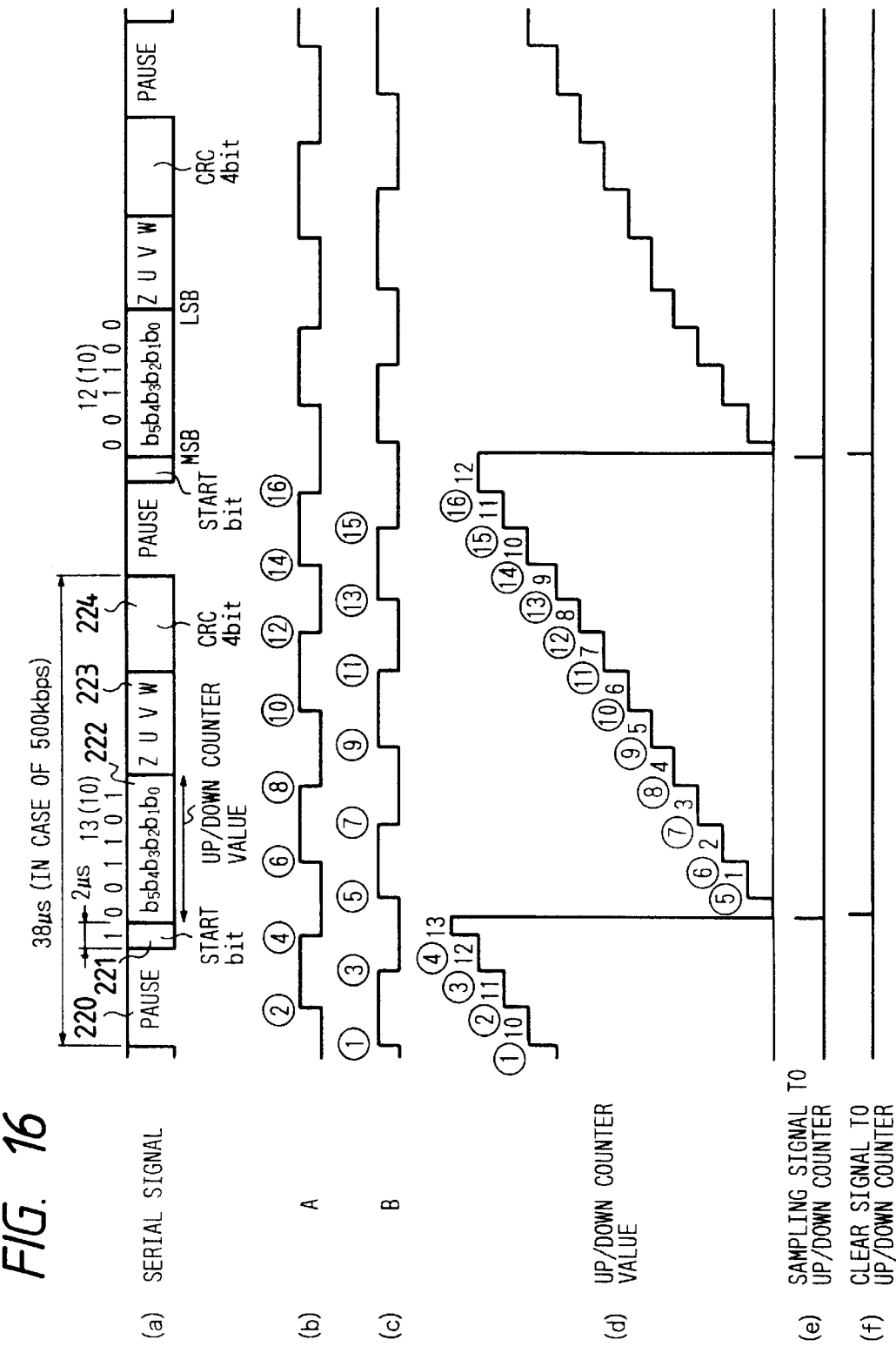
FIG. 16 is a timing chart for illustrating the operation of the circuitry shown in FIG. 13.

If drive power is applied to the motor 1 from the control unit 16 via the motor cable 31 in order to run the motor, its main shaft 1a starts to rotate and the pole detecting magnet 2 and the magnetic recording medium 3 will cause the magnetic field to change. The resulting changes in the magnetic field are detected with the Hall devices 4a as driving position data for phases U, V and W. The MR sensor 4a will detect the changes as position data for phases Z, A and B, the last two phases being detected as sine waves. These data signals Vu, Vv, Vw, Vz, Va and Vb (see FIG. 13) are fed into the shaping circuit 4c, where they are shaped to rectangular waves. The resulting shaped signals for phases A and B are shown in FIGS. 16(b) and 16(c). Such rectangular shaped signals (incremental signals) A and B are then fed into a quadrupled pulse generator/direction detector circuit 40, where they are converted to quadrupled pulses-and up-down signals, which are both supplied into a 6-bit up-down counter 5 for counting in an ascending or descending order.

Figure 18:
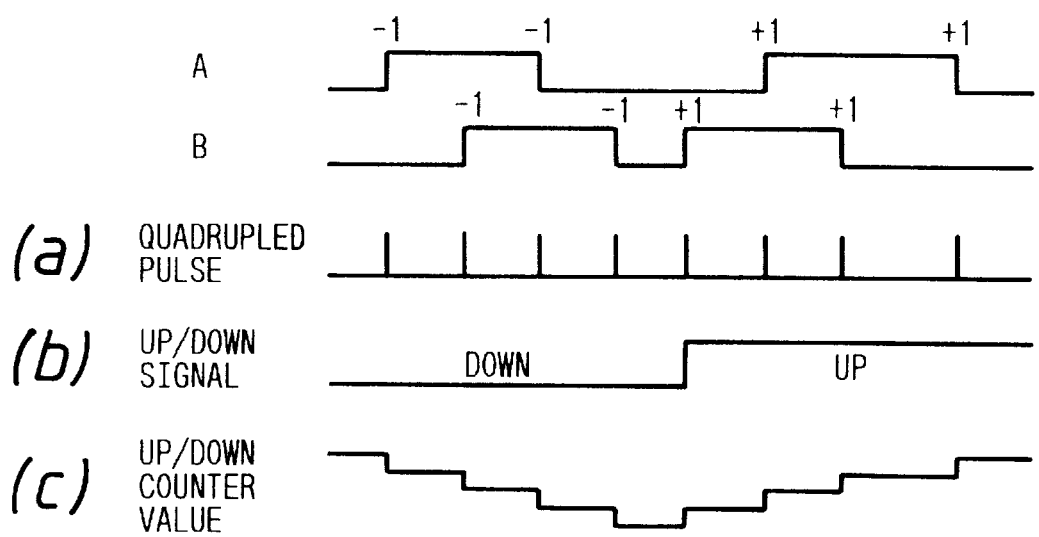
FIG. 18 is a timing chart illustrating an example of the operation of a quadrupled pulse generator/direction detector circuit and an up-down counter.

An example of the operation of the quadrupled pulse generator/direction detector circuit 40 and the up-down counter 5 is illustrated in FIG. 18.

As FIG. 18 shows, a quadrupled pulse (a) is generated in synchronism with the edge of signal A or B (when a shift from one signal to the other occurs), whereas an up-down signal (b) is generated in such a way that it indicates the direction of the counting mode in accordance with the phase lead or lag of signals A and B—if the phase of signal B leads, the up-down signal commands counting in an ascending direction and if the phase of signal A leads, the same signal commands counting in a descending direction. Hence, the counter value (c) of the up-down counter will count stepwise in accordance with the quadrupled pulse (a) and the up-down signal (b).

In the fourth embodiment under consideration, the up-down counter 5 is adapted to sample its value at given time intervals in response to a SAMPLING signal from a communication control portion 50 (see FIG. 16(e)). When the sampled counter value is loaded in the parallel-to-serial converter 6, the counter will clear its value in response to a CLEAR signal from the communication control portion 50 (see FIG. 16(f)). In the fourth embodiment, the phase of signal B leads at all times compared to the phase of signal A and, hence, the value of up-down counter 5 will come out as shown in FIG. 16(d).

The values of up-down counter 5 are fed into the parallel-to-serial converter 6 as a 6-bit signal $b_0$–$b_5$; on the other hand, the rectangular shaped position data signals U, V, W and Z are directly fed into the parallel-to-serial converter 6.

In the value of up-down counter 5, $b_5$ is designated the MSB and $b_0$ the LSB and these bits are so set that if the phase of signal B leads, $b_5$ is equal to zero while $b_5$ is equal to one if the phase of signal A leads.

The numerals encircled in FIGS. 16(b) and 16(c) are keyed to the encircled numerals in FIG. 16(d). In other words, the points of change in signal A (FIG. 16(b)) or B (FIG. 16(c)) correspond to the changes in the values of up-down counter 5.

The numerals not encircled in FIG. 16(d) refer to the values of up-down counter 5.

The reason for designing the up-down counter 5 to produce 6-bit counts is set forth below.

Assume here that the serial signal as produced from the parallel-to-serial converter 6 has a propagation velocity of 500 kbps and also assume that the serial signal has a format as shown in FIG. 16(a). Then, the sampling of one frame will take 38 µs. If it is assumed that phases A and B will produce 2048 pulses for every rotation of the main shaft 1a which can rotate up to 5000 rpm, the frequency of quadrupled pulses is given by:

5000(rpm)/60(sec)×2048(pulses)×(multiplication factor)= 682.7(kHz)

Since the sampling period is 38 µs (see above), the number of pulses that can be generated in that period is given by:

682.7(kHz)×38(µs)=25.9(pulses)/period

Since $25.9 < 31 = 2^5 - 1$, one may conclude that 6 bits will suffice for the values of the up-down counter 5 in consideration of the direction of the counting mode.

The 6-bit value of the up-down counter and the position data signals U, V, W and Z are supplied into the parallel-to-serial converter 6, where they are converted to serial signals. Thus, the parallel-to-serial converter 6 will send out serial signals of a format of the type that is shown in FIG. 16(a).

As already mentioned, the format shown in FIG. 16(a) assumes a transmission velocity of 500 kbps and a sampling period of 38 µs per frame.

Numeral 220 in FIG. 16(a) refers to a pause space that precedes the transmission of various kinds of data; 221 is a START bit that follows the space 220 and which informs the start of data transmission; 222 is a 6-bit counter value that follows the START bit 221 and which is transmitted from the up-down counter 5; 223 refers to position data signals for U, V, W and Z that follow the counter value 222 and which are transmitted from the waveform shaping circuit 4c; and 224 refers to 4 CRC bits that follow the U, V, W and Z position data signals and which will check a sequence of data (for any errors). The CRC bits 224 are to be added to data signals in response to a signal from an error detecting CRC bit adder 51. The pause space 220, START bit 221, counter value 222, position data signals 223 and CRC bits 224 compose one frame. The code that is used in the format may be a Manchester code.

One frame of the serial signals thus produced are repetitively transmitted to the control unit 16 via the line driver 8 and encoder cable 9 as the data to be transmitted are updated in accordance with the detection signals from the Hall devices 4a and the MR sensor 4b.

The serial signals of interest are transmitted through the encoder cable 9 and received by the line receiver 14 in the control unit 16. These serial signals are converted back to parallel signals in the serial-to-parallel converter 15, producing data at the point of time when the occurrence of CRC bits 224 is verified, namely, at the timing shown in FIG. 17(g).

The position data U', V', W' and Z' for U, V, W and Z phases in a parallel form are forwarded as such for subsequent processing; on the other hand, the 6-bit counter values are fed into an absolute-value circuit 45 (see FIG. 14), where decision is made as to whether each counter value is positive or negative on the basis of the value of $b_5$. The criterion for the decision is such that the counter value is found to be positive if $b_5 = 0$ and it is found to be negative if $b_5 = 1$. In the case of $b_5 = 1$, the circuit 45 performs calculation for $100000(2) - b_4 b_3 b_2 b_1 b_0 (2)$ and the result is produced as an output from the circuit 45. The output of the circuit 45 consists of 5 bits and is encoded as $b_4' b_3' b_2' b_1' b_0'$. In the above calculation formula, the figures in parentheses represent the radix of a number system at issue and (2) means a number in binary notation.

We next describe a 1/12 frequency divider which is shown by 43 in FIG. 14. According to the calculation of the number of bits that are required for the up-down counter 5, generating up to 26 pulses within 38 µs will suffice for a pulse generator 46 at a subsequent stage. However, in the fourth embodiment under consideration, a clock that is capable of generating 31 pulses within 38 µs is necessary in order to reduce the jitter in the signals for phases A and B (for details, see below). Stated more specifically, the frequency of the necessary clock is expressed by:

31(pulses)/38(µs)=815.8(kHz)

If the fundamental clock has a frequency of 10 MHz, the required number of frequency divisions to produce the necessary clock is given by:

10(MHz)/815.8(kHz)=12.3(divisions)

This is the reason why the 1/12 frequency divider 43 is used in the fourth embodiment.

However, the output of this 1/12 frequency divider 43, namely, the generation of 31 pulses at a clock frequency of 10/12 MHz does not coincide exactly with 38 µs, so a RESET signal corresponding to one frame of serial signals is received from the serial-to-parallel converter 15 in order to make both ends meet. The RESET signal thus received is shown in FIG. 17(h). After the 31st (thirty-first) pulse has been generated at a clock frequency of 10/12 MHz as shown in FIG. 17(i), the 1/12 frequency divider 43 is reset to a stop and its reset condition is cleared at the timing of data establishment which is shown in FIG. 17(g). Therefore, every pulse is generated at an interval of 1.2 μs and the interval between the 31st pulse and the first pulse of the next cycle is 2.0 μs.

The frequency divided signals for 31 pulses are fed into a $1/2^n$ frequency divider 44, where they are divided into five pulse trains having different pulse densities. For the concepts of the $1/2^n$ frequency divider 44 and a pulse generator 46 to be described just below, see pages 154 to 157 of "Digital Kairo—Kiso to Oyo—(Digital Circuits—Basics and Applications—)", Hiroshi Kawaharada, Oct. 15, 1982, Shokodo Publishing Company. According to the theory of pulse distribution by the MIT technique, the clock of 10/12 MHz is distributed into five clocks shown in FIGS. 17(j) to 17(n); CLK16 has odd-numbered pulses; CLK 8 has pulses which are divided by 4 to yield the remainder 2; CLK 4 has pulses which are divided by 8 to yield the remainder 4; CLK 2 has pulses which are divided by 16 to yield the remainder 8; and CLK 1 has pulses which are divided by 32 to yield the remainder 16.

The clocks CLK 16, CLK 8, CLK 4, CLK 2 and CLK 1, as well as the output signal $b_4'b_3'b_2'b_1'b_0'$ from the absolute value circuit 45 are fed into the pulse generator 46.

Figure 15:
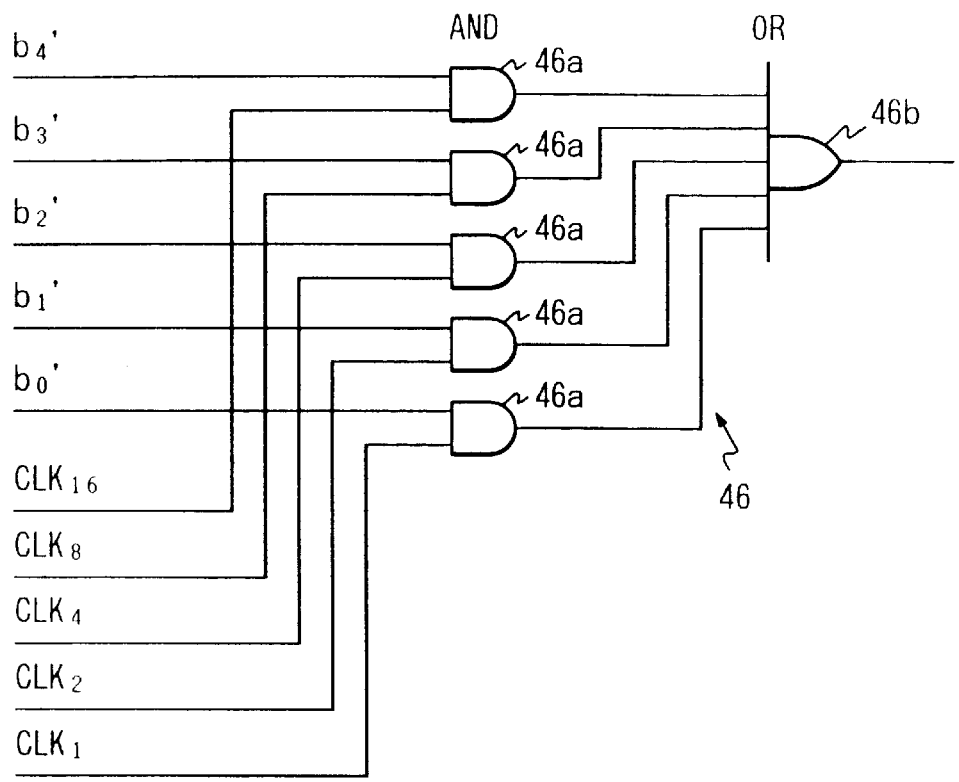
FIG. 15 shows schematically the construction of a pulse generator.

The pulse generator 46 is composed of AND circuits 46a and an OR circuit 46b as shown in FIG. 15 and, depending upon the contents of the signal $b_4'b_3'b_2'b_1'b_0'$, the generator 46 selects CLK 16, CLK 8, CLK 4, CLK 2 or CLK 1 so as to output a logical sum. If $b_4'b_3'b_2'b_1'b_0'$ is 01101(2) as identified in the center of the description in FIG. 17(o), CLK 8, CLK 4 and CLK 1 are selected; namely, pulses 2, 4, 6, 10, 12, 14, 16, 18, 20, 22, 26, 28 and 30 at a clock frequency of 10/12 MHz are selected and summed up to produce pulses as shown in FIG. 17(p). As is clear from FIG. 17(p), the output pulses are spaced substantially uniformly to reduce the occurrence of jitter. Hence, an A/B phase generator circuit 47 to be described just below will produce outputs A' and B' that are low in jitter content.

The pulse train shown in FIG. 17(p) is fed into the A/B phase generator circuit 47, which regenerates incremental signals A' and B'.

The A/B phase generator circuit 47 is so adapted that it will switch the output of the pulse generator 46 to either an UP or DOWN input depending upon the value of $b_5$ in the 6-bit counter value as transmitted from the serial-to-parallel converter 15. Stated more specifically, the output from the pulse generator 46 is switched to an UP input when $b_5=0$ and to a DOWN input when $b_5=1$. Rectangular waves for the two phases A and B are generated in such a way that the phase of signal B will lead when one pulse is added to the output from the pulse generator 46; in response to an UP input, the circuit 47 will cause the phase of signal B to lead and in response to a DOWN input, the phase of signal A is caused to lead. Output signals from the A/B phase generator circuit 47 are shown in FIGS. 17(q) and 17(r), respectively; obviously, the phase of signal B leads the phase of signal A.

Edges indicated by (1), (2), . . . in FIGS. 16(b) and 16(c) correspond to edges indicated by (1), (2), . . . in FIGS. 17(q) and 17(r) and, obviously, time lags have developed. This is due either to the delay in serial transmission or to the wait for data establishment but the actual time difference is only 64 μs, which is not any big problem as a delay in the transmission of signals for phases A and B. This transmission delay can be further reduced by increasing the transmission velocity from 500 kbps to 1 Mbps.

In the fourth embodiment, the sine waves for the two phases A and B which are delivered from the MR sensor 4b are fed into the up-down counter 5; the resulting counter value and the position data signals for the other phases (U, V, W and Z) are converted to serial signals in the parallel-to-serial converter 6 and thence transmitted to the control unit 16. As a result, the number of transmission paths that are required can be minimized to one channel and, furthermore, the power lines for the second encoder and the corresponding cable jacket can be omitted, whereby the thickness of the cable to be used can be reduced, leading to a lower cable cost.

Figure 19:
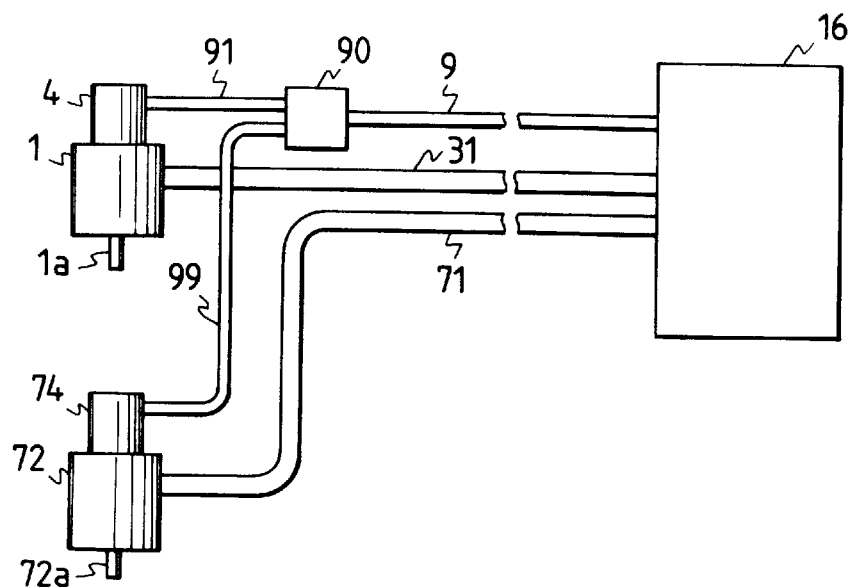
FIG. 19 shows the general layout of a device for transmitting signals from a plurality of position detectors according to the fifth embodiment of the present invention.

FIG. 19 shows the general layout of a device for transmitting signals from a position detector according to the fifth embodiment of the present invention and the components that are identical to those which are already described in connection with the fourth embodiment are identified by like numerals and will not be discussed any further.

The signal transmitting device of the fifth embodiment differs from that of the fourth embodiment in that the 5 V power line 12 and the grounded power line 13 are branched in a relay means 90 provided in the vicinity of the #1 encoder 4 and that this relay means is connected to the #1 encoder 4 by a #1 encoder cable 91 that contains in it a BUS line 10, a reverse BUS line 11, the 5 V power line 12 and the grounded power line 13 whereas the relay means is connected to the #2 encoder 74 by a #2 encoder cable 99 that contains in it a BUS line 10m, a reverse BUS line 11m, a 5 V power line 12m and a grounded power line 13m.

Needless to say, the fifth embodiment having this construction will exhibit the same advantages as the fourth embodiment.

In this connection, it should be mentioned that the relay means 90 is desirably located closer to either of the two encoders so as to shorten the cable length between the relay means 90 and each encoder.

While the fourth and fifth embodiments of the present invention have been described above in a specific manner, it should of course be understood that they are not the sole cases of the invention and that various modifications can be made without departing from the scope and spirit of the invention. To take just one example, the 5 V power line 12 and the grounded power line 13 are used in common to both encoders but it should be noted that the intended advantages of the present invention can effectively be achieved even if only one of the power lines is used in common to both encoders.

If an absolute encoder is to be used, a backup power supply is generally provided as a means to cope with power failure. If desired, a backup power line connected to this backup power supply may be used in common to both absolute encoders. In this case, all power lines, i.e., the 5 V power line, the grounded power line and the backup power line, may be used in common or other combinations may be used in common. The only requirement that need be satisfied to insure the advantages of the present invention is that at least one of the power lines be used in common to both encoders.

In the fourth and fifth embodiments, the #1 encoder 4 or the #2 encoder 74 need not be directly connected to the #1 motor 1 or the #2 motor 72 and, instead, they may separately be mounted on the apparatus at issue.

The concept of the present invention is also applicable to an apparatus of the type that transmits signals through fiber optics. If desired, the encoders may be replaced by resolvers.

The foregoing description of the fourth and fifth embodiments concerns the case where two motors are controlled by a single control unit. Needless to say, the concept of the present invention is also applicable to the case of controlling three or more motors by a single control unit.

As described on the foregoing pages, the fourth and fifth embodiments of the present invention are such that at least one of the power lines is used in common to a plurality of position detectors and such common power lines and other lines (signal lines) are pulled into a single transmission cable. Therefore, the number of power lines which is equivalent to the number of position detectors minus one can be omitted and, accordingly, the cable jacket for the omitted power lines becomes unnecessary, thereby leading to a lower cable cost. Furthermore, the omission of those power lines renders the cable thinner by a corresponding amount and, accordingly, the space occupied by the cable becomes smaller. In addition, the members for supporting the bundle of signal lines in the cable can be made with a fairly simple construction and this contributes to a greater latitude in cable design.

Sixth and Seventh Embodiments

The sixth embodiment of the present invention is described below with reference to accompanying drawings.

The sixth embodiment relates to a method of transmitting signals from the position detector or detectors as used in the first to the fifth embodiments. An example of the position detector that can be used is an encoder.

A simplified perspective view of the device for transmitting signals from the encoder is the same as FIG. 1 which was used in describing the first embodiment and, hence, the sixth embodiment under consideration is described below with reference to FIG. 1 using the same numerals.

Figure 20:
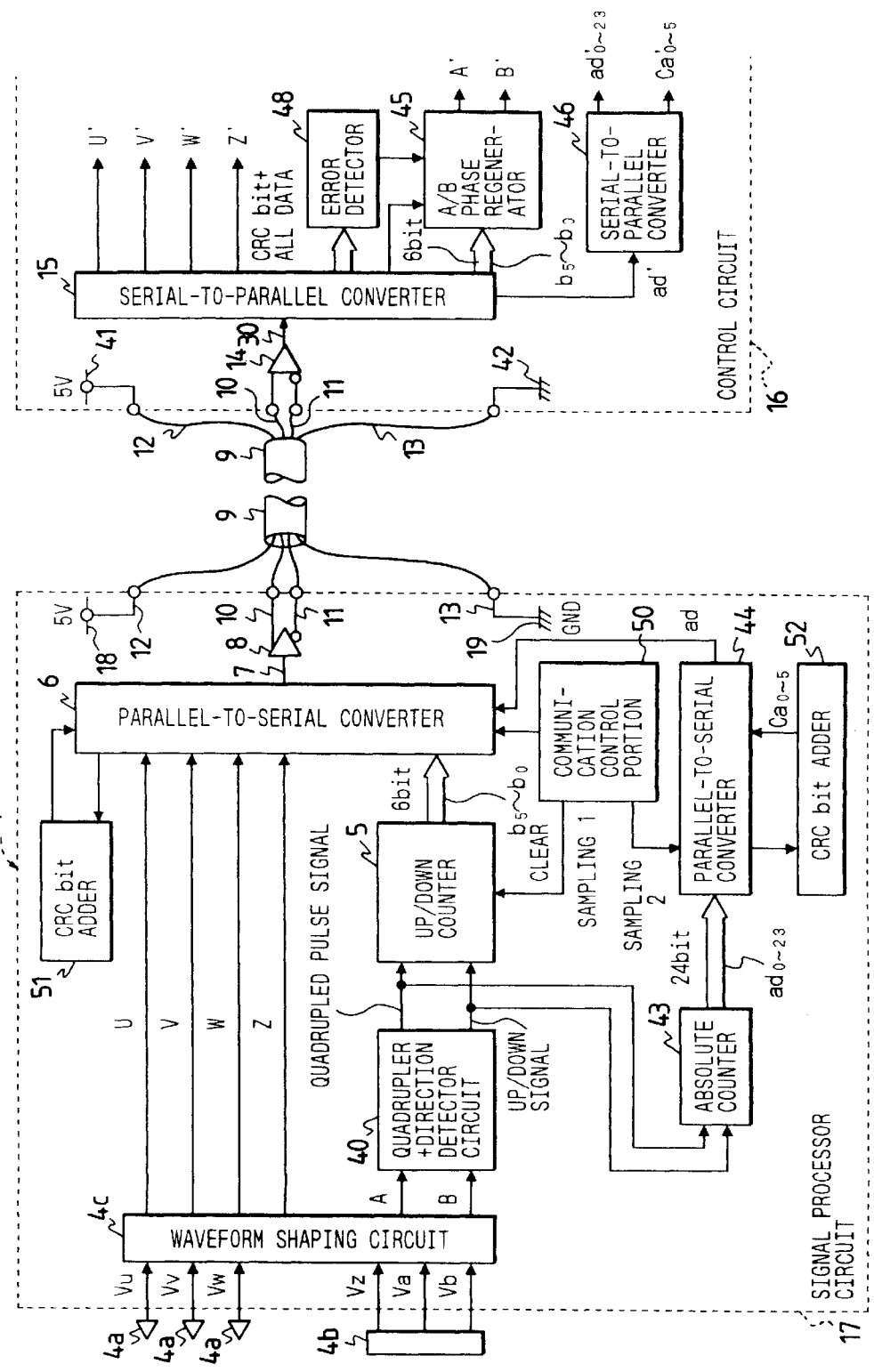
FIG. 20 shows schematically a device for transmitting encoder signals by the transmission method of the seventh embodiment of the present invention.

FIG. 20 is a schematic representation of FIG. 1. The signal transmitting device shown in FIG. 20 may typically be installed in the arm position of a robot.

In FIG. 1, numeral 1 refers to a motor such as a brushless motor. The motor 1 has a main shaft 1a and a disk of pole detecting magnet 2 is provided above an end face of the main shaft 1a. The magnet 2 is magnetized in such a way that N and S poles alternate around the circumference and it will send out driving position data in association with phases U, V and W. A disk of magnetic recording medium 3 is also provided above an end face of the main shaft 1a but in a position closer to the main shaft than the pole detecting magnet 2 is. The medium 3 consists of an upper portion and a lower portion; the upper portion is magnetized in such a way that two poles, one being N and the other S, are juxtaposed on the circumference whereas the lower portion is magnetized in such a way that N and S poles alternate around the circumference in phase with the N and poles on the circumference of the upper portion. Having this construction, the magnetic recording medium 3 will send out position data in association with phases Z, A and B.

The motor 1 is furnished with an encoder 4 as the position detector for detecting position data in association with phases A, B, Z, U, V and W, as well as the absolute position data for the motor. The encoder 4 is enclosed in a case 44 (which is delineated with a dashed line for the sake of clarity of the drawing), and Hall devices 4a and an MR sensor 4b are encased in positions that face the magnetized areas of the pole detecting magnet 2 and the magnetic recording medium 3, respectively. The Hall devices 4a are mounted on the reverse face of the base of a signal processor circuit 17 to be described below which is composed of a waveform shaping circuit 4c, a quadrupler/direction detector circuit 40, an up-down counter 5, a parallel-to-serial converter 6, a communication control portion 50, an absolute counter, a parallel-to-serial converter 44 associated with the absolute counter 43, CRC bit adders 51 and 52, a line driver 8, a 5 V power supply 18 and a grounded power supply 19. As shown in FIG. 20, the output lines of Hall devices 4a and MR sensor 4b are connected to the waveform shaping circuit 4c for shaping to rectangular waves. Output lines for phases A and B from the shaping circuit 4c are connected to the quadrupler/direction detector circuit 40 for conversion to quadrupled pulses and an up-down signal. The output lines of the circuit 40 and an output line of the communication control portion 50 that sends out command signals for clearing and sampling are connected to the 6-bit up-down counter 5 which counts in an ascending or descending order depending upon the lead or lag of the phase of signal A or B. The output line of the up-down counter 5 is connected to the parallel-to-serial converter 6, and the output lines for the other phases (Z, U, V and W) are directly connected to the parallel-to-serial converter 6.

The output lines of the quadrupler/direction detector circuit 40 are also connected to the 24-bit absolute counter 43. The output line of this absolute counter 43 and an output line of the communication control portion 50 are connected to a parallel-to-serial converter 44 associated with the absolute counter 43. The output line of the parallel-to-serial converter 44 is connected to the parallel-to-serial converter 6. Also connected to the parallel-to-serial converter 6 is the output line of the error detecting CRC bit adder 51.

A serial signal line 7 from the parallel-to-serial converter 6 is connected to the line driver 8.

A BUS line 10 and a reverse BUS line 11 from the line driver 8 are connected to a line receiver 14 within a control unit 16. The signal processor circuit 17 is furnished with the 5 V power supply 18 and the grounded power supply 19, whereas the control unit 16 is furnished with a 5 V power supply 41 and a grounded power supply 42. The two 5 V power supplies 18 and 41 are connected by a 5 V power line 12, and the two grounded power supplies 19 and 42 are connected by a grounded power line 13. The 5 V power line 12 and the grounded power line 13 are bundled within an encoder cable 9 together with the BUS line 10 and reverse BUS line 11. The encoder cable 9 is supported by appropriate members (not shown).

The output line from the line receiver 14 in the control unit 16 is connected to a serial-to-parallel converter 15 via a serial signal line 30 so that position data for the Z, U, V and W phases, the up-down counter value, the absolute counter value and the error detecting CRC bits will be delivered in a parallel manner from the converter 15. The output line from the serial-to parallel converter 15 which is associated with the up-down counter value is connected to an A/B phase regenerator 45; all output lines associated with the position data for Z, U, V and W phases, the counter values and the CRC bits are connected to an error detector 48; and the absolute counter value is connected to a serial-to-parallel converter 46.

As shown in FIG. 1, the control unit 16 is connected to the motor 1 via a motor cable 31 so that the motor 1 can be driven with the control unit 16.

The device under consideration is equipped with a backup power supply for coping with power failure but this is omitted from FIG. 20 for the sake of clarity.

The operation of the signal transmitting device having this construction is briefly described below.

If drive power is supplied to the motor 1 from the control unit 16 via the motor cable 31 in order to run the motor, its main shaft 1a starts to rotate and the pole detecting magnet 2 and the magnetic recording medium 3 will cause the magnetic field to change. The resulting changes in the magnetic field are detected with the Hall devices 4a as driving position data for the U, V and W phases. The MR sensor 4b will detect the changes as position data for the Z, A and B phases, the last two phases being detected as sine waves. These data signals Vu, Vv, Vw, Vz, Va and Vb (see FIG. 20) are fed into the shaping circuit 4c, where they are shaped to rectangular waves. Signals A and B of rectangular waveform are converted to quadrupled pulses and an up-down signal in the quadrupler/direction detector circuit 40. The resulting quadrupled pulses and up-down signal are fed into the 6-bit up-down counter 5, where they are counted in an ascending or descending order.

In the sixth embodiment, the up-down counter 5 is so adapted that it will sample the counter value at given time intervals in accordance with a sampling signal from the communication control portion 50. When the sampled counter value is loaded in the parallel-to serial converter 6, the up-down counter 5 will clear the counter value in accordance with a CLEAR signal from the communication control portion 50. Hence, the sampled counter value is proportional to the amount by which the motor rotates within a given time period.

The counter value is fed as a 6-bit signal $b_0$–$b_5$ into the parallel-to-serial converter 6, whereas the rectangular shaped position data signals U, V, W and Z are directly fed into the parallel-to-serial converter 6.

The quadrupled pulses and the up-down signal which have been produced in the circuit 40 are also fed into the absolute counter 43, where the counter value is sampled in accordance with a sampling signal from the communication control portion 50. The counter value from the absolute counter 43 is fed as a 24-bit signal $ad_0$–$ad_{23}$ into the parallel-to-serial converter 44 associated with this absolute counter and a serial signal ad of the format shown in FIG. 21(c) will be sent out of the parallel-to-serial converter 44.

Figure 21:
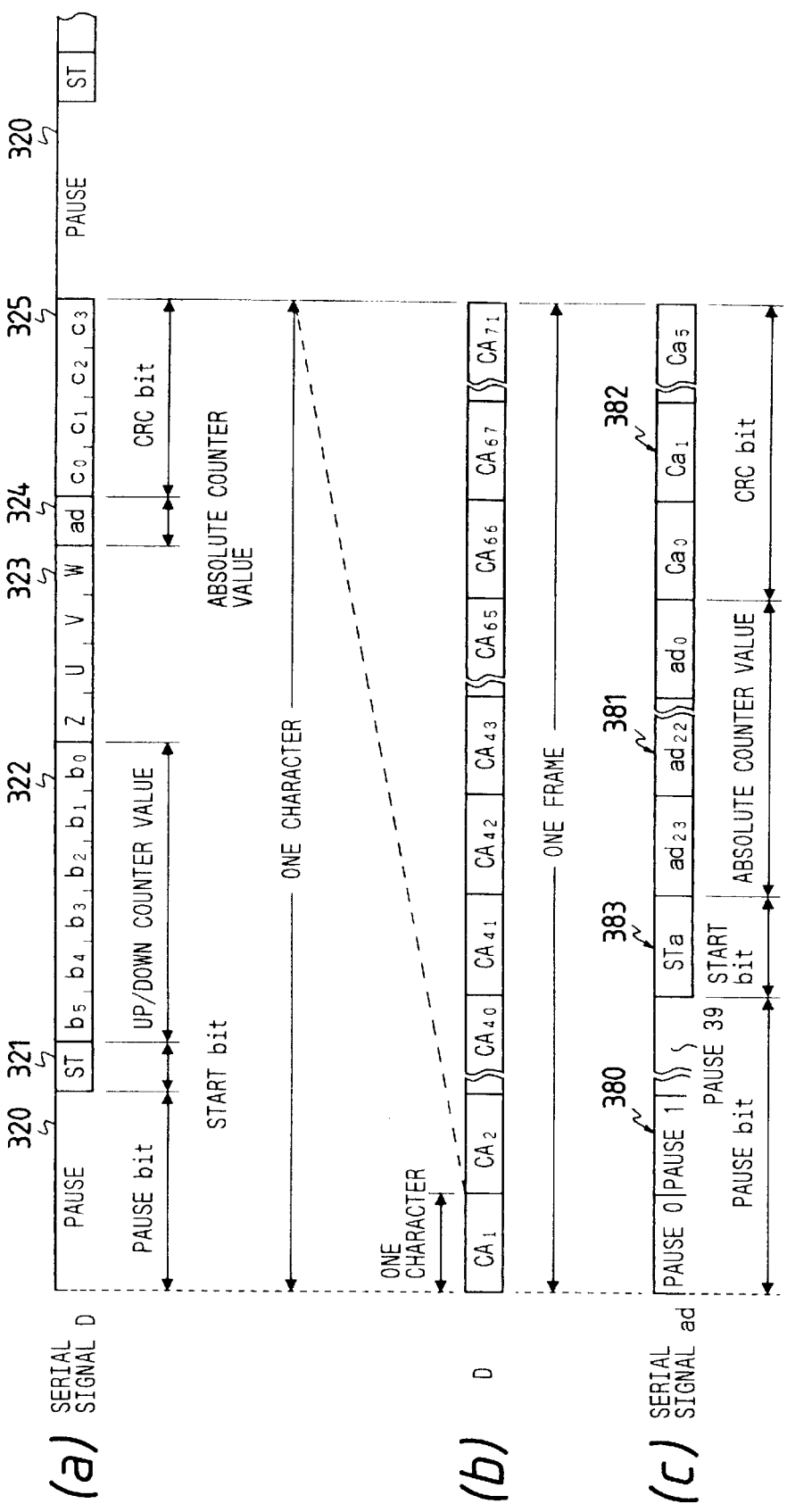
FIG. 21 illustrates a format of the serial signals to be transmitted in the sixth embodiment.

In FIG. 21(c), numeral 380 refers to a pause space that precedes data transmission, 383 is a START bit that follows the space 380 and which informs the start of signal transmission, 381 is a 24-bit absolute counter value that follows the START bit 383 and which is to be transmitted from the absolute counter 43, and 382 refers to 6 CRC bits that follow the absolute counter value 381 and which will check a sequence of data (for any errors). One frame of the serial signal ad is composed of 70 bits.

The CRC bits 382 are to be added to data signals in response to a signal from the error checking CRC bit adder 52.

The serial signal ad is fed to the parallel-to-serial converter 6 together with the 6-bit up-down counter value and the position data signals U, V, W and Z.

The up-down counter value, the position data signals U, V, W and Z, as well as the absolute counter value ad are subjected to parallel-to-serial conversion in the converter 6, which then sends out a serial signal D of the format shown in FIG. 21(a).

In FIG. 21(a), numeral 320 refers to a pause space that precedes the transmission of various kinds of data, 321 is a START bit that follows the space 320 and which informs the start of signal transmission, 322 is a 6-bit up-down counter value that follows the START bit 321 and which is to be transmitted from the up-down counter 5, 323 refers to U, V, W and Z position data signals that follow the counter value 322 and which are transmitted from the waveform shaping circuit 4c, 324 is an absolute counter value ad (see FIG. 21(c)) that follows the U, V, W and Z position data signals 323 and which is transmitted from the parallel-to-serial converter 44, and 325 refers to 4 CRC bits that will check a sequence of data (for any errors). The CRC bits 325 are so adapted that they will be added to data signals in response to a signal from the error detecting CRC bit adder 51. The pause space 320, START bit 321, up-down counter value 322, position data signals 323, absolute counter value ad 324 and CRC bits 325 compose one character. The code that is used in the format may be a Manchester code.

One character of the serial signals thus produced are repetitively transmitted to the control unit 16 via the line driver 8 and encoder cable 9 as the data to be transmitted are updated in accordance with the detection signals from the Hall devices 4a and the MR sensor 4b (see FIG. 21(b)). As already mentioned, these signals are obtained by sampling at given time intervals in accordance with the sampling and CLEAR signals as supplied from the communication control portion 50. Hence, the amount of signals that have to be handled is markedly reduced compared to the prior art and this is effective not only in reducing the storage capacity but also in shortening the signal transmission time.

The serial signals under consideration are transmitted through the encoder cable 9 and received by the line receiver 14 in the control unit 16. These serial signals are converted back to parallel signals in the serial-to-parallel converter 15. The position data U', V', W' and Z' for phases U, V, W and Z in parallel form are forwarded as such for subsequent processing; on the other hand, the 6-bit up-down counter values are fed into the A/B phase regenerator 45, where position signals A' and B' are regenerated. The absolute counter value ad is fed into the serial-to-parallel converter 46, where it is converted to a parallel 24-bit absolute counter value $ad'_0$–$ad_{23}$.

The error detector 48 is capable of detecting any errors that may be contained in the CRC bits 325 being transmitted.

In FIG. 2C, the regenerated signals are marked with an apostrophe as in A', B', U', V', W', Z' and ad' and this is added to make clear that the regenerated signals are delayed in transmission compared to the initial signals A, B, U, V, W, Z and ad.

Thus, in the sixth embodiment, the position data are converted to serial signals and the output of the absolute counter 43 is also converted to a serial signal, which is superposed on the serial signals for the position data, and the resulting serial signal is transmitted to the control unit 16 over a single channel of transmission path 9. As a result, the number of transmission paths that are required can be minimized and, at the same time, the thickness of the cable to be used can be reduced, thereby leading to a lower cable cost.

The foregoing description of the sixth embodiment assumes the case where part of the encoder cable 9 is laid within the robot's arm. Since the thickness of the encoder cable 9 is reduced, the space in the robot's arm that is conventionally occupied by the cable 9 can effectively be used for other purposes and, in addition, the arm itself can be made thinner. In the case where the cable 9 is installed outside the robot, it is less subject to constraints during reeling and other cable handling operations. Irrespective of whether the cable 9 is within or outside the robot, the members for supporting it can be made with a comparatively simple construction and this permits greater latitude in cable design.

Figure 22:
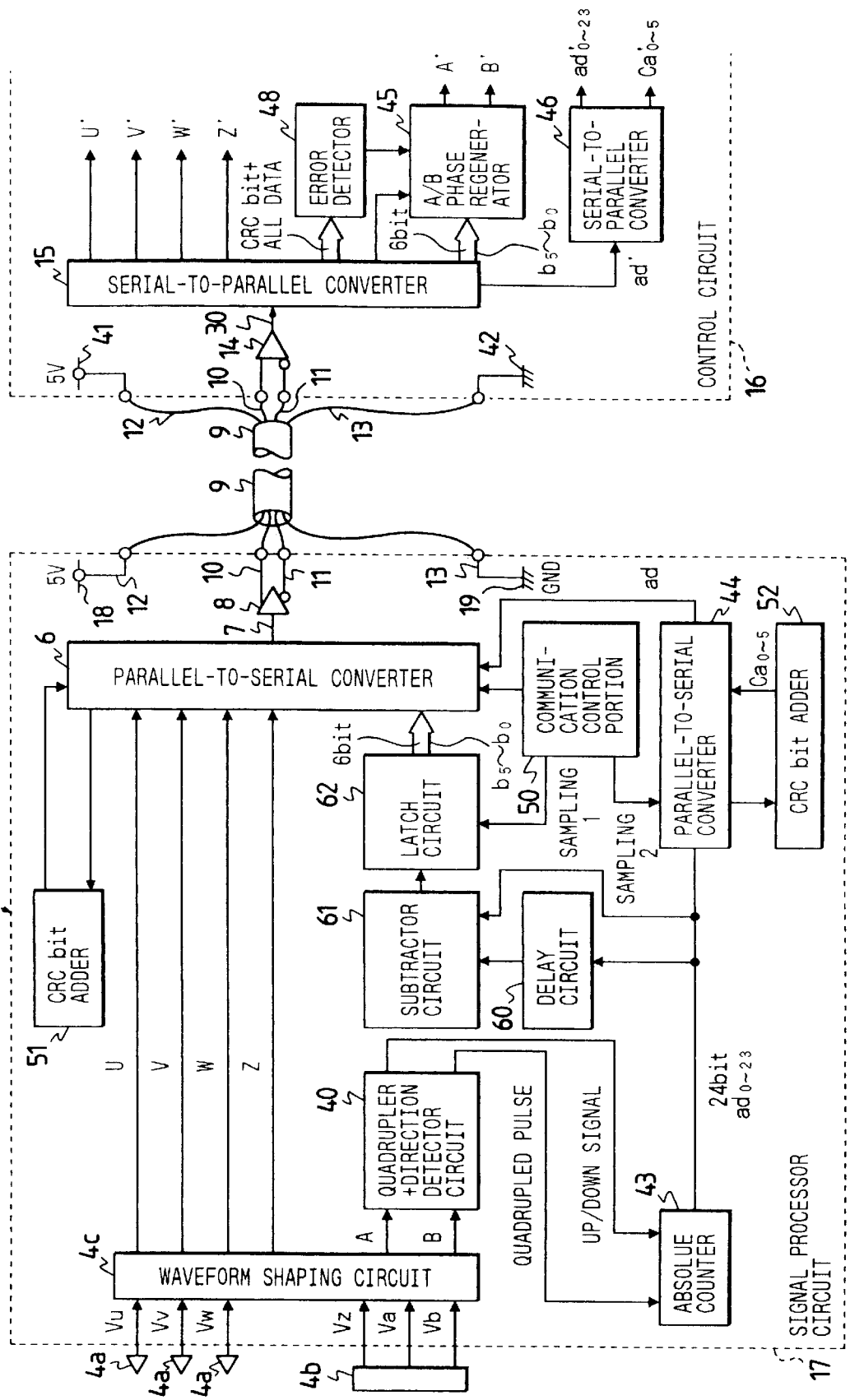
FIG. 22 shows schematically a device for transmitting encoder signals by the transmission method of the seventh embodiment of the present invention.

FIG. 22 shows schematically a signal transmitting device that adopts the method of transmitting signals from an encoder (position detector) according to the seventh embodiment of the present invention. The components that are identical to those which are described in connection with the sixth embodiment are identified by like numerals and will be described in detail.

The signal transmitting device employing the transmission method of the seventh embodiment differs from that of the sixth embodiment in that the up-down counter 5 is replaced by a delay circuit 60 for delaying the time period of sampling 1, a subtractor circuit 61 and a latch circuit 62 for latching only the low-order 6 bits; because of this modification, the difference in the output of the absolute counter 43 will produce a position signal for phase A or B.

Needless to say, the seventh embodiment is capable of achieving the same advantages as the already discussed sixth embodiment.

While the sixth and seventh embodiments of the present invention have been described above in a specific manner, it should of course be understood that they are not the sole cases of the invention and that various modifications can be made without departing from the scope and spirit of the invention. To take just one example, the encoder 4 is mounted in direct contact with the motor 1 in the sixth and seventh embodiments but it may be provided separately from the motor. If desired, the transmission path may be formed of fiber optics.

The foregoing description of the sixth and seventh embodiments concerns the case where signals for phases U, V, W and Z are transmitted as they are superposed on the serial signals; if desired, however, the two phases A and B and the absolute counter value may only be transmitted by the above-described method and this mode is also contemplated by the present invention.

The foregoing description of the sixth and seventh embodiments also concerns the case where the position detector is applied to the arm portion of a robot. However, this is not the sole case of the present invention and the position detector is also applicable to other sites of the robot. Needless to say, the position detector of the present invention may be applicable to non-robot devices.

As described on the foregoing pages, the sixth and seventh embodiments of the present invention are such that the position data are converted to serial signals and the output of the absolute counter is also converted to a serial signal, which is superposed on the serial signals for the position data, and the resulting serial signal is transmitted to the control unit over single channel of transmission path. As a result, the number of transmission paths that are required can be minimized and, at the same time, the thickness of the cable to be used can be reduced, thereby leading to a lower cable cost.

Eighth to Thirteenth Embodiments

The eighth embodiment of the present invention is described below with reference to accompanying drawings. In the following description of the eighth embodiment, the term "incremental signal" is used and it means information that helps check for the increase or decrease in the number of changing points by direct counting.

A simplified perspective view of the device for transmitting signals from a position detector is the same as FIG. 1 which was used in describing the first embodiment and, hence, the eighth embodiment under consideration is described below with reference to FIG. 1 using the same numerals.

In FIG. 1, numeral 1 refers to a motor such as a brushless motor. The motor 1 has a main shaft 1*a* and a disk of pole detecting magnet 2 is provided above an end face of the main shaft 1*a*. The magnet 2 is magnetized in such a way that N and S poles alternate around the circumference and it will send out driving position data in association with phases U, V and W. A disk of magnetic recording medium 3 is also provided above an end face of the main shaft 1*a* but in a position closer to the main shaft than the pole detecting magnet 2 is. The medium 3 consists of an upper portion and a lower portion; the upper portion is magnetized in such a way that two poles, one being N and the other S, are juxtaposed on the circumference whereas the lower portion is magnetized in such a way that N and S poles alternate around the circumference in phase with the N and S poles on the circumference of the upper portion. Having this construction, the magnetic recording medium 3 will send out position data in association with phases Z, A and B.

Figure 23:
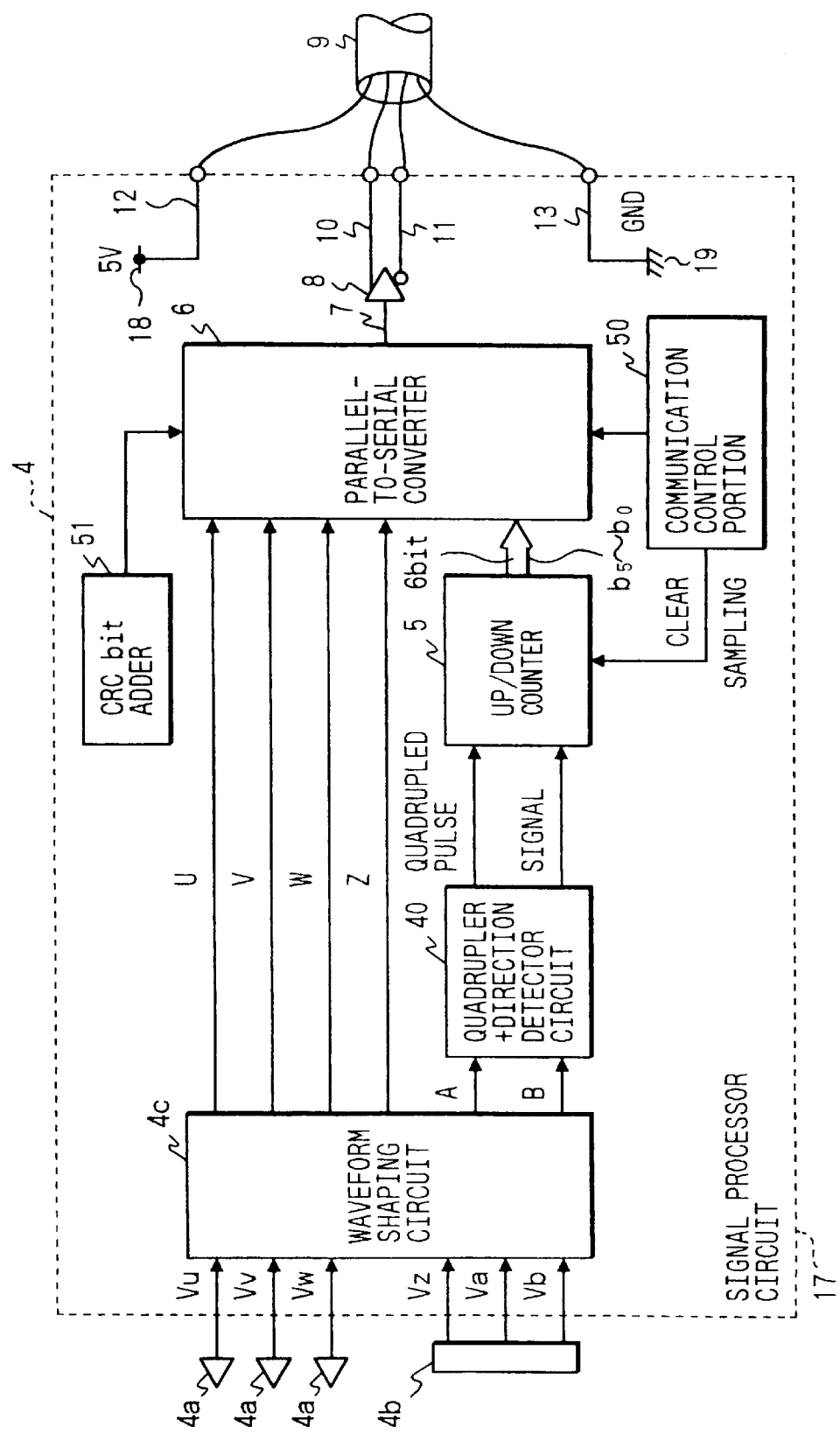
FIG. 23 shows schematically the construction of the encoder from which incremental signals are transmitted with a signal transmission device by the method of the eighth embodiment of the present invention.

The motor 1 is furnished with a position detector 4 such as an encoder for detecting position data in association with phases A, B, Z, U, V and W. The encoder 4 is enclosed in a case 44 (which is delineated with a dashed line for the sake of clarity of the drawing), and Hall devices 4*a* and an MR sensor 4*b* are encased in positions that face the magnetized areas of the pole detecting magnet 2 and the magnetic recording medium 3, respectively. The Hall devices 4*a* are mounted on the reverse face of the base of a signal processor circuit 17 to be described below which is composed of a waveform shaping circuit 4*c*, a quadrupler/direction detector circuit 40, an up-down counter 5, a parallel-to-serial converter 6, a communication control portion 50, a CRC bit adder 51, a line driver 8, a 5 V power supply 18 and a grounded power supply 19. As shown in FIG. 23, the output lines of Hall devices 4*a* and MR sensor 4*b* are connected to the waveform shaping circuit 4*c* for shaping to rectangular waves. Output lines for phases A and B from the shaping circuit 4*c* are connected to the quadrupler/direction detector circuit 40 for conversion to quadrupled pulses and an up-down signal. The output lines of the circuit 40 and an output line of the communication control portion 50 that sends out command signals for clearing and sampling are connected to the 6-bit counter 5 which counts in an ascending or descending order depending upon the lead or lag of the phase of signal A or B. The output line of the up-down counter 5 is connected to the parallel-to-serial converter 6, and the output lines for the other phases (Z, U, V and W) are directly connected to the parallel-to-serial converter 6. Also connected to the parallel-to-serial converter 6 is the output line of the error detecting CRC bit adder 51. A serial signal line 7 from the parallel-to-serial converter 6 is connected to the line driver 8.

Figure 24:
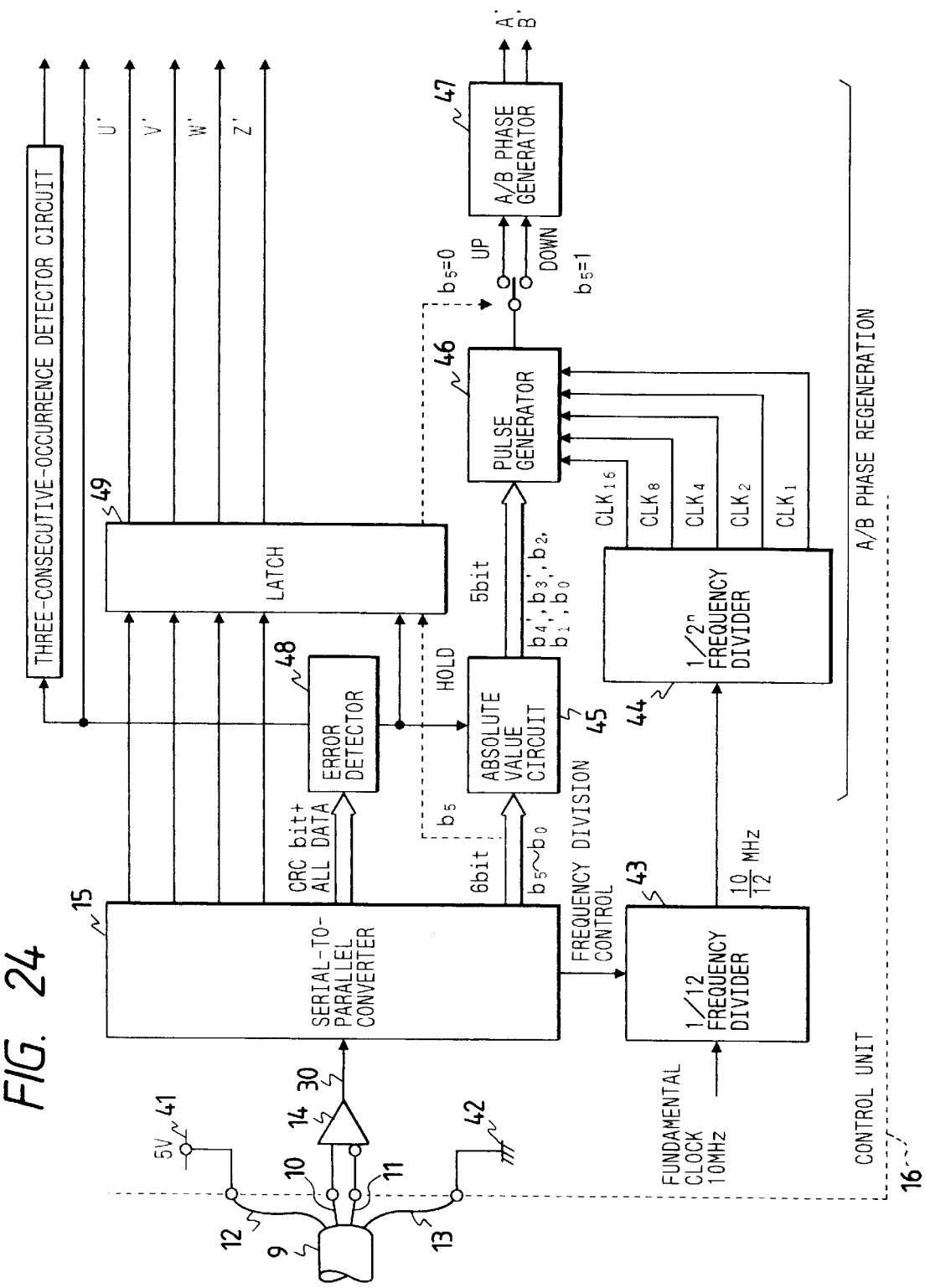
FIG. 24 shows schematically the internal construction of the control unit which is connected to the encoder shown in FIG. 23.

As shown in FIG. 24, a BUS line 10 and a reverse BUS line 11 from the line driver 8 are connected to a line receiver 14 within a control unit 16. The signal processor unit 17 is furnished with the 5 V power supply 18 and the grounded power supply 19, whereas the control unit 16 is furnished with a 5 V power supply 41 and a grounded power supply 42. The two 5 V power supplies 18 and 41 are connected by a 5 V power line 12, and the two grounded power supplies 19 and 42 are connected by a grounded power line 13. The 5 V power line 12 and the grounded power line 13 are bundled within an encoder cable 9 together with the BUS line 10 and the reverse BUS line 11. The encoder cable 9 is supported by appropriate members (not shown).

The output line from the line receiver 14 in the control unit 16 is connected to a serial-to-parallel converter via a serial signal line 30 so that position data for phases Z, U, V and W, the counter value and the error detecting CRC bits will be delivered in a parallel manner from the converter 15. The output line from the serial-to-parallel converter 15 which is associated with the counter value is connected to an absolute value circuit 45 that determines whether the input is of a positive or negative value and which, if it is of a negative value, changes it to a positive value; all output lines associated with the position data for phases Z, U, V and W, the counter value and the CRC bits are connected to an error detector 48. An output line from the error detector 48 that gives a HOLD command is connected to both the absolute value circuit 45 and a latch 49. The output of the error detector 48 is delivered to the outside as a single-occurrence error alarm and it is also connected to a three-consecutive-occurrence detector circuit. The output of the three-consecutive-occurrence detector circuit is delivered to the outside as a three-consecutive-occurrence error alarm. If the transmission path is of good quality, the single-occurrence error alarm output is connected to a circuit (not shown) for stopping the supply of electric current to the motor. Conversely, if the transmission path is not of good quality, the three-consecutive-occurrence alarm output is connected to that current supply stop circuit. The serial-to-parallel converter 15 receives one frame of serial signals as an input and the output line of reset signals corresponding to those serial signals is connected to a 1/12 frequency divider 43 that receives a basic clock of 10 MHz as input and which generates ($2^n-1$) pulses, and the output line of this frequency divider is connected to a $1/2^n$ frequency divider 44 that generates five pulse trains having different pulse densities. The output lines of the $1/2^n$ frequency divider 44 and the absolute value circuit 45 are connected to a pulse generator 46 that selects pulses in accordance with the absolute value of the input. The output line of the pulse generator 46 is connected to an A/B phase generator circuit 47 that switches between an UP and a DOWN input depending upon the counter value $b_5$ (for details, see below) and which regenerates a rectangular wave for phase A or B.

As shown in FIG. 1, the control unit 16 is connected to the motor 1 via a motor cable 31 so that the motor can be driven with the control unit 16.

The operation of the signal transmitting device having this construction is briefly described below.

If drive power is supplied to the motor 1 from the control unit 16 via the motor cable 31 in order to run the motor 1, its main shaft 1a starts to rotate and the pole detecting magnet 2 and the magnetic recording medium 3 will cause the magnetic field to change. The resulting changes in the magnetic field are detected with the Hall devices 4a as driving position data for phases U, V and W. The MR sensor 4b will detect the changes as position data for phases Z, A, and B, the last two phases being detected as sine waves. These data signals Vu, Vv, Vw, Vz, Va and Vv (see FIG. 23) are fed into the shaping circuit 4c, where they are shaped to rectangular waves. The resulting shaped signals for phases A and B are shown in FIGS. 26(b) and 26(c). Such rectangular shaped signals (incremental signals) A and B are then fed into a quadrupled pulse generator/direction detector circuit 40, where they are converted to quadrupled pulses and up-down signals, which are both supplied into a 6-bit up-down counter 5 for counting in an ascending or descending order.

Figure 28:
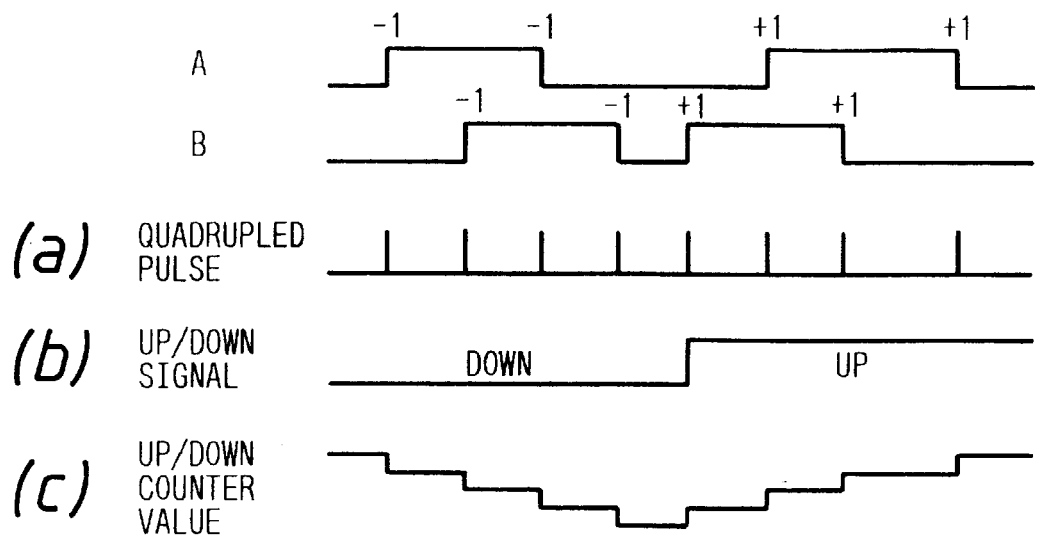
FIG. 28 is a timing chart for illustrating an example of the operation of a quadrupled pulse generator/direction detector circuit and an up-down counter.

An example of the operation of the quadrupled pulse generator/direction detector circuit 40 and the up-down counter 5 is illustrated in FIG. 28.

As FIG. 28 shows, a quadrupled pulse (a) is generated in synchronism with the edge of signal A or B (when a shift from one signal to the other occurs), whereas an up-down signal (b) is generated in such a way that it indicates the direction of the counting mode in accordance with the phase lead or lag of signals A and B—if the phase of signal B leads, the up-down signal commands counting in an ascending direction and if the phase of signal A leads, the same signal commands counting in a descending direction. Hence, the counter value (c) of the up-down counter will count stepwise in accordance with the quadrupled pulse (a) and the up-down signal (b).

In the eighth embodiment under consideration, the up-down counter 5 is adapted to sample its value at given time intervals in response to a SAMPLING signal from a communication control portion 50 (see FIG. 26(e)). When the sampled counter value is loaded in the parallel-to-serial converter 6, the counter will clear its value in response to a CLEAR signal from the communication control portion 50 (see FIG. 26(f)). In the eighth embodiment, the phase of signal B leads at all times compared to the phase of signal A and, hence, the value of up-down counter 5 will come out as shown in FIG. 26(d).

The values of up-down counter 5 are fed into the parallel-to-serial converter 6 as a 6-bit signal $b_0$–$b_5$; on the other hand, the rectangular shaped position data signals U, V, W and Z are directly fed into the parallel-to-serial converter 6.

In the value of up-down counter 5, $b_5$ is designated the MSB and $b_0$ the LSB and these bits are so set that if the phase of signal B leads, $b_5$ is equal to zero while $b_5$ is equal to one if the phase of signal A leads.

The numerals encircled in FIGS. 26(b) and 26(c) are keyed to the encircled numerals in FIG. 26(d). In other words, the points of change in signal A (FIG. 26(b)) or B (FIG. 26(c)) correspond to the changes in the values of up-down counter 5.

The numerals not encircled in FIG. 26(d) refer to the values of up-down counter 5.

The reason for designing the up-down counter 5 to produce 6-bit counts is set forth below.

Assume here that the serial signal as produced from the parallel-to-serial converter 6 has a propagation velocity of 500 kbps and also assume that the serial signal has a format as shown in FIG. 26(a). Then, the sampling of one frame will take 38 $\mu$s. If it is assumed that phases A and B will produce 2048 pulses for every rotation of the main shaft 1a which can rotate up to 5000 rpm, the frequency of quadrupled pulses is given by:

$$5000(\text{rpm})/60(\text{sec}) \times 2048(\text{pulses}) \times (\text{multiplication factor}) = 682.7(\text{kHz})$$

Since the sampling period is 38 $\mu$s (see above), the number of pulses that can be generated in that period is given by:

$$682.7(\text{kHz}) \times 38(\mu s) = 25.9(\text{pulses})/\text{period}$$

Since $25.9 < 31 = 2^5 - 1$, one may conclude that 6 bits will suffice for the values of the up-down counter 5 in consideration of the direction of the counting mode.

The 6-bit value of the up-down counter and the position data signals U, V, W and Z are supplied into the parallel-to-serial converter 6, where they are converted to serial signals. Thus, the parallel-to-serial converter 6 will send out serial signals of a format of the type that is shown in FIG. 26(a).

As already mentioned, the format shown in FIG. 26(a) assumes a transmission velocity of 500 kbps and a sampling period of 38 $\mu$s per frame.

Numeral 420 in FIG. 26(*a*) refers to a pause space that precedes the transmission of various kinds of data; 421 is a START bit that follows the space 420 and which informs the start of data transmission; 422 is a 6-bit counter value that follows the START bit 421 and which is transmitted from the up-down counter 5; 423 refers to position data signals for U, V, W and Z that follow the counter value 422 and which are transmitted from the waveform shaping circuit 4*c*; and 424 refers to 4 CRC bits that follow the U, V, W and Z position data signals and which will check a sequence of data (for any errors). The CRC bits 424 are to be added to data signals in response to a signal from an error detecting CRC bit adder 51. The pause space 420, START bit 421, counter value 422, position data signals 423 and CRC bits 424 compose one frame. The code that is used in the format may be a Manchester code.

One frame of the serial signals thus produced are repetitively transmitted to the control unit 16 via the line driver 8 and encoder cable 9 as the data to be transmitted are updated in accordance with the detection signals from the Hall devices 4*a* and the MR sensor 4*b*. As already mentioned, these signals are obtained by sampling at given time intervals in accordance with the sampling and CLEAR signals as supplied from the communication control portion 50. Hence, the amount of signals that have to be handled is markedly reduced compared to the prior art and this is effective not only in reducing the storage capacity but also in shortening the signal transmission time.

The serial signals of interest are transmitted through the encoder cable 9 and received by the line receiver 14 in the control unit 16. These serial signals are converted back to parallel signals in the serial-to-parallel converter 15, producing data at the point of time when the occurrence of CRC bits 424 is verified, namely, at the timing shown in FIG. 27(*g*).

The position data U', V', W' and Z' for U, V, W and Z phases in a parallel form are forwarded as such for subsequent processing; on the other hand, the 6-bit counter values are fed into an absolute-value circuit 45 (see FIG. 14), where decision is made as to whether each counter value is positive or negative on the basis of the value of $b_5$. The criterion for the decision is such that the counter value is found to be positive if $b_5=0$ and it is found to be negative if $b_5=1$. In the case of $b_5=1$, the circuit 45 performs calculation for $100000(2)-b_4b_3b_2b_1b_0(2)$ and the result is produced as an output from the circuit 45. The output of the circuit 45 consists of 5 bits and is encoded as $b_4'b_3'b_2'b_1'b_0'$. In the above calculation formula, the figures in parentheses represent the radix of a number system at issue and (2) means a number in binary notation.

We next describe a 1/12 frequency divider which is shown by 43 in FIG. 14. According to the calculation of the number of bits that are required for the up-down counter 5, generating up to 26 pulses within 38 µs will suffice for a pulse generator 46 at a subsequent stage. However, in the eighth embodiment under consideration, a clock that is capable of generating 31 pulses within 38 µs is necessary in order to reduce the jitter in the signals for phases A and B (for details, see below). Stated more specifically, the frequency of the necessary clock is expressed by:

$$31(pulses)/38(\mu s)=815.8(kHz)$$

If the fundamental clock has a frequency of 10 MHz, the required number of frequency divisions to produce the necessary clock is given by:

$$10(MHz)/815.8(kHz)=12.3(divisions)$$

This is the reason why the 1/12 frequency divider 43 is used in the fourth embodiment.

Figure 27:
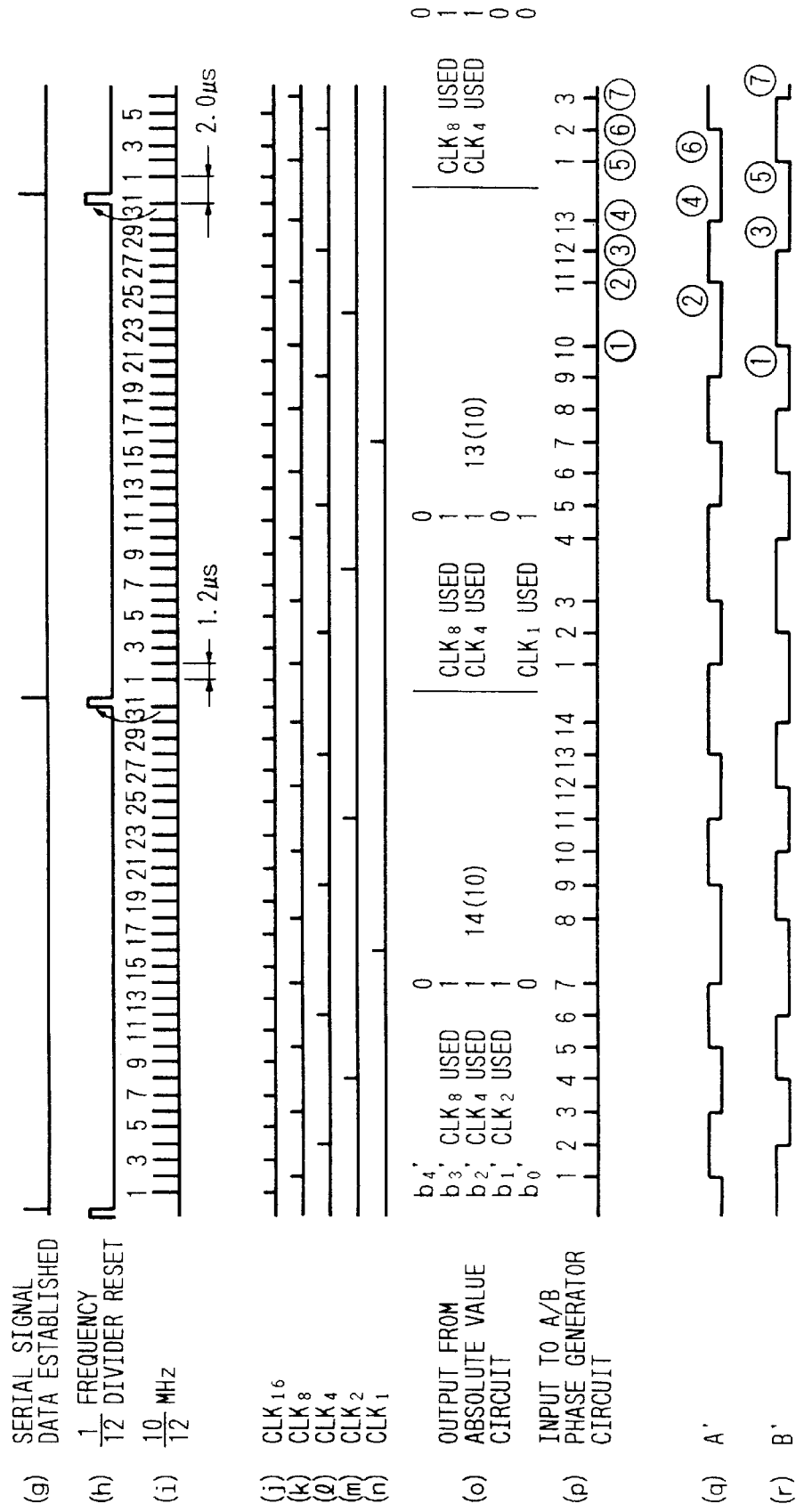
FIG. 27 is a timing chart for illustrating the operation of the circuitry shown in FIG. 24.

However, the output of this 1/12 frequency divider 43, namely, the generation of 31 pulses at a clock frequency of 10/12 MHz does not coincide exactly with 38 µs, so a RESET signal corresponding to one frame of serial signals is received from the serial-to-parallel converter 15 in order to make both ends meet. The RESET signal thus received is shown in FIG. 27(*h*). After the 31st (thirty-first) pulse has been generated at a clock frequency of 10/12 MHz as shown in FIG. 27(*i*), the 1/12 frequency divider 43 is reset to a stop and its reset condition is cleared at the timing of data establishment which is shown in FIG. 27(*g*). Therefore, every pulse is generated at an interval of 1.2 µs and the interval between the 31st pulse and the first pulse of the next cycle is 2.0 µs.

The frequency divided signals for 31 pulses are fed into a $1/2^n$ frequency divider 44, where they are divided into five pulse trains having different pulse densities. For the concepts of the $1/2^n$ frequency divider 44 and a pulse generator 46 to be described just below, see pages 154 to 157 of "Digital Kairo—Kiso to Oyo—(Digital Circuits—Basics and Applications—)", Hiroshi Kawaharada, Oct. 15, 1982, Shokodo Publishing Company. According to the theory of pulse distribution by the MIT technique, the clock of 10/12 MHz is distributed into five clocks shown in FIGS. 27(*j*) to 17(*n*); CLK 16 has odd-numbered pulses; CLK 8 has pulses which are divided by 4 to yield the remainder 2; CLK 4 has pulses which are divided by 8 to yield the remainder 4; CLK 2 has pulses which are divided by 16 to yield the remainder 8; and CLK 1 has pulses which are divided by 32 to yield the remainder 16.

The clocks CLK 16, CLK 8, CLK 4, CLK 2 and CLK 1, as well as the output signal $b_4'b_3'b_2'b_1'b_0'$ from the absolute value circuit 45 are fed into the pulse generator 46.

Figure 25:
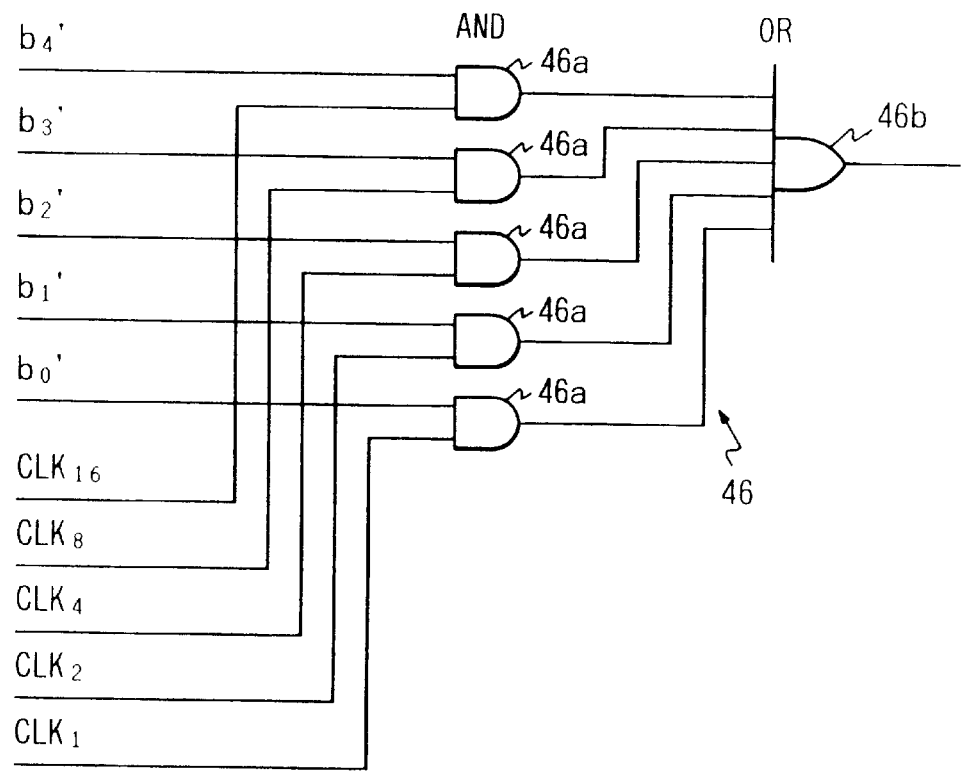
FIG. 25 shows schematically the construction of a pulse generator.

The pulse generator 46 is composed of AND circuits 46*a* and an OR circuit 46*b* as shown in FIG. 25 and, depending upon the contents of the signal $b_4'b_3'b_2'b_1'b_0'$, the generator 46 selects CLK 16, CLK 8, CLK 4, CLK 2 or CLK 1 so as to output a logical sum. If $b_4'b_3'b_2'b_1'b_0'$ is 01101(2) as identified in the center of the description in FIG. 27(*o*), CLK 8, CLK 4 and CLK 1 are selected; namely, pulses 2, 4, 6, 10, 12, 14, 16, 18, 20, 22, 26, 28 and 30 at a clock frequency of 10/12 MHz are selected and summed up to produce pulses as shown in FIG. 27(*p*). As is clear from FIG. 27(*p*), the output pulses are spaced substantially uniformly to reduce the occurrence of jitter. Hence, an A/B phase generator circuit 47 to be described just below will produce outputs A' and B' that are low in jitter content.

The pulse train shown in FIG. 27(*p*) is fed into the A/B phase generator circuit 47, which regenerates incremental signals A' and B'.

The A/B phase generator circuit 47 is so adapted that it will switch the output of the pulse generator 46 to either an UP or DOWN input depending upon the value of $b_5$ in the 6-bit counter value as transmitted from the serial-to-parallel converter 15. Stated more specifically, the output from the pulse generator 46 is switched to an UP input when $b_5=0$ and to a DOWN input when $b_5=1$. Rectangular waves for the two phases A and B are generated in such a way that the phase of signal B will lead when one pulse is added to the output from the pulse generator 46; in response to an UP input, the circuit 47 will cause the phase of signal B to lead and in response to a DOWN input, the phase of signal A is caused to lead. Output signals from the A/B phase generator circuit 47 are shown in FIGS. 27(*q*) and 27(*r*), respectively; obviously, the phase of signal B leads the phase of signal A.

Edges indicated by (1), (2), . . . in FIGS. 26(*b*) and 26(*c*) correspond to edges indicated by (1), (2), . . . in FIGS. 27(*q*)

and 27(r) and, obviously, time lags have developed. This is due either to the delay in serial transmission or to the wait for data establishment but the actual time difference is only 64 μs, which is not any big problem as a delay in the transmission of signals for phases A and B. This transmission delay can be further reduced by increasing the transmission velocity from 500 kbps to 1 Mbps.

The error detector 48 is adapted to be capable of detecting errors in the CRC bits 424 being transmitted. If an error is detected, the detector produces a single-occurrence alarm output; at the same time, it sends out a HOLD signal to both the absolute value circuit 45 and the latch 49 to insure that the data $b_5$ to $b_0$, U, V, W and Z in the last received signal block are used again. Reusing the data $b_5$ to $b_0$ is equivalent to the motor running at uniform velocity, so this is not a problem at all to the rotation of the motor; as far as the date U, V, W and Z are concerned, reusing them is not a problem, either, because of their low frequency. If three errors occur in succession, the three-consecutive-occurrence detector circuit will output a three-consecutive-occurrence alarm.

Figure 29:
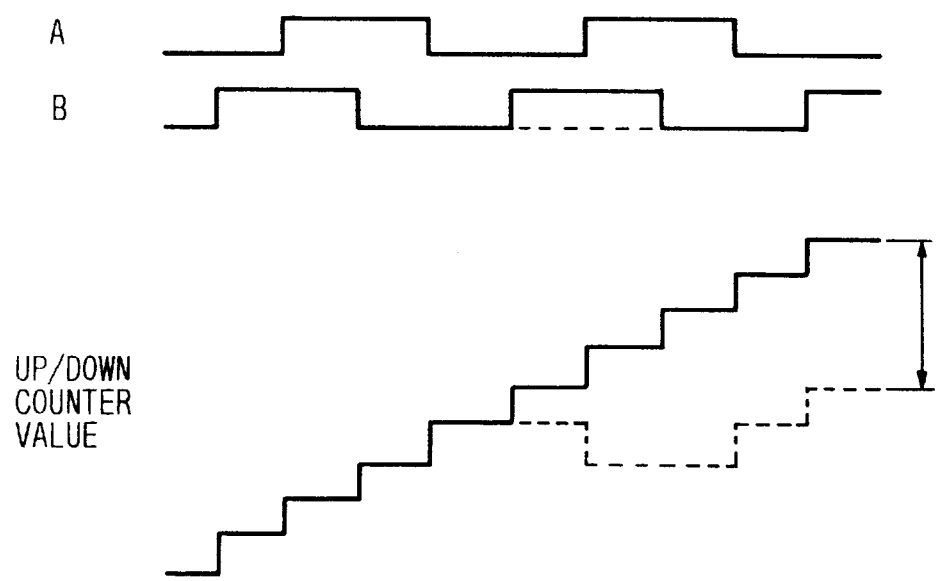
FIG. 29 is a diagram illustrating how an error occurs in the counter value on account of noise error.

In the prior art, if noise enters the incremental signals A and B to distort pulses to such an extent that they are no longer recognizable as pulses, the counter value will come out as indicated by a dashed line in FIG. 29, causing an error that will introduce a deviation from the desired position. However, as already mentioned, the occurrence of an error in the eighth embodiment causes a single-occurrence error alarm to be generated; if necessary, the motor may be caused to stop so as to inform the operator of the occurrence of an error and this contributes to an improved system reliability. Alternatively, the single-occurrence error alarm may be neglected and the motor is stopped to inform the operator of the occurrence of errors only when the three-consecutive-occurrence error alarm is generated; in this case, the data $b_5$ to $b_0$ in the last received signal block are to be used, thereby avoiding frequent motor stoppage and erroneous operations that would otherwise occur due to noise.

If three errors occur in succession, the system will determine that they are true errors caused by certain reasons such as drop in the level of the quality of communication paths and, as a result, the three-consecutive-occurrence error alarm is generated to inform the operator of the occurrence of a serious trouble.

In FIG. 24, the regenerated signals are marked with an apostrophe as in A', B', U', V', W' and Z' and this is added to make clear that the regenerated signals are delayed in transmission compared to the initial signals A, B, U, V, W and Z.

Thus, in the eighth embodiment under consideration, the up-down counter 5 is reset at given time intervals and the data from that counter is sampled within the given time; therefore, the amount of signals that have to be handled is small enough to insure that not only the storage capacity but also the signal transmission time can be reduced.

The eighth embodiment is also characterized in that in the process of transmitting counter values, pulses are selected in response to serial signals that have been received from a train of $(2^n-1)$ pulses (n is a natural number) and the so selected pulses are regenerated into incremental signals. As a result, the pulse density becomes fairly uniform and one need not improve the precision of the output of an analog sensor for phases A and B by a sufficient degree to provide a duty that is high enough for those two phases not to disappear upon rejection by a low-pass filter at the signal reception end.

Compared to a prior art method in which data are transmitted through two channels for phases A and B without making any error detection at all, the eighth embodiment is adapted to perform error detection on every frame and this contributes to a higher reliability of data transmission.

If errors do not occur repetitively a predetermined number of times, they are regarded as having occurred on account of noise and the data in the previous block are regenerated for another use. If errors occur repetitively a predetermined number of times, they are identified as true errors and an appropriate action is taken to avoid erroneous operations.

The eighth embodiment offers the following two additional advantages. First, the sine waves for the two phases A and B which are delivered from the MR sensor 4b are fed into the up-down counter 5, and the resulting counter value and the position data signals for the other phases (U, V, W and Z) are converted to serial signals in the parallel-to-serial converter 6 and thence transmitted to the control unit 16. As a result, the number of transmission paths that are required can be reduced to one channel and, at the same time the thickness of the cable to be used can be reduced, thereby leading to a lower cable cost.

Secondly, in the case where part of the encoder cable 9 is laid within the robot's arm, the thickness of the encoder cable 9 can be reduced as described above and, hence, the space in the robot's arm that is conventionally occupied by the cable 9 can effectively be used for other purposes and, in addition, the arm itself can be made thinner. In the case where the cable 9 is installed outside the robot, it is less subject to constraints during reeling and other cable handling operations. Furthermore, irrespective of whether the cable 9 is within or outside the robot, the members for supporting it can be made with a comparatively simple construction and this permits greater latitude in cable design.

Figure 30:
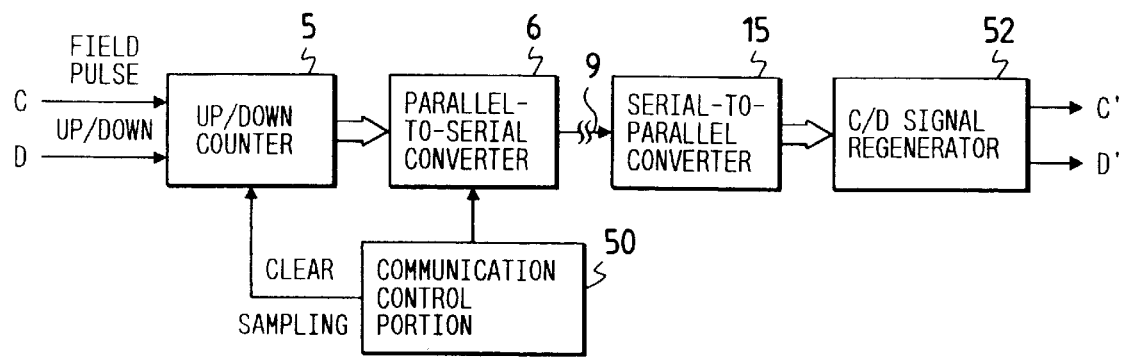
FIG. 30 is a block diagram showing schematically the essential part of a signal transmitting device in which incremental signals are transmitted by the method of the ninth embodiment of the present invention.

FIG. 30 is a block diagram showing schematically the essential and necessary part of a signal transmitting device in which incremental signals are transmitted by the method of the ninth embodiment of the present invention. The ninth embodiment differs from the eighth embodiment in that the quadrupled pulses and associated up-down signals as inputs to the up-down counter 5 are replaced by field pulses C and associated up-down signals D and that these signals C and D are regenerated by a C/D signal regenerator 52.

Figure 31:
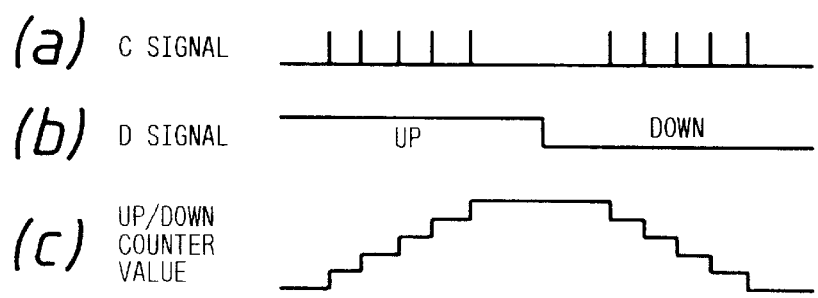
FIG. 31 is a timing chart for illustrating an example of the operation of the up-down counter shown in FIG. 30.

The field pulses C and the associated up-down signals D may be as shown in FIG. 31(a) and 31(b) and, hence, the up-down counter value is as shown in FIG. 31(c).

Needless to say, the ninth embodiment which is modified in the manner just described above is capable of achieving the same advantages as the eighth embodiment.

Figure 32:
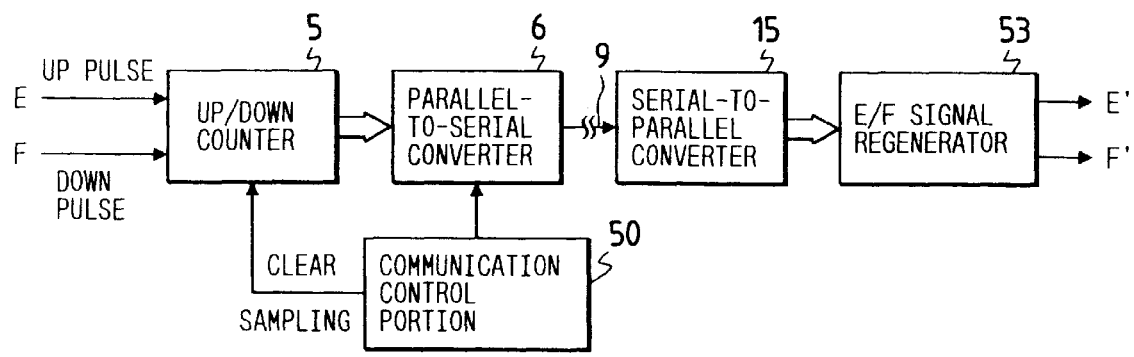
FIG. 32 is a block diagram showing schematically the essential part of a signal transmitting device in which incremental signals are transmitted by the method of the tenth embodiment of the present invention.

FIG. 32 is a block diagram showing schematically the essential and necessary part of a signal transmitting device in which incremental signals are transmitted by the method of the tenth embodiment of the present invention. The tenth embodiment differs from the eighth embodiment in that the quadrupled pulses and associated up-down signals as inputs to the up-down counter 5 are replaced by an UP pulse E and a DOWN pulse F and that these signals E and F are regenerated by an E/F signal regenerator 53.

Figure 33:
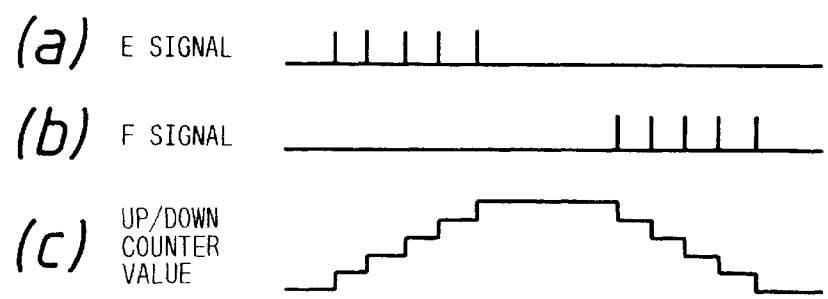
FIG. 33 is a timing chart for illustrating an example of the operation of the up-down counter shown in FIG. 32.

The UP pulse E and DOWN pulse F may be as shown in FIGS. 33(a) and 33(b) and, hence, the up-down counter value is as shown in FIG. 33(c).

Needless to say, the tenth embodiment which is modified in the manner just described above is also capable of achieving the same advantages as the eighth embodiment.

Figure 34:
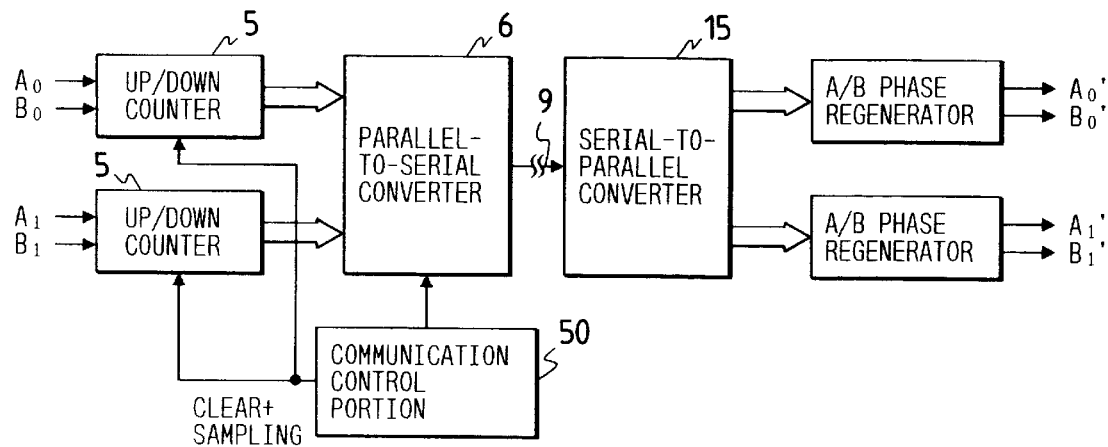
FIG. 34 is a block diagram showing schematically the essential part of a signal transmitting device in which incremental signals are transmitted by the method of the eleventh embodiment of the present invention.

FIG. 34 is a block diagram showing schematically the essential and necessary part of a signal transmitting device in which incremental signals are transmitted by the method of the eleventh embodiment of the present invention. The eleventh embodiment differs from the eighth embodiment in that two A/B phase signals are fed into two up-down counters 5 and the resulting two counter values are converted into a serial signal in a parallel-to-serial converter 6, then reverted to two counter values in a serial-to-parallel converter 15, followed by regeneration of two sets of A/B phases in two A/B phase regenerators (as noted by "A/B phase regeneration" in FIG. 24).

The eleventh embodiment is effective in the case where incremental signals as generated in two directions, X and Y, with an input device such as a mouse or a trackball have to be transmitted to the control unit over a reduced number of cables. Needless to say, this does not mean the exclusion of application to the transmission of three or more sets of A/B phase signals.

In a modified application to a biaxial encoder, not only two counter values but also two sets of Z, U, V and W phases may be fed into the parallel-to-serial converter.

Figure 35:
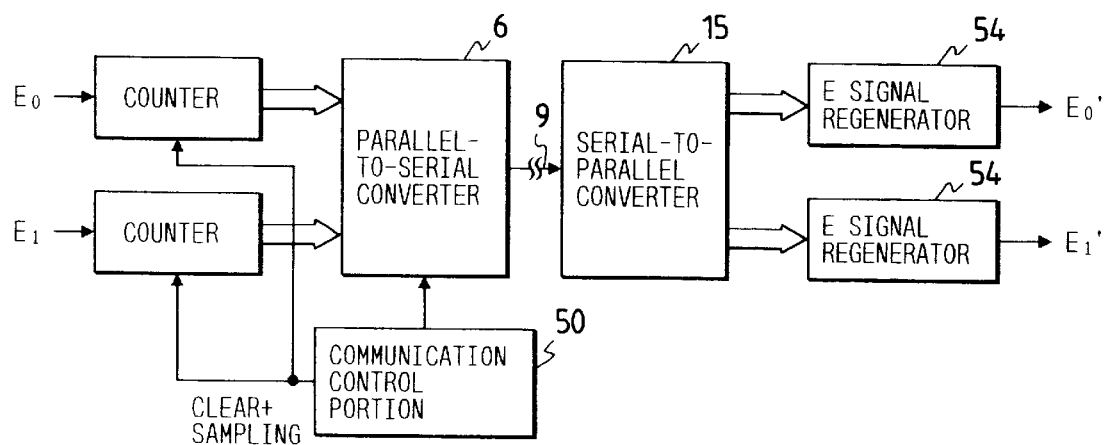
FIG. 35 is a block diagram showing schematically the essential part of a signal transmitting device in which incremental signals are transmitted by the method of the twelfth embodiment of the present invention.

FIG. 35 is a block diagram showing schematically the essential and necessary part of a signal transmitting device in which incremental signals are transmitted by the method of the twelfth embodiment of the present invention. The twelfth embodiment differs from the eleventh embodiment in that the two sets of input signals are E signals as shown in FIG. 33(a) and that each of the two counters is dedicated to counting in an ascending order.

The twelfth embodiment is also characterized in that two inputs are converted to a single serial signal, which is reverted to two signals that are produced as output to be transmitted and this contributes to the use of a smaller number of wires in cable.

Figure 36:
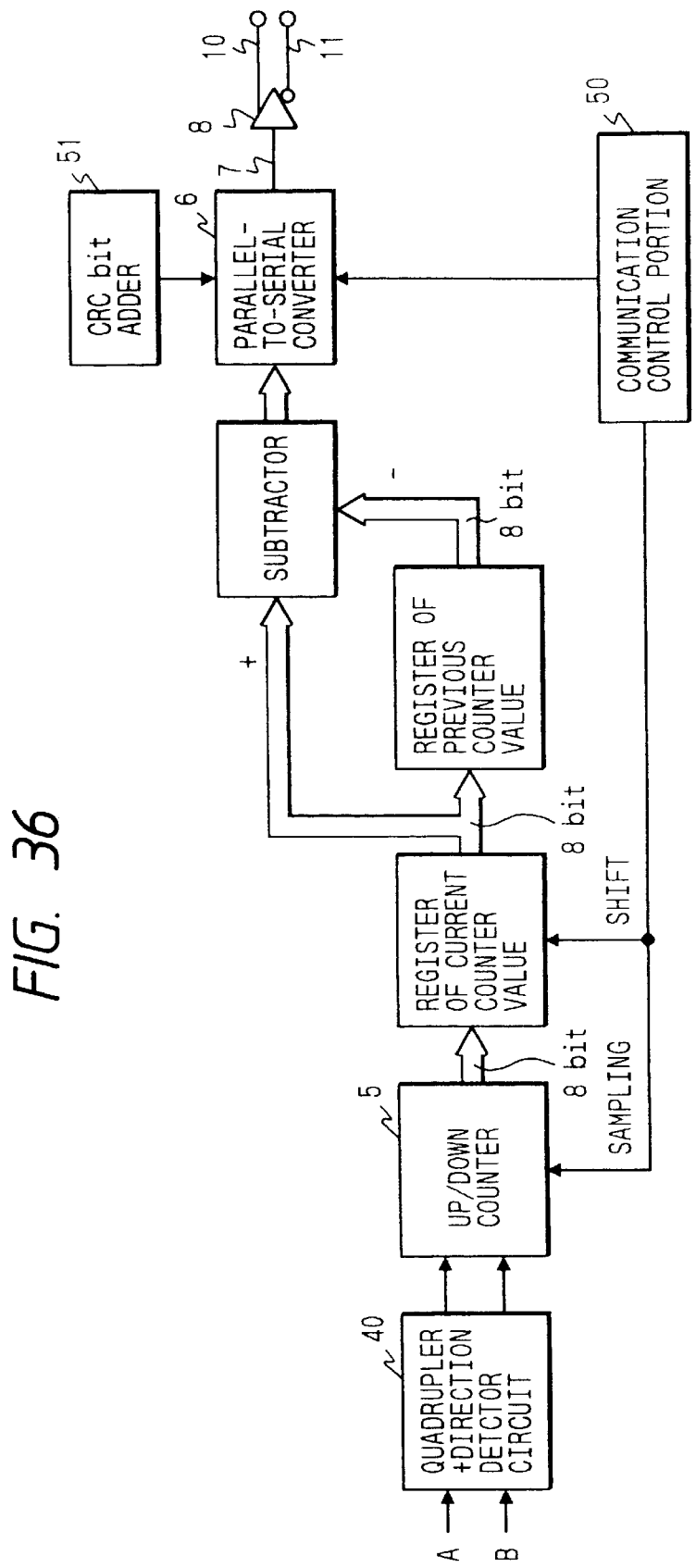
FIG. 36 is a block diagram showing schematically the essential part of a signal transmitting device in which incremental signals are transmitted by the method of the thirteenth embodiment of the present invention.

FIG. 36 is a block diagram showing the essential part (at the sending end) of a signal transmitting device in which incremental signals are transmitted by the method of the thirteenth embodiment of the present invention. The thirteenth embodiment differs from the eighth embodiment mainly in terms of the composition of the up-down counter 5. This counter may be an 8-bit free-running counter that counts in an ascending order from 00000000(2) up to 11111111(2) and which will return to 00000000(2) upon further counting up. This counter will not be cleared each time a given period passes. Instead, a register of the current counter value is connected at the next stage to the counter stage and a register of the previous counter value is connected at the next stage to said register, with the output of the register of the current counter value being connected to the plus (+) input of a subtractor and the output of the register of the previous counter value being connected to the minus (−) input of the subtractor. The output of the subtractor is connected to the parallel-to-serial converter 6.

Figure 37:
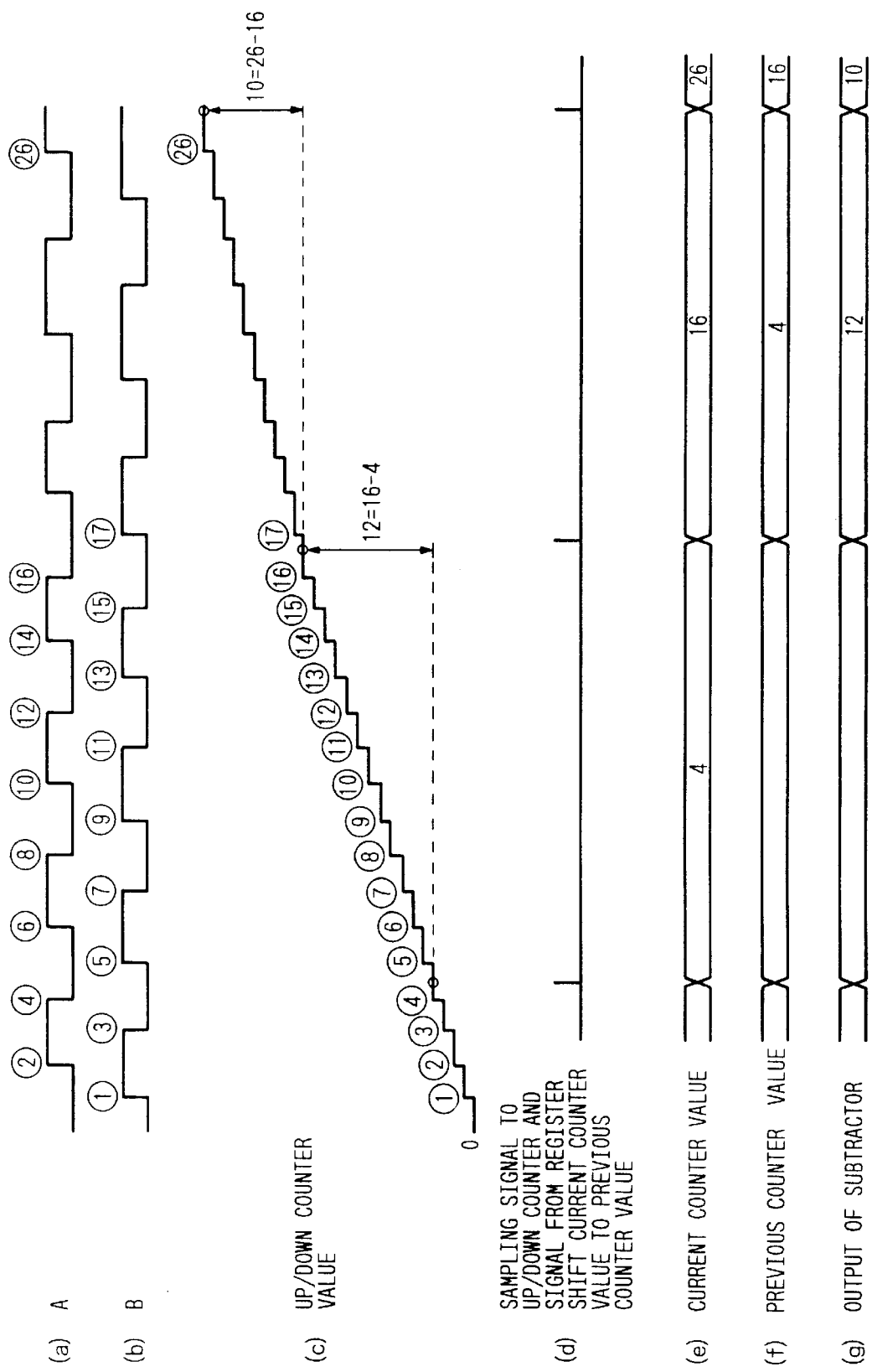
FIG. 37 is a timing chart for illustrating the operation of the circuitry shown in FIG. 36.

The operation of the circuit shown in FIG. 36 is described below with reference to the timing chart shown in FIG. 37. FIGS. 37(a) and 37(b) shown input signals for phases A and B, which are completely identical in waveform to the signals shown in FIGS. 26(b) and 26(c). Since the up-down counter 5 is not cleared, the counter value increases monotonically as shown in FIG. 37(c). The communication control portion 50 generates a sampling signal (FIG. 37(d)) at the same timing as shown in FIG. 26(e), and in synchronism with that event, it shifts the counter value from the register of the current counter value to the register of the previous counter value. The subtractor subtracts the previous counter value from the current counter value and outputs the result into the parallel-to-serial converter. The timed relationship between the sampling of those counter values and the output of the subtractor is shown in FIGS. 37(c) to 37(g).

In the thirteenth embodiment, the up-down counter 5 is not cleared by two registers are provided for storing the current and the previous counter values, with the difference being taken between the two counter values and produced as output. Hence, the amount of change in the counter value within a given time is transmitted and this insures that the same advantages as achieved in the eighth embodiment can also be attained in the thirteenth embodiment.

While the eighth to thirteenth embodiments of the present invention have been described above in a specific manner, it should of course be understood that they are by no means the sole cases of the invention and that various modifications can be made without departing from the scope and spirit of the invention. To take just one example, the encoder 4 is provided in direct contact with the motor 1 in the eighth to thirteenth embodiments but it may be provided separately from the motor. If desired, the encoder 4 may be a linear encoder. It is also possible to form the transmission path of fiber optics.

The foregoing description of the eighth to thirteenth embodiments concerns the case where signals for phases U, V, W and Z are transmitted as they are superposed on the serial signals; if desired, however, the two phases A and B may only be transmitted and regenerated by the above-described methods and this mode is also contemplated by the present invention.

The foregoing description of the eighth to thirteenth embodiments also concerns the case where error detection is accomplished solely by CRC bits; it should, however, be noted that another check may be made as to whether the START bit is one or whether the count value is not more than the permissible level of rpm.

It would be added that the present invention is applicable to all kinds of methods wherein incremental signals are counted in either an ascending or a descending order for data transmission and regeneration.

The eighth to thirteenth embodiments of the present invention which concern the method of transmitting incremental signals may be characterized as follows. First, the amount of change in the up-down counter value within a given time is sampled and this helps reduce the amount of signals that need be handled, whereby the storage capacity is reduced while the signal transmission time is shortened to contribute to better controllability.

Second, in addition to this sampling feature, pulses are selected in accordance with the serial signal as received from the train of $(2^n-1)$ pulses (n is a natural number) and they are regenerated into incremental signals. Therefore, even if the output of an analog sensor for phases A and B has only low precision, the duty of the A/B phase output can be sufficiently enhanced to insure better quality for the data being transmitted.

Thirdly, in addition to the sampling feature, the serial signals are divided in frames for each sampling data and errors are detected in each frame.

Fourthly, if a single error occurs during this error detection on a frame basis, the data in the previous frame are used again and only when errors occur repetitively a predetermined number of times, the system is found to be abnormal; therefore, the frequent occurrence of erroneous operations can be avoided, thereby leading to higher system reliability.

Fourteenth and Fifteenth Embodiments

The fourteenth embodiment of the present invention is described below with reference to accompanying drawings.

A simplified perspective view of the device for transmitting signals from a position detector is the same as FIG. 1 which was used in describing the first embodiment and, hence, the eighth embodiment under consideration is described below with reference to FIG. 1 using the same numerals.

In FIG. 1, numeral 1 refers to a motor such as a brushless motor. The motor 1 has a main shaft 1a and a disk of pole detecting magnet 2 is provided above an end face of the main shaft 1a. The magnet 2 is magnetized in such a way that N and S poles alternate around the circumference and it will send out driving position data in association with phases U, V and W. A disk of magnetic recording medium 3 is also provided above an end face of the main shaft 1a but in a position closer to the main shaft than the pole detecting magnet 2 is. The medium 3 consists of an upper portion and a lower portion; the upper portion is magnetized in-such a way that two poles, one being N and the other S, are juxtaposed on the circumference whereas the lower portion is magnetized in such a way that N and S poles alternate around the circumference in phase with the N and S poles on the circumference of the upper portion. Having this construction, the magnetic recording medium 3 will send out position data in association with phases Z, A and B.

Figure 38:
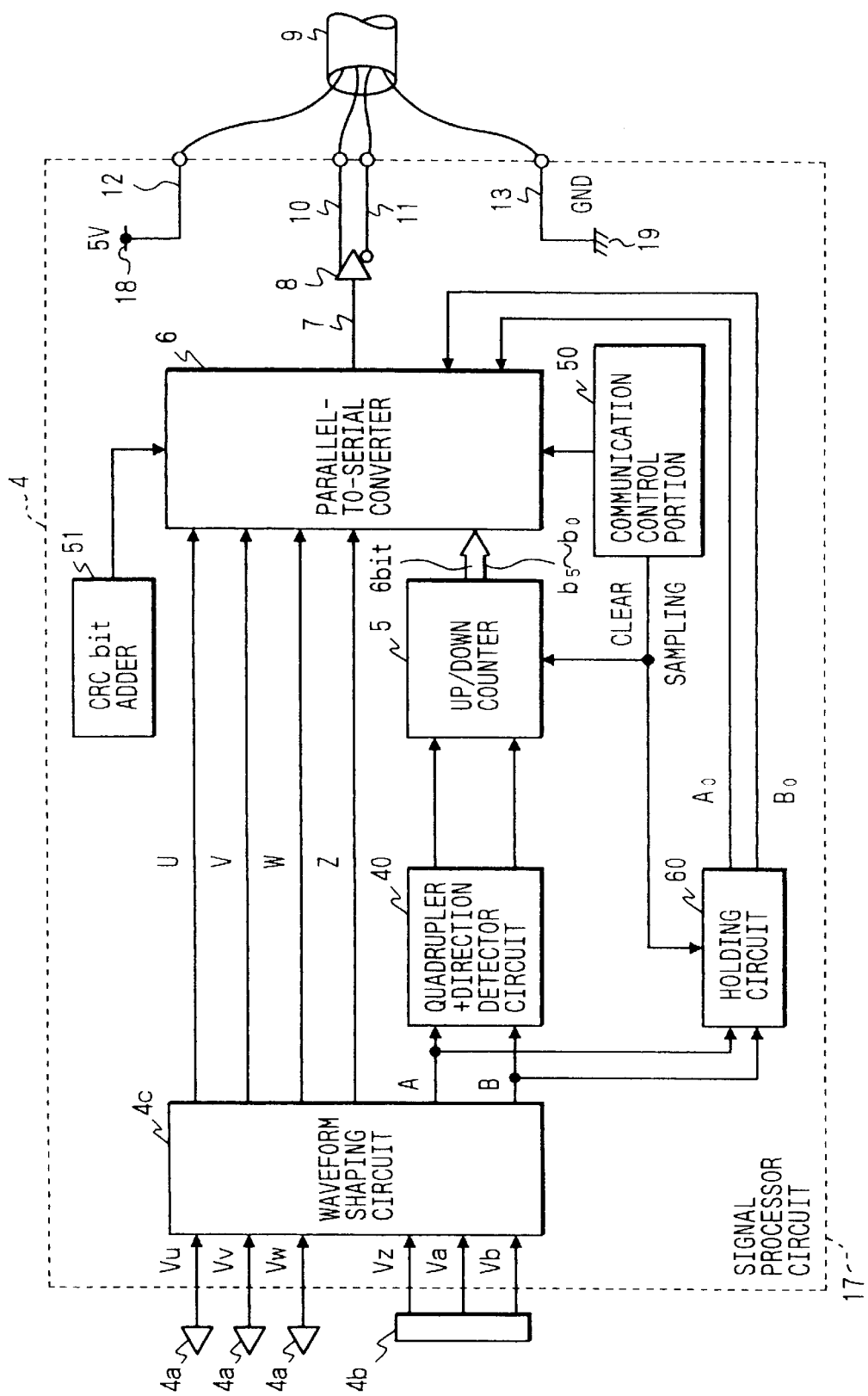
FIG. 38 shows schematically the construction of an encoder as a position detector from which incremental signals are transmitted with a signal transmission device according to the fourteenth embodiment of the present invention.

The motor 1 is furnished with a position detector 4 such as an encoder for detecting position data in association with phases A, B, Z, U, V and W. The encoder 4 is enclosed in a case 44 (which is delineated with a dashed line for the sake of clarity of the drawing), and Hall devices 4a and an MR sensor 4b are encased in positions that face the magnetized areas of the pole detecting magnet 2 and the magnetic recording medium 3, respectively. The Hall devices 4a are mounted on the reverse face of the base of a signal processor circuit 17 to be described below which is composed of a waveform shaping circuit 4c, a quadrupler/direction detector circuit 40, an up-down counter 5, a parallel-to-serial converter 6, a communication control portion 50, a CRC bit adder 51, a holding circuit 60 which also serves as a sampling circuit, a line driver 8, a 5 V power supply 18 and a grounded power supply 19. As shown in FIG. 38, the output lines of Hall devices 4a and MR sensor 4b are connected to the waveform shaping circuit 4c for shaping to rectangular waves. Output lines for phases A and B from the shaping circuit 4c are connected to the quadrupler/direction detector circuit 40 for conversion to quadrupled pulses and an up-down signal. The output lines of the circuit 40 and an output line of the communication control portion 50 that sends out command signals for clearing and sampling are connected to the 6-bit counter 5 which counts in an ascending or descending order depending upon the lead or lag of the phase of signal A or B. The output line of the up-down counter 5 is connected to the parallel-to-serial converter 6, and the output lines for the other phases (Z, U, V and W) are directly connected to the parallel-to-serial converter 6.

The output lines for phases A and B from the shaping circuit 4c and the output line of the communication control portion 50 are also connected to the holding circuit 60 for sampling the incremental signals for phases A and B. The output line of the holding circuit 60 is connected to the parallel-to-serial converter 6. Also connected to the parallel-to-serial converter 6 is the output line of the error detecting CRC bit adder 51.

A serial signal line 7 from the parallel-to-serial converter 6 is connected to the line driver 8.

Figure 39:
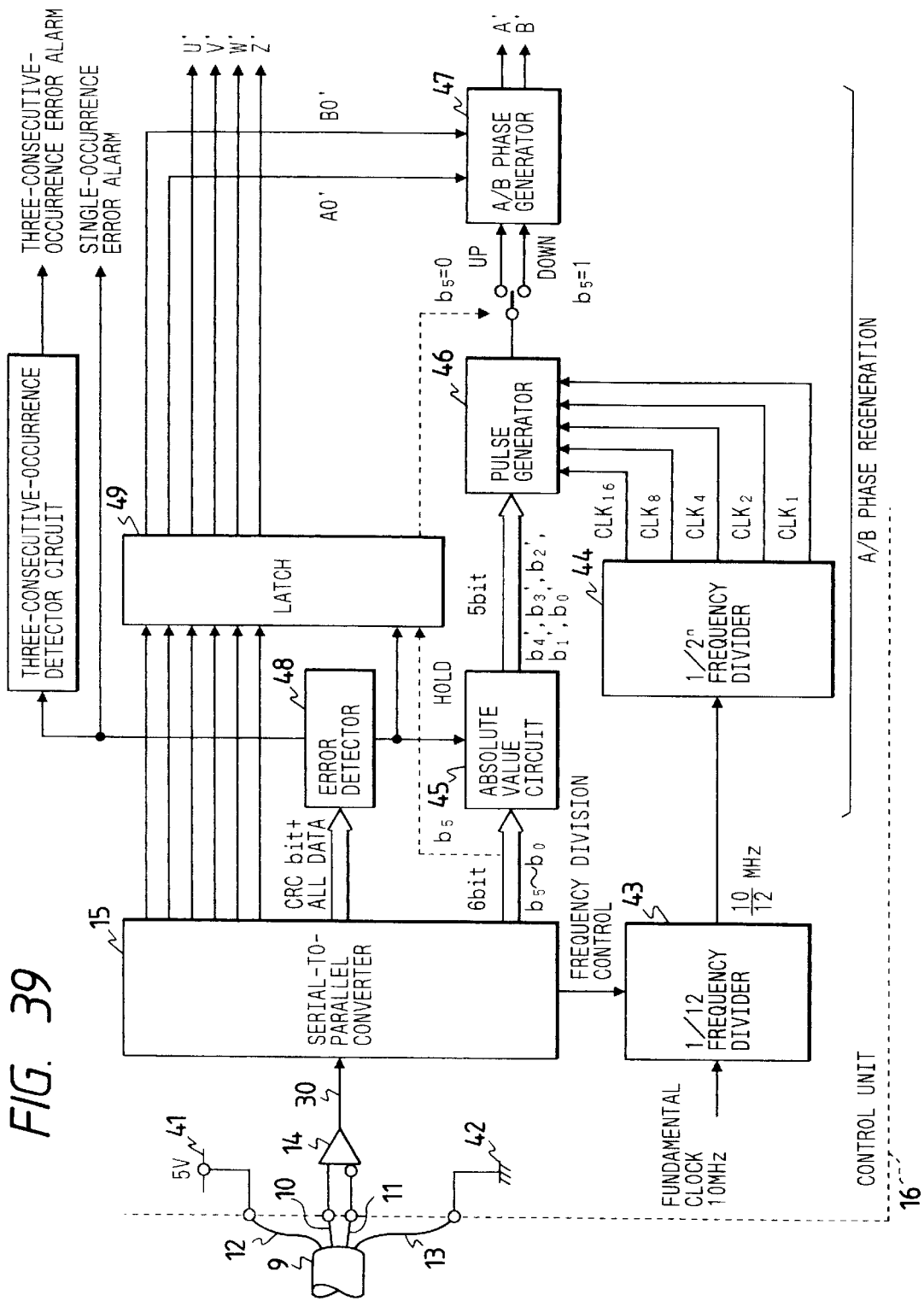
FIG. 39 shows schematically the internal construction of the control unit which is connected to the encoder shown in FIG. 38.

As shown in FIG. 39, a BUS line 10 and a reverse BUS line 11 from the line driver 8 are connected to a line receiver 14 within a control unit 16. The signal processor unit 17 is furnished with the 5 V power supply 18 and the grounded power supply 19, whereas the control unit 16 is furnished with a 5 V power supply 41 and a grounded power supply 42. The two 5 V power supplies 18 and 41 are connected by a 5 V power line 12, and the two grounded power supplies 19 and 42 are connected by a grounded power line 13. The 5 V power line 12 and the grounded power line 13 are bundled within an encoder cable 9 together with the BUS line 10 and the reverse BUS line 11. The encoder cable 9 is supported by appropriate members (not shown).

The output line from the line receiver 14 in the control unit 16 is connected to a serial-to-parallel converter 15 via a serial signal line 30 so that position data for phases Z, U, V and W, the counter value, the sampling signal and the error detecting CRC bits will be delivered in a parallel manner from the converter 15. The output line from the serial-to-parallel converter 15 which is associated with the counter value is connected to an absolute value circuit 45 that determines whether the input is of a positive or negative value and which, if it is of a negative value, changes it to a positive value; all output lines associated with the position data for phases Z, U, V and W, the counter value, the sampling signal and the CRC bits are connected to an error detector 48. An output line from the error detector 48 that gives a HOLD command is connected to both the absolute value circuit 45 and a latch 49. The output of the error detector 48 is delivered to the outside as a single-occurrence error alarm and it is also connected to a three-consecutive-occurrence detector circuit. The output of the three-consecutive-occurrence detector circuit is delivered to the outside as a three-consecutive-occurrence error alarm. If the transmission path is of good quality, the single-occurrence error alarm output is connected to a circuit (not shown) for stopping the supply of electric current to the motor. Conversely, if the transmission path is not of good quality, the three-consecutive-occurrence alarm output is connected to that current supply stop circuit. The serial-to-parallel converter 15 receives one frame of serial signals as an input and the output line of reset signals corresponding to those serial signals is connected to a 1/12 frequency divider 43 that receives a basic clock of 10 MHz as input and which generates $(2^n-1)$ pulses, and the output line of this frequency divider is connected to a $1/2^n$ frequency divider 44 that generates five pulse trains having different pulse densities. The output lines of the $1/2^n$ frequency divider 44 and the absolute value circuit 45 are connected to a pulse generator 46 that selects pulses in accordance with the absolute value of the input. The output line of the pulse generator 46 is connected to an A/B phase generator circuit 47 that switches between an UP and a DOWN input depending upon the counter value $b_5$ (for details, see below) and which regenerates a rectangular wave for phase A or B.

The output line for sampling data from the serial-to-parallel converter 15 is also connected to the A/B phase generator circuit 47.

As shown in FIG. 1, the control unit 16 is connected to the motor 1 via a motor cable 31 so that the motor can be driven with the control unit 16.

The operation of the signal transmitting device having this construction is briefly described below.

Figure 41:
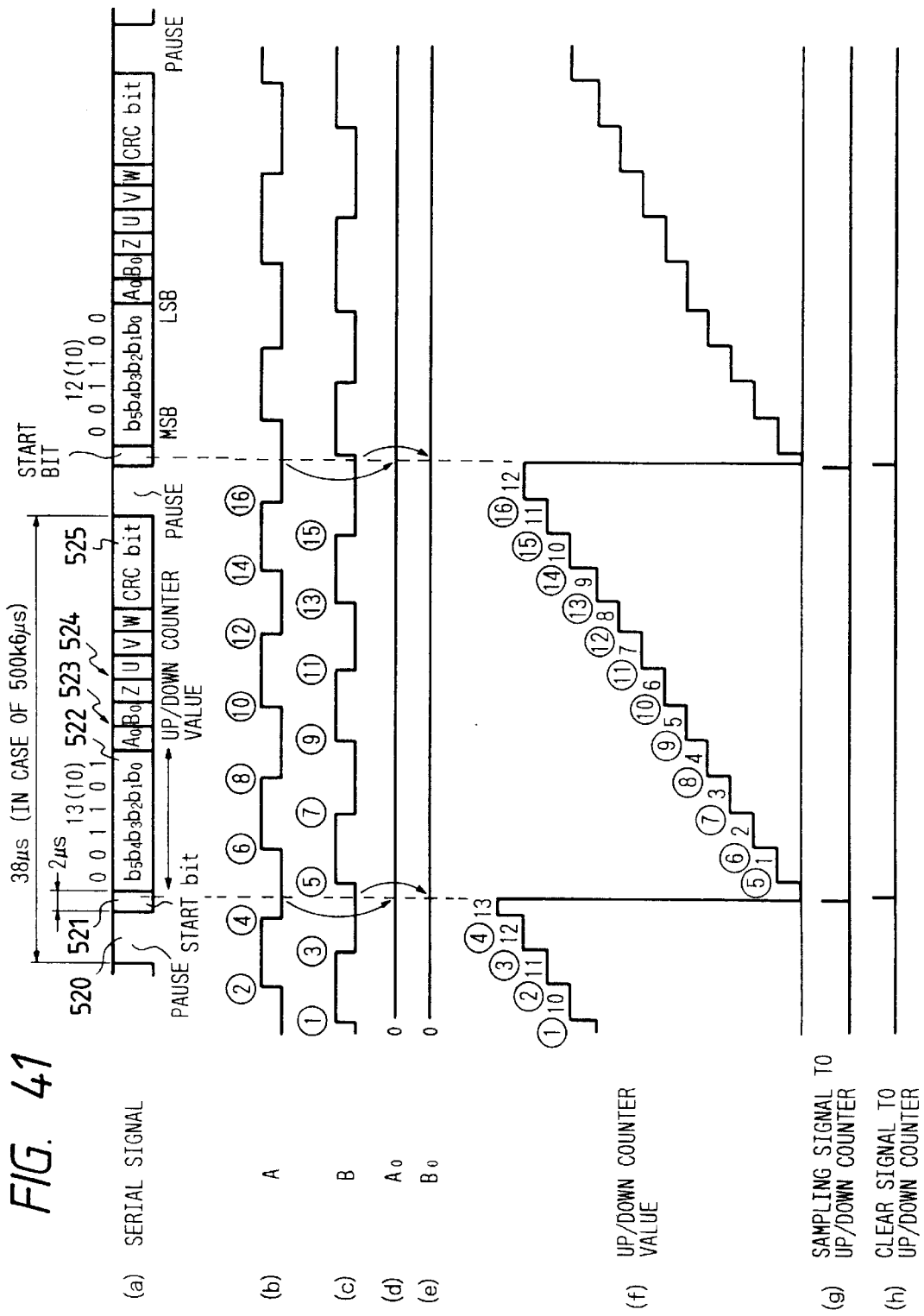
FIG. 41 is a timing chart for illustrating the operation of the circuitry shown in FIG. 38.

If drive power is supplied to the motor 1 from the control unit 16 via the motor cable 31 in order to run the motor 1, its main shaft 1a starts to rotate and the pole detecting magnet 2 and the magnetic recording medium 3 will cause the magnetic field to change. The resulting changes in the magnetic field are detected with the Hall devices 4a as driving position data for phases U, V and W. The MR sensor 4b will detect the changes as position data for phases Z, A, and B, the last two phases being detected as sine waves. These data signals Vu, Vv, Vw, Vz, Va and Vv (see FIG. 38) are fed into the shaping circuit 4c, where they are shaped to rectangular waves. The resulting shaped signals for phases A and B are shown in FIGS. 41(*b*) and 41(*c*). Such rectangular shaped signals (incremental signals) A and B are then fed into a quadrupled pulse generator/direction detector circuit 40, where they are converted to quadrupled pulses and up-down signals, which are both supplied into a 6-bit up-down counter 5 for counting in an ascending or descending order.

Figure 43:
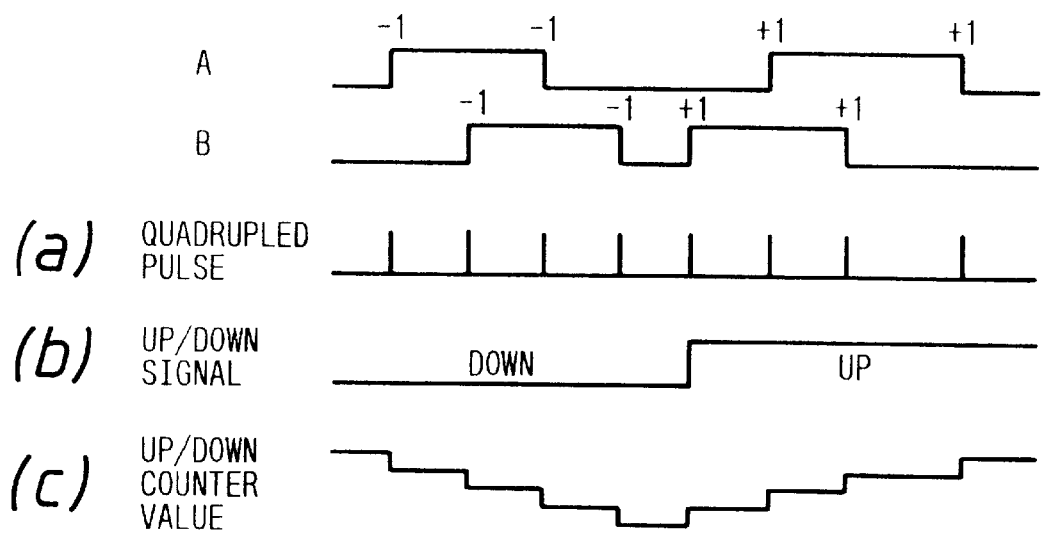
FIG. 43 is a timing chart for illustrating an example of the operation of a quadrupled pulse generator/direction detector circuit and an up-down counter.

An example of the operation of the quadrupled pulse generator/direction detector circuit 40 and the up-down counter 5 is illustrated in FIG. 43.

As FIG. 43 shows, a quadrupled pulse (a) is generated in synchronism with the edge of signal A or B (when a shift from one signal to the other occurs), whereas an up-down signal (b) is generated in such a way that it indicates the direction of the counting mode in accordance with the phase lead or lag of signals A and B—if the phase of signal B leads, the up-down signal commands counting in an ascending direction and if the phase of signal A leads, the same signal commands counting in a descending direction. Hence, the counter value (c) of the up-down counter will count stepwise in accordance with the quadrupled pulse (a) and the up-down signal (b).

In the fourteenth embodiment under consideration, the up-down counter 5 is adapted to sample its value at given time intervals in response to a SAMPLING signal from a communication control portion 50 (see FIG. 41(*g*)). When the sampled counter value is loaded in the parallel-to-serial converter 6, the counter will clear its value in response to a CLEAR signal from the communication control portion 50 (see FIG. 41(*h*)). In the fourteenth embodiment, the phase of signal B leads at all times compared to the phase of signal A and, hence, the value of up-down counter 5 will come out as shown in FIG. 41(*f*).

The values of up-down counter 5 are fed into the parallel-to-serial converter 6 as a 6-bit signal $b_0$–$b_5$; on the other hand, the rectangular shaped position data signals U, V, W and Z are directly fed into the parallel-to-serial converter 6.

In the value of up-down counter 5, $b_5$ is designated the MSB and $b_0$ the LSB and these bits are so set that if the phase of signal B leads, $b_5$ is equal to zero while $b_5$ is equal to one if the phase of signal A leads.

The numerals encircled in FIGS. 41(*b*) and 41(*c*) are keyed to the encircled numerals in FIG. 41(*f*). In other words, the points of change in signal A (FIG. 41(*b*)) or B (FIG. 41(*c*)) correspond to the changes in the values of up-down counter 5.

The numerals not encircled in FIG. 41(*d*) refer to the values of up-down counter 5.

The reason for designing the up-down counter 5 to produce 6-bit counts is set forth below.

Assume here that the serial signal as produced from the parallel-to-serial converter 6 has a propagation velocity of 500 kbps and also assume that the serial signal has a format as shown in FIG. 41(*a*). Then, the sampling of one frame will take 38 μs. If it is assumed that phases A and B will produce 2048 pulses for every rotation of the main shaft 1*a* which can rotate up to 5000 rpm, the frequency of quadrupled pulses is given by:

5000(rpm)/60(sec)×2048(pulses)×(multiplication factor)= 682.7(kHz)

Since the sampling period is 38 μs(see above), the number of pulses that can be generated in that period is given by:

682.7(kHz)×38(μs)=25.9(pulses)/period

Since 25.9<31=$2^5$–1, one may conclude that 6 bits will suffice for the values of the up-down counter 5 in consideration of the direction of the counting mode.

The incremental signals for phases A and B from the waveform shaping circuit 4*c* are also fed as input to the holding circuit 60, where the levels of those incremental signals are to be sampled and held in accordance with a sampling signal (g) from the communication control portion 50. The holding circuit 60 will send out signals Ao and Bo as shown in FIGS. 41(*d*) and 41(*e*), respectively, and these signals are fed into the parallel-to-serial converter 6, where the sampling signals Ao and Bo are subjected to parallel-to-serial conversion together with the up-down counter value and the position data signals U, V, W and Z. As a consequence, the parallel-to-serial converter 6 will send out a serial signal of the format shown in FIG. 41(*a*).

As already mentioned, the format shown in FIG. 41(*a*) assumes a transmission velocity of 500 kbps and a sampling period of 38 μs per frame.

Numeral 520 in FIG. 41(*a*) refers to a pause space that precedes the transmission of various kinds of data; 521 is a START bit that follows the space 520 and which informs the start of data transmission; 522 is a 6-bit up-down counter value that follows the START bit 521 and which is transmitted from the up-down counter 5; 523 refers to sampling signals Ao and Bo that follow the counter value 522 and which are transmitted from the holding circuit 60; 524 refers to position data signals for Z, U, V and W that follow the sampling signals Ao and Bo and which are transmitted from the waveform shaping circuit 4*c*; and 525 refers to 4 CRC bits that follow the Z, U, V and W position data signals 524 and which will check a sequence of data. The CRC bits 525 are to be added to data signals in response to a signal from an error detecting CRC bit adder 51. The pause space 520, START bit 521, up-down counter value 522, sampling signals (Ao, Bo) 523, position data signals 524 and CRC bits 525 compose one frame. The code that is used in the format may be a Manchester code.

One frame of the serial signals thus produced are repetitively transmitted to the control unit 16 via the line driver 8 and encoder cable 9 as the data to be transmitted are updated in accordance with the detection signals from the Hall devices 4*a* and the MR sensor 4*b*.

As already mentioned, these signals are obtained by sampling at given time intervals in accordance with the sampling and CLEAR signals as supplied from the communication control portion 50.

Figure 42:
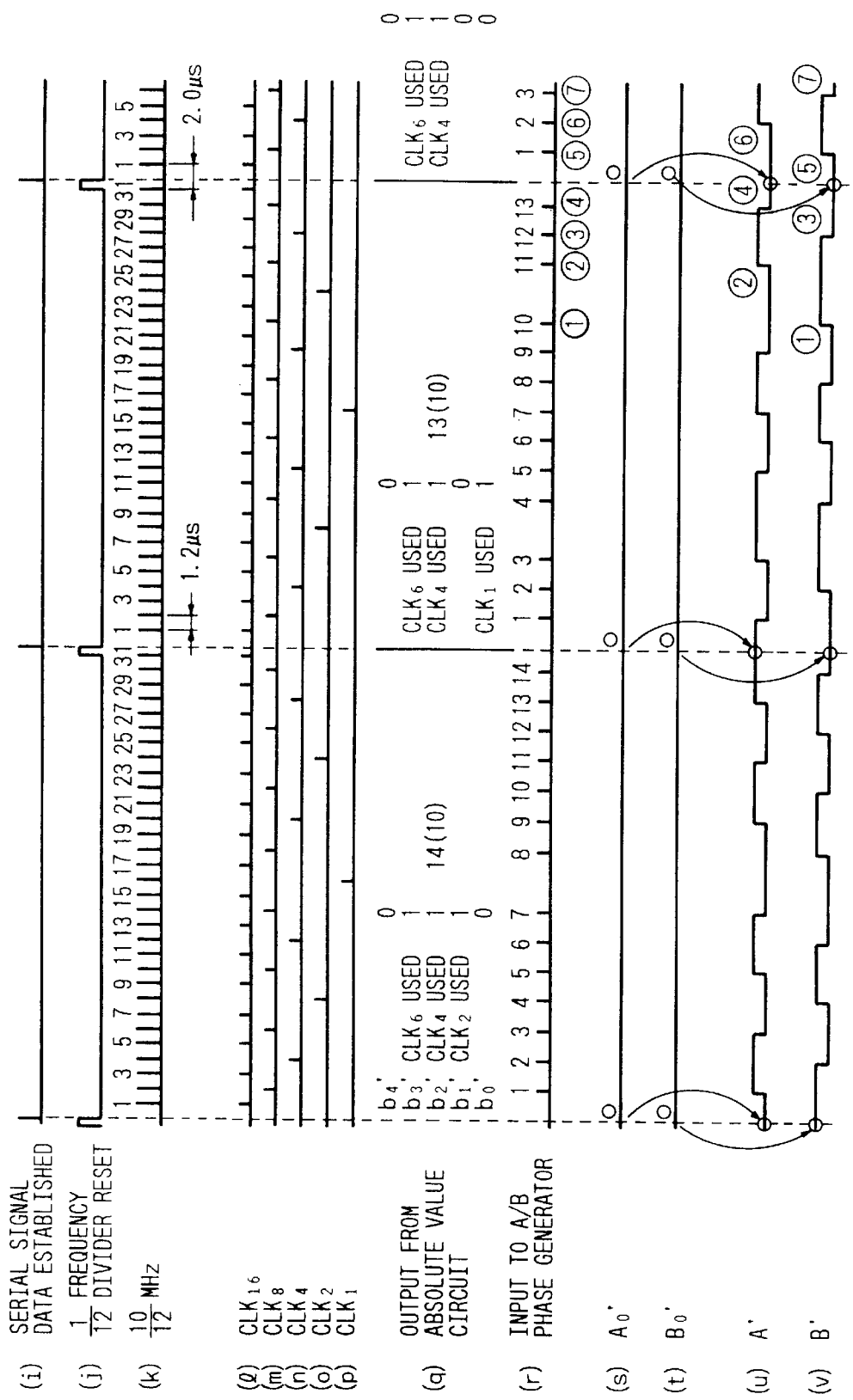
FIG. 42 is a timing chart for illustrating the operation of the circuitry shown in FIG. 39.

The serial signals of interest are transmitted through the encoder cable 9 and received by the line receiver 14 in the control unit 16. These serial signals are converted back to parallel signals in the serial-to-parallel converter 15, producing data at the point of time when the occurrence of CRC bits 525 is verified, namely, at the timing shown in FIG. 42(*i*).

The position data U', V', W' and Z' for U, V, W and Z phases in a parallel form are forwarded as such for subsequent processing; on the other hand, the 6-bit counter values are fed into an absolute value circuit 45 (see FIG. 39), where decision is made as to whether each counter value is positive or negative on the basis of the value of $b_5$. The criterion for the decision is such that the counter value is found to be positive if $b_5$=0 and it is found to be negative if $b_5$=1. In the case of $b_5$=1, the circuit 45 performs calculation for 100000 (2)−$b_4 b_3 b_2 b_1 b_0$(2) and the result is produced as an output from the circuit 45. The output of the circuit 45 consists of 5 bits and is encoded as $b_4' b_3' b_2' b_1' b_0'$. In the above calculation formula, the figures in parentheses represent the radix of a number system at issue and (2) means a number in binary notation.

We next describe a 1/12 frequency divider which is shown by 43 in FIG. 14. According to the calculation of the number of bits that are required for the up-down counter 5, generating up to 26 pulses within 38 μs will suffice for a pulse generator 46 at a subsequent stage. However, in the fourteenth embodiment under consideration, a clock that is capable of generating 31 pulses within 38 μs is necessary in order to reduce the jitter in the signals for phases A and B (for details, see below). Stated more specifically, the frequency of the necessary clock is expressed by:

31(pulses)/38(μs)=815.8(kHz)

If the fundamental clock has a frequency of 10 MHz, the required number of frequency divisions to produce the necessary clock is given by:

10(MHz)/815.8(kHz)=12.3(divisions)

This is the reason why the 1/12 frequency divider 43 is used in the fourteenh embodiment.

However, the output of this 1/12 frequency divider 43, namely, the generation of 31 pulses at a clock frequency of 10/12 MHz does not coincide exactly with 38 μs, so a RESET signal corresponding to one frame of serial signals is received from the serial-to-parallel converter 15 in order to make both ends meet. The RESET signal thus received is shown in FIG. 42(j). After the 31st (thirty-first) pulse has been generated at a clock frequency of 10/12 MHz as shown in FIG. 42(k), the 1/12 frequency divider 43 is reset to a stop and its reset condition is cleared at the timing of data establishment which is shown in FIG. 42(i). Therefore, every pulse is generated at an interval of 1.2 μs and the interval between the 31st pulse and the first pulse of the next cycle is 2.0 μs.

The frequency divided signals for 31 pulses are fed into a $1/2^n$ frequency divider 44, where they are divided into five pulse trains having different pulse densities. For the concepts of the $1/2^n$ frequency divider 44 and a pulse generator 46 to be described just below, see pages 154 to 157 of "Digital Kairo—Kiso to Oyo—(Digital Circuits—Basics and Applications—)", Hiroshi Kawaharada, Oct. 15, 1982, Shokodo Publishing Company. According to the theory of pulse distribution by the MIT technique, the clock of 10/12 MHz is distributed into five clocks shown in FIGS. 42(l) to 42(p); CLK 16 has odd-numbered pulses; CLK 8 has pulses which are divided by 4 to yield the remainder 2; CLK 4 has pulses which are divided by 8 to yield the remainder 4; CLK 2 has pulses which are divided by 16 to yield the remainder 8; and CLK 1 has pulses which are divided by 32 to yield the remainder 16.

The clocks CLK 16, CLK 8, CLK 4, CLK 2 and CLK 1, as well as the output signal $b_4'b_3'b_2'b_1'b_0'$ from the absolute value circuit 45 are fed into the pulse generator 46.

Figure 40:
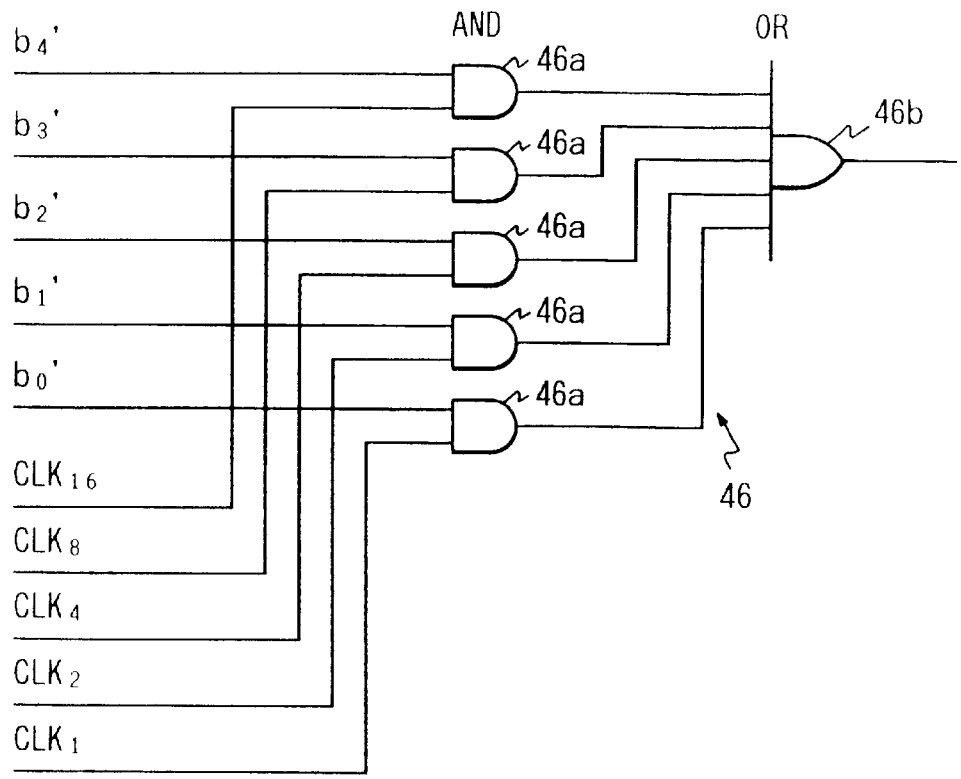
FIG. 40 shows schematically the construction of a pulse generator.

The pulse generator 46 is composed of AND circuits 46a and an OR circuit 46b as shown in FIG. 40 and, depending upon the contents of the signal $b_4'b_3'b_2'b_1'b_0'$, the generator 46 selects CLK 16, CLK 8, CLK 4, CLK 2 or CLK 1 so as to output a logical sum. If $b_4'b_3'b_2'b_1'b_0'$ is 01101(2) as identified in the center of the description in FIG. 42(g), CLK 8, CLK 4 and CLK 1 are selected; namely, pulses 2, 4, 6, 10, 12, 14, 16, 18, 20, 22, 26, 28 and 30 at a clock frequency of 10/12 MHz are selected and summed up to produce pulses as shown in FIG. 42(r). As is clear from FIG. 42(r), the output pulses are spaced substantially uniformly to reduce the occurrence of jitter. Hence, an A/B phase generator circuit 47 to be described just below will produce.

The pulse train identified in FIG. 42(r) and the sampling signals Ao' and Bo' are fed into the A/B phase generator 47. The sampling signals Ao' and Bo' are generated at the point of time when data is established as shown in FIG. 42(i) and, therefore, they assume either a high or low level as shown in FIGS. 42(s) and 42(t) (in the embodiment under discussion, only low-level signals are generated). Incremental signals A' and B' are regenerated on the basis of these sampling signals Ao' and Bo' and the pulse train from the pulse generator 46.

The A/B phase generator circuit 47 is so adapted that it will switch the output of the pulse generator 46 to either an UP or DOWN input depending upon the value of $b_5$ in the 6-bit counter value as transmitted from the serial-to-parallel converter 15. Stated more specifically, the output from the pulse generator 46 is switched to an UP input when $b_5$=0 and to a DOWN input when $b_5$=1. Sampling signals Ao' and Bo' are loaded as initial values for the outputs A' and B' from the A/B phase generator at the timing shown in FIG. 42(i). The timing of loading the sampling signals is indicated by circles in FIGS. 42(u) and 42(v). Further, the A/B phase generator is so adapted that in response to the entry of one pulse of UP input, a waveform is generated with a leading B' phase whereas a waveform with a leading A' phase is generated in response to the entry of one pulse of DOWN input.

It is worth mention here that the sampling signals Ao' and Bo' provide data for the level of the counter value before it changes and that since the incremental signals for phases A and B are regenerated on the basis of that level, it is assured that the inputs A and B to the quadrupler/direction detector circuit 40 in the signal processor circuit 17 will not be offset in phase from the outputs A' and B' from the A/B phase generator 47. Output signals from the A/B phase generator circuit 47 are shown in FIGS. 42(u) and 42(v), respectively; obviously, the phase of signal B leads the phase of signal A.

Edges indicated by (1), (2), . . . in FIGS. 41(b) and 41(c) correspond to edges indicated by (1), (2), . . . in FIGS. 42(u) and 42(v) and, obviously, time lags have developed. This is due either to the delay in serial transmission or to the wait for data establishment but the actual time difference is only 64 μs, which is not any big problem as a delay in the transmission of signals for phases A and B. This transmission delay can be further reduced by increasing the transmission velocity from 500 kbps to 1 Mbps.

The error detector 48 is adapted to be capable of detecting errors in the CRC bits 524 being transmitted. If an error is detected, the detector produces a single-occurrence alarm output; at the same time, it sends out a HOLD signal to both the absolute value circuit 45 and the latch 49 to insure that the data $b_5$ to $b_0$, U, V, W and Z in the last received signal block are used again. Reusing the data $b_5$ to $b_0$ is equivalent to the motor running at uniform velocity, so this in not a problem at all to the rotation of the motor; as far as the data U, V, W and Z are concerned, reusing them is not a problem, either, because of their low frequency. If three errors occur in succession, the three-consecutive-occurrence detector circuit will output a three-consecutive-occurrence alarm.

Thus, the occurrence of an error causes a single-occurrence error alarm to be generated; if necessary, the motor may be caused to stop so as to inform the operator of the occurrence of an error and this contributes to an improved system reliability. Alternatively, the single-occurrence error alarm may be neglected and the motor is stopped to inform the operator of the occurrence of errors only when the three-consecutive-occurrence error alarm is generated; in this case, the data $b_5$ to $b_0$ in the last received signal block are to be used, thereby avoiding frequent motor stoppage and erroneous operations that would otherwise occur due to noise.

If three errors occur in succession, the system will determine that they are true errors caused by certain reasons such as drop in the level of the quality of communication paths and, as a result, the three-consecutive-occurrence error alarm is generated to inform the operator of the occurrence of a serious trouble.

In FIG. 39, the regenerated signals are marked with an apostrophe as in A', B', U', V', W', Z', Ao' and Bo' and this is added to make clear that the regenerated signals are delayed in transmission compared to the initial signals A, B, U, V, W, Z, Ao and Bo.

Thus, in the fourteenth embodiment of the present invention, the amount of change per unit time in the value of the up-down counter 5 is transmitted and, at the same time, the data on the levels of phases A and B are transmitted as sampling data. Since the amount of change in the counter value and the sampling data are used on a frame basis for regenerating incremental signals for phases A and B, the levels of these phases at the sending end can be regenerated faithfully at the receiving end; in other words, phases A, B and Z can be sent and received without experiencing any phase shift.

Figure 44:
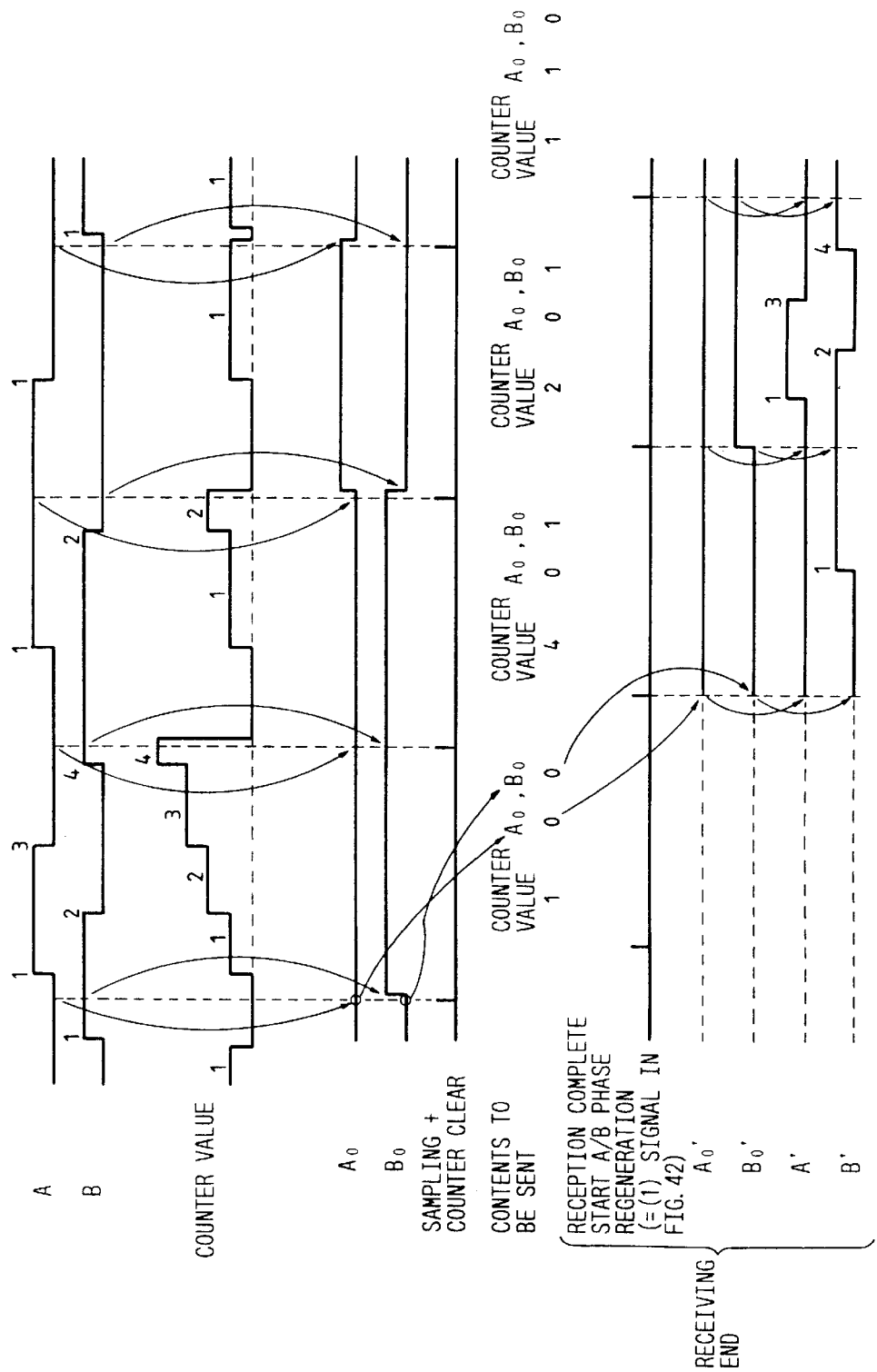
FIG. 44 is a timing chart for a device that transmits signals from a position detector according to a modification of the fourteenth embodiment.

FIG. 44 is a timing chart for illustrating a modification of the fourteenth embodiment, in which the holding circuit 60 effects sampling even when the incremental signals A and B are at high level.

Figure 45:
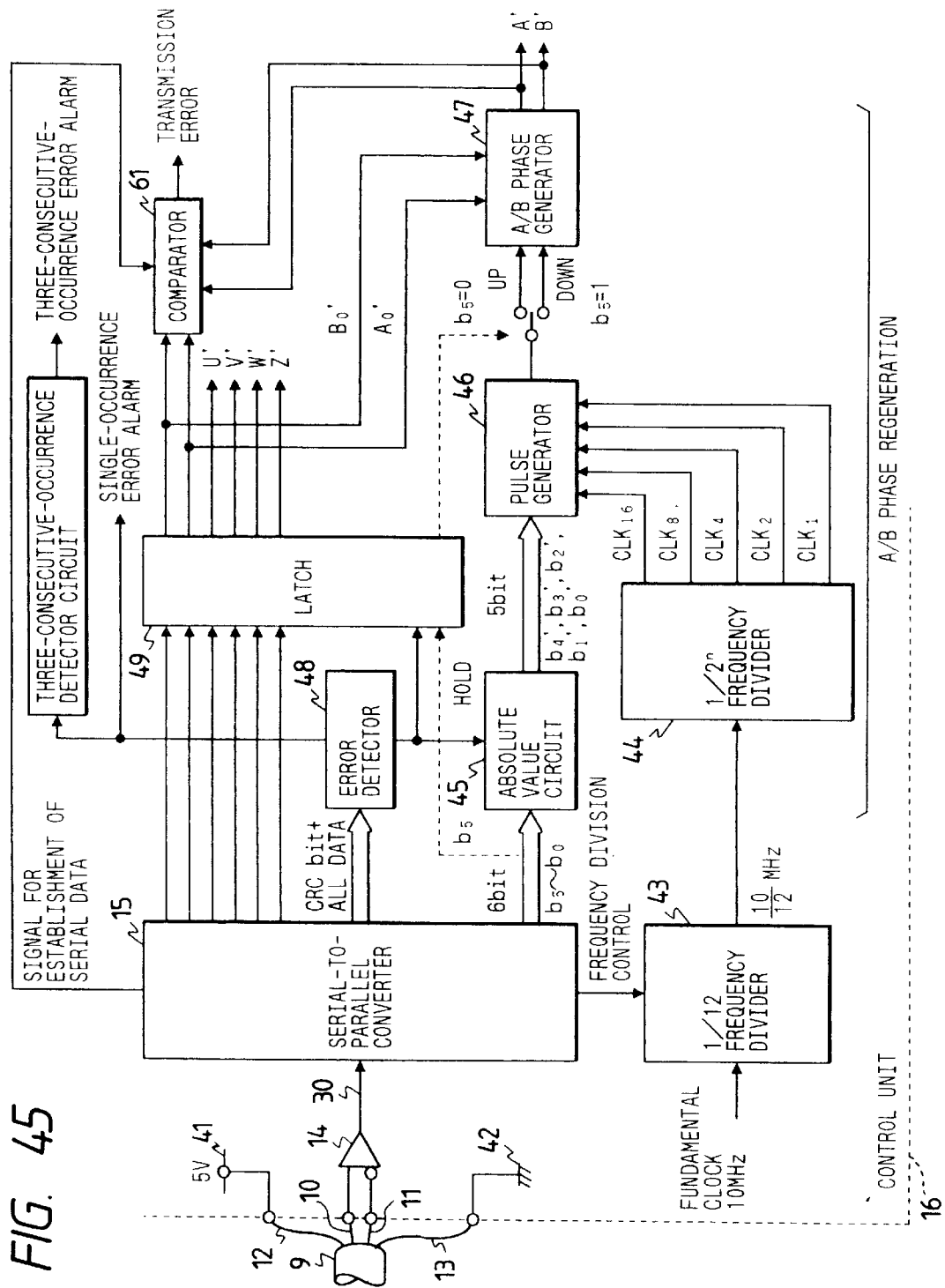
FIG. 45 shows schematically the construction of a device for transmitting signals from a position detector according to the fifteenth embodiment of the present invention.

FIG. 45 shows schematically the construction of a device for transmitting signals from a position detector according to the fifteenth embodiment of the present invention.

The signal transmitting device of this embodiment differs from that of the fourteenth embodiment in that it additionally includes a comparator 61 for detecting transmission errors. This comparator 61 compares the levels of currently received sampling signals Ao' and Bo' with the final levels of the outputs A' and B' which have been regenerated on the basis of the counter value. The timing of comparison coincides with the establishment of the serial signal data as shown in FIG. 42(i) and if there is found any difference in level, the comparator 61 will generate a transmission error.

If the device under consideration is used at a location that is environmentally poor in terms of noise, the counter value or the sampling data may occasionally be received in an erroneous manner. According to the fifteenth embodiment, such reception errors can effectively be checked to assure improvement in the reliability of the data being transmitted.

While the fourteenth and fifteenth embodiments of the present invention have been described above in a specific manner, it should be noted that they are not the sole cases of the invention and that various modifications can be made without departing from the scope and spirit of the invention. For example, in those embodiments, sampling is effected on the up-down counter 5 in accordance with sampling signals and after the sampled data are loaded into the parallel-to-serial converter 5, the up-down counter 5 is cleared; however, the up-down counter 5 need not be cleared but it may be permitted to run freely and the previously sampled counter value may be stored in memory so that it is subtracted from the currently sampled counter value to determine the amount of change in counter value, which is subsequently transmitted to the control unit.

The fourteenth and fifteenth embodiments are also characterized in that sampling signals Ao' and Bo' are used on each occasion for regenerating position signals A' and B'. But if desired, the sampling signals Ao' and Bo' may be used only when the line voltage of the circuitry at the receiving end is high enough to enable its operation.

Alternatively, the sampling signals may only be used right after the circuitry at the receiving end has been reset.

Another possibility is to use the sampling signals at selected time intervals, such as once for a plurality of data receptions.

If desired, the sampling signals may be used only when phase Z has become active.

It is also possible to use the sampling signals only when the counter value is zero, or when all of the bits $b_5$ to $b_0$ are zero. In this case there is no change in the counter value, so Ao and Bo are equal to the values of A and B which are inputs to the holding circuit 60; in other words, the levels of A and B at the timing shown in FIG. 41(g) may be put on the Ao and Bo bits 523 in the format shown in FIG. 41(a).

The foregoing description of the fourteenth and fifteenth embodiments concerns the case where the concept of the present invention is applied to a device that transmits and processes not only the position data for phases A, B and Z but also the position data for phases U, V and W phases. It should be noted that the concept can of course be applied to a device that transmits and processes only the position data for phases A, B and Z.

In the two embodiments under consideration, the bits 523 which are exclusively assigned to Ao and Bo are provided in the transmission format but, if desired, these bits may be contained in other data.

As described on the foregoing pages, the fourteenth and fifteenth embodiments of the present invention are characterized in that the amount of change per unit time in the value of the up-down counter is transmitted while, at the same time, the data on the levels of phases A and B are transmitted as sampling data. Since the amount of change in the counter value and the sampling data are used on a frame basis for regenerating incremental signals for phases A and B, the levels of these phases at the sending end can be regenerated faithfully at the receiving end; as a result, phases A, B and Z can be sent and received without experiencing any phase shift and this contributes to an improvement in the precision of positioning job.

What is claimed is:

1. A device for transmitting position detector signals comprising:

a control unit for processing signals on various kinds of data from an object of interest;

a position detector that has a magnetic pole detecting portion and which detects position data of said object of interest;

an up-down counter that counts in an ascending or descending order on the basis of two-phase output signals that are produced from said position detector in accordance with the chance in the position of said object of interest;

a converting circuit portion in which both the counter value produced from said up-down counter or the chance in said counter value per unit time and a magnetic pole position detection signal produced from said magnetic pole detecting portion are converted to a serial signal;

a transmission path for transmitting said serial signal to said control unit;

a sensor that is located within or outside said position detector for detecting position data of said object of interest and which detects different data from said position data; and superposing means by which different data that are detected with said sensor and said position detector and which are transmitted along said transmission path are superposed on the serial signal.

2. A device according to claim 1 wherein the different data from said position data is data as created by analog-to-digital conversion.

3. A device for transmitting position detector signals comprising:

a control unit for processing signals on various kinds of data from an object of interest;

a position detector that has a magnetic pole detecting portion and which detects position data of said object of interest;

an up-down counter that counts in an ascending or descending order on the basis of two-phase output signals that are produced from said position detector in accordance with the change in the position of said object of interest;

a converting circuit portion in which both the counter value produced from said up-down counter or the change in said counter value per unit time and a magnetic pole position detection signal as produced from said magnetic pole detecting portion are converted to a serial signal;

a transmission path for transmitting said serial signal to said control unit; and a plurality of position detectors for detecting position data on the object of interest and in which signal lines for said plurality of position detectors are passed through a single transmission path, with at least part of the power lines in the device being shared by said plurality of position detectors.

4. A device for transmitting position detector signals comprising:

a control unit for processing signals on various kinds of data from an object of interest;

a position detector that has a magnetic pole detecting portion and which detects position data on said object of interest;

an up-down counter that counts in an ascending or descending order on the basis of two-phase output signals that are produced from said position detector in accordance with the change in the position of said object of interest;

a converting circuit portion in which both the counter value produced from said up-down counter or the change in said counter value per unit time and a magnetic Dole position detection signal as produced from said magnetic pole detecting portion are converted to a first serial signal;

a transmission path for transmitting said first serial signal to said control unit;

an absolute counter, wherein an output of said absolute counter represents the absolute position of said object of interest; and means for converting the output of said absolute counter into a second serial signal and superposing said second serial signal with said first serial signal.

5. A device for transmitting position detector signals comprising:

a control unit for processing signals on various kinds of data from an object of interest;

a position detector that has a magnetic pole detecting portion and which detects position data of said object of interest;

an absolute counter, wherein an output of said absolute counter represents a position of said object of interest;

a delay circuit for delaying a sampling time of an output of said absolute counter;

a subtractor circuit receiving an output of said delay circuit;

a converting circuit portion in which a counter value produced from said absolute counter or a change in said counter value per unit time, and a magnetic pole position detection signal produced from said magnetic pole detecting portion are converted to a serial signal;

a transmission path for transmitting said serial signal to said control unit;

a sensor that is located within or outside said position detector for detecting position data on said object of interest and data different from said position data;

superposing means by which different data that are detected with said sensor and said position detector and which are transmitted along said transmission path are superposed on the serial signal; and a latch circuit receiving an output of said subtractor circuit to supply an input to said superposing means.

6. A method of transmitting incremental signals which comprises:

supplying a counter with incremental signals on an object to be detected, transferring the amount of change in the value of the counter within a given time after said amount of chance has been converted to serial signals, receiving said serial signals, and converting them to incremental signals, wherein field pulses and associated up-down signals are fed into an up-down counter to reproduce the field pulses and the up-down signals.

7. A method according to claim 6, wherein pulses are selected in accordance with the serial signals as received from the train of $(2^n-1)$ pulses (n is a natural number); wherein the selected pulses are generated into incremental signals, and wherein a $1/2^n$ frequency divider, an absolute value circuit and a pulse generator circuit are used.

8. A method of transmitting incremental signals which comprises:

supplying a counter with incremental signals on an object to be detected, transferring the amount of chance in the value of the counter within a given time after said amount of change has been converted to serial signals, receiving said serial signals, and converting them to incremental signals, wherein an UP pulse and a DOWN pulse are fed into an up-down counter to reproduce the UP pulse and the DOWN pulse.

9. A device for transmitting position detector signals which comprises:

a position detector for detecting position data on an object of interest;

an up-down counter which is supplied with two-phase incremental signals detected with said position detector in accordance with the change in the position of said object of interest;

sampling circuit for sampling said two-phase incremental signals to produce sampling data;

a converting circuit portion in which the amount of change in the counter value per unit time produced from said up-down counter is converted to a serial signal; and a receiving circuit that receives said serial signal via a transmission path and which regenerates the two-phase incremental signals on the basis of said amount of change and said sampling data.

10. A device according to claim 9 wherein said receiving circuit detects transmission errors by comparing said sampling data with said regenerated two-phase incremental signals.

* * * * *